(12) United States Patent
Yanagisawa

(10) Patent No.: US 8,798,876 B2
(45) Date of Patent: Aug. 5, 2014

(54) HYBRID WORKING MACHINE AND CONTROLLING METHOD THEREOF

(75) Inventor: Makoto Yanagisawa, Kanagawa (JP)

(73) Assignees: Sumitomo Heavy Industries, Ltd., Tokyo (JP); Sumitomo(S.H.I.) Construction Machinery Co., Ltd., Tokyo (JP)

(*) Notice: Subject to any disclaimer, the term of this patent is extended or adjusted under 35 U.S.C. 154(b) by 343 days.

(21) Appl. No.: 13/379,395

(22) PCT Filed: Jun. 25, 2009

(86) PCT No.: PCT/JP2009/061613
§ 371 (c)(1),
(2), (4) Date: Dec. 20, 2011

(87) PCT Pub. No.: WO2010/150382
PCT Pub. Date: Dec. 29, 2010

(65) Prior Publication Data
US 2012/0109472 A1  May 3, 2012

(51) Int. Cl.
| | | |
|---|---|---|
| F02D 13/02 | (2006.01) | |
| B60W 10/06 | (2006.01) | |
| B60W 10/08 | (2006.01) | |
| F02D 29/02 | (2006.01) | |
| E02F 9/20 | (2006.01) | |
| B60L 7/14 | (2006.01) | |
| B60L 11/00 | (2006.01) | |
| B60L 3/06 | (2006.01) | |
| B60L 3/00 | (2006.01) | |
| B60L 11/18 | (2006.01) | |
| B60K 6/46 | (2007.10) | |
| B60L 11/12 | (2006.01) | |
| B60W 30/188 | (2012.01) | |
| E02F 9/22 | (2006.01) | |
| B60W 20/00 | (2006.01) | |

(52) U.S. Cl.
CPC .......... *B60K 6/46* (2013.01); *B60W 2710/0644* (2013.01); *B60W 2710/0677* (2013.01); *Y02T 10/6217* (2013.01); *B60Y 2200/412* (2013.01); *B60L 2240/441* (2013.01); *Y02T 10/6286* (2013.01); *B60W 10/06* (2013.01); *Y02T 10/7077* (2013.01); *Y02T 10/7241* (2013.01); *B60W 10/08* (2013.01); *F02D 29/02* (2013.01); *E02F 9/2075* (2013.01); *B60L 7/14* (2013.01); *B60L 11/005* (2013.01); *B60L 3/06* (2013.01); *B60L 2210/40* (2013.01); *B60Y 2200/25* (2013.01); *Y02T 10/7044* (2013.01); *B60W 20/00* (2013.01); *B60W 2510/0638* (2013.01); *Y02T 10/705* (2013.01); *B60L 3/0046* (2013.01); *Y02T 10/7005* (2013.01); *B60L 11/1862* (2013.01); *Y02T 10/7022* (2013.01); *B60L 11/1859* (2013.01); *B60L 11/123* (2013.01); *B60W 30/1882* (2013.01); *B60L 2200/40* (2013.01); *B60L 2240/421* (2013.01); *E02F 9/2246* (2013.01); *Y02T 10/642* (2013.01)
USPC .............................. 701/50; 180/60

(58) Field of Classification Search
USPC ............... 701/50; 180/6.48, 6.5, 65.1, 65.21, 180/65.285, 220, 60
See application file for complete search history.

(56) References Cited

U.S. PATENT DOCUMENTS

| | | | |
|---|---|---|---|
| 6,326,702 B1 | 12/2001 | Yonekura et al. | |
| 6,708,787 B2 * | 3/2004 | Naruse et al. | 180/53.8 |
| 6,820,356 B2 * | 11/2004 | Naruse et al. | 37/348 |
| 6,864,663 B2 | 3/2005 | Komiyama et al. | |
| 2008/0093865 A1 | 4/2008 | Komiyama et al. | |
| 2008/0236157 A1 | 10/2008 | Kowatari et al. | |

FOREIGN PATENT DOCUMENTS

| | | |
|---|---|---|
| JP | 63-016139 | 1/1988 |
| JP | 63-016140 | 1/1988 |
| JP | 2000-154803 | 6/2000 |
| JP | 2000-186590 | 7/2000 |

| | | |
|---|---|---|
| JP | 2002-330554 | 11/2002 |
| JP | 2004-150307 | 5/2004 |
| JP | 2005-083242 | 3/2005 |
| JP | 2007-218111 | 8/2007 |
| JP | 2007-290607 | 11/2007 |
| JP | 2008-121659 | 5/2008 |
| WO | WO2005/021977 | 3/2005 |

OTHER PUBLICATIONS

International Search Report mailed on Sep. 29, 2009.
Office Action in Japanese Patent Application No. 2008-063070 mailed Sep. 29, 2009.

* cited by examiner

*Primary Examiner* — Dalena Tran
(74) *Attorney, Agent, or Firm* — IPUSA, PLLC

(57) ABSTRACT

In a hybrid working machine, a control unit corrects an output upper limit value of an engine based on a deviation between a target revolution speed of the engine and an actual revolution speed of the engine, and output values of a motor generator, a hydraulically driven unit and an electrically driven unit are determined based on the corrected output upper limit value of the engine, or the control unit corrects an output lower limit value of the motor generator based on a deviation between the target revolution speed of the engine and the actual revolution speed of the engine, and the output values of the motor generator, the hydraulically driven unit and the electrically driven unit are determined based on the corrected output lower limit value of the motor generator.

12 Claims, 31 Drawing Sheets

FIG.4

OUTPUT POLARITY

| | + | − |
|---|---|---|
| ASSIST MOTOR | ASSISTING | GENERATING |
| BATTERY | DISCHARGING | CHARGING |
| ELECTRIC LOAD | GENERATING | POWER RUNNING |

HYBRID WORKING MACHINE AND CONTROLLING METHOD THEREOF

TECHNICAL FIELD

The present invention relates to a working machine, and more specifically, to a hybrid working machine which can effectively work by using two types of power source.

BACKGROUND ART

A hybrid working machine which can effectively work by using motive power of an internal-combustion engine and motive power of electric machinery has been developed and used. The hybrid working machine may employ an operation mode of a so-called parallel type.

In the operation mode of the parallel type, a hydraulic pump and power machinery functioning as a generator and an electric motor are connected to an internal-combustion engine (an engine) in parallel as a power source to be commonly used. A hydraulic actuator is driven by the hydraulic pump, and simultaneously an electric power accumulator is charged by a function of the generator connected to the electric power accumulator. The power machinery may be operated as an electric motor by electric power from the electric power accumulator to assist the engine. The power machinery may be dual purpose machinery which integrally functions as both a motor generator and an electric motor. However, a motor generator and an electric motor may be separately used.

In the above hybrid working machine, the motive power for driving the hydraulic pump may be the output from the engine and the output from the motor generator assisting the engine. Therefore, the output from the engine and the output from the motor generator may be appropriately distributed in consideration of the states of the engine and the electric power accumulator for driving the motor generator.

It is proposed in a hybrid shovel that power for a pump is obtained, a distribution of electric motor power to be output in order to assist an engine with an electric motor is determined in response to the power for the pump, and a distribution of power is corrected to cancel a deviation between the target revolution speed of the engine and the actual revolution speed of the engine (for example, Patent Document 1).

RELATED ART DOCUMENT

PATENT DOCUMENT 1: Japanese Laid-Open Patent Application No. 2007-290607

DISCLOSURE OF THE INVENTION

Problems to be Solved by the Invention

With the above corrected power distribution disclosed in Patent Document 1, the pump may output by exceeding the output limit of the electric motor. In this case, an output more than the capacity of the electric motor is exerted by correcting the power distribution and the electric motor may become in an overload condition.

Further, because the power distribution is corrected without considering the electric capacity of the electric power accumulator, even if it is tried to increase the revolution speed of the engine with the assisting operation of the electric motor, the power used for the assisting operation may not be sufficiently stored in the electric power accumulator. Therefore, the engine may not be sufficiently assisted by the electric motor to quickly recover the revolution speed of the engine to the target revolution speed of the engine.

The present invention is provided in consideration of the above problems. The objects of the present invention are to appropriately distribute the outputs from the engine and the motor generator in the hybrid working machine.

Means for Solving Problems

To achieve the above object, there is provided a hybrid working machine including a hydraulic generator configured to convert an output from an engine to a hydraulic pressure and supply it to a hydraulically driven unit; a motor generator connected to the engine and configured to function as both an electric motor and a generator; an electric power accumulator configured to supply electric power to the motor generator to cause the motor generator to function as the electric motor; an electrically driven unit configured to be driven by the electric power from the electric power accumulator, generate regenerated power and supply the regenerated power to the electric power accumulator; and a control unit configured to control an operation of the motor generator, wherein the control unit corrects an output upper limit value of the engine based on a deviation between a target rotational speed of the engine and an actual revolution speed of the engine and determines output values of the motor generator, the hydraulically driven unit and the electrically driven unit based on the corrected output upper limit value of the engine.

The control unit may correct an output lower limit value of the motor generator based on a deviation between the target revolution speed of the engine and the actual revolution speed of the engine, and may determine output values of the motor generator, the hydraulically driven unit and the electrically driven unit based on the corrected output lower limit value of the engine.

The control unit may correct the output lower limit value of the motor generator in consideration of discharge capability of the electric power accumulator.

The control unit may determine an output from the hydraulically driven unit based on the discharge capability of the electric power accumulator.

Further, according to an embodiment of the present invention, there is provided a hybrid working machine including a hydraulic generator configured to convert an output from an engine to a hydraulic pressure and supply it to a hydraulically driven unit; a motor generator connected to the engine and configured to function as both an electric motor and a generator; an electric power accumulator configured to supply electric power to the motor generator to cause the motor generator to function as the electric motor; an electrically driven unit configured to be driven by the electric power from the electric power accumulator, generate regenerated power and supply the regenerated power to the electric power accumulator; and a control unit configured to control an operation of the motor generator, wherein the control unit corrects an output lower limit value of the motor generator based on a deviation between a target rotational speed of the engine and an actual revolution speed of the engine and determines output values of the motor generator, the hydraulically driven unit and the electrically driven unit based on the corrected output lower limit value of the motor generator.

The control unit may correct the output lower limit value of the motor generator in consideration of discharge capability of the electric power accumulator.

Further, the control unit may determine an output from the hydraulically driven unit based on the discharge capability of the electric power accumulator.

Further, according to another embodiment of the present invention, there is provided a control method of a working machine which is operated by driving a hydraulic generator with an internal combustion engine, the control method including setting an increasing rate of an output from the internal combustion engine to be a predetermined value; comparing an upper limit value of the internal-combustion engine which is obtained from the predetermined value and a required power which is obtained from a hydraulic output required for the hydraulic generator; and controlling an output from the internal combustion engine to be the output upper limit value or less when the required power exceeds the output upper limit value.

When the required power exceeds the output upper limit value, power exceeding the output upper limit value may preferably be supplied by the electric motor.

The electric motor may be driven by power obtained from the electric power accumulator and regenerated power obtained from a working motor generator.

The output from the internal combustion engine may be controlled by a predetermined time interval, and the output upper limit value of the internal combustion engine may be obtained by adding a value of a predetermined rate to a previous output from the internal combustion engine.

Further, when the output upper limit value of the internal combustion engine is obtained, a revolution speed of the engine may be considered.

Effect of the Invention

According to the present invention, the outputs from the engine and the motor generator in the hybrid working machine can be appropriately distributed. With this, it is possible to prevent a demand for an excessive output to the engine and an engine stall caused by an overload on the engine. Further, the revolution speed of the engine can be quickly increased to the target revolution speed.

BRIEF DESCRIPTION OF DRAWINGS

FIG. 4 illustrates an output polarity indicative of moving direction of the electric power (motive power).

DETAILED DESCRIPTION OF THE PREFERRED EMBODIMENTS

Next, embodiments of the present invention are described with reference to figures.

As an example of the hybrid working machine of the embodiments of the present invention, a hybrid power shovel is described.

Figure 1:
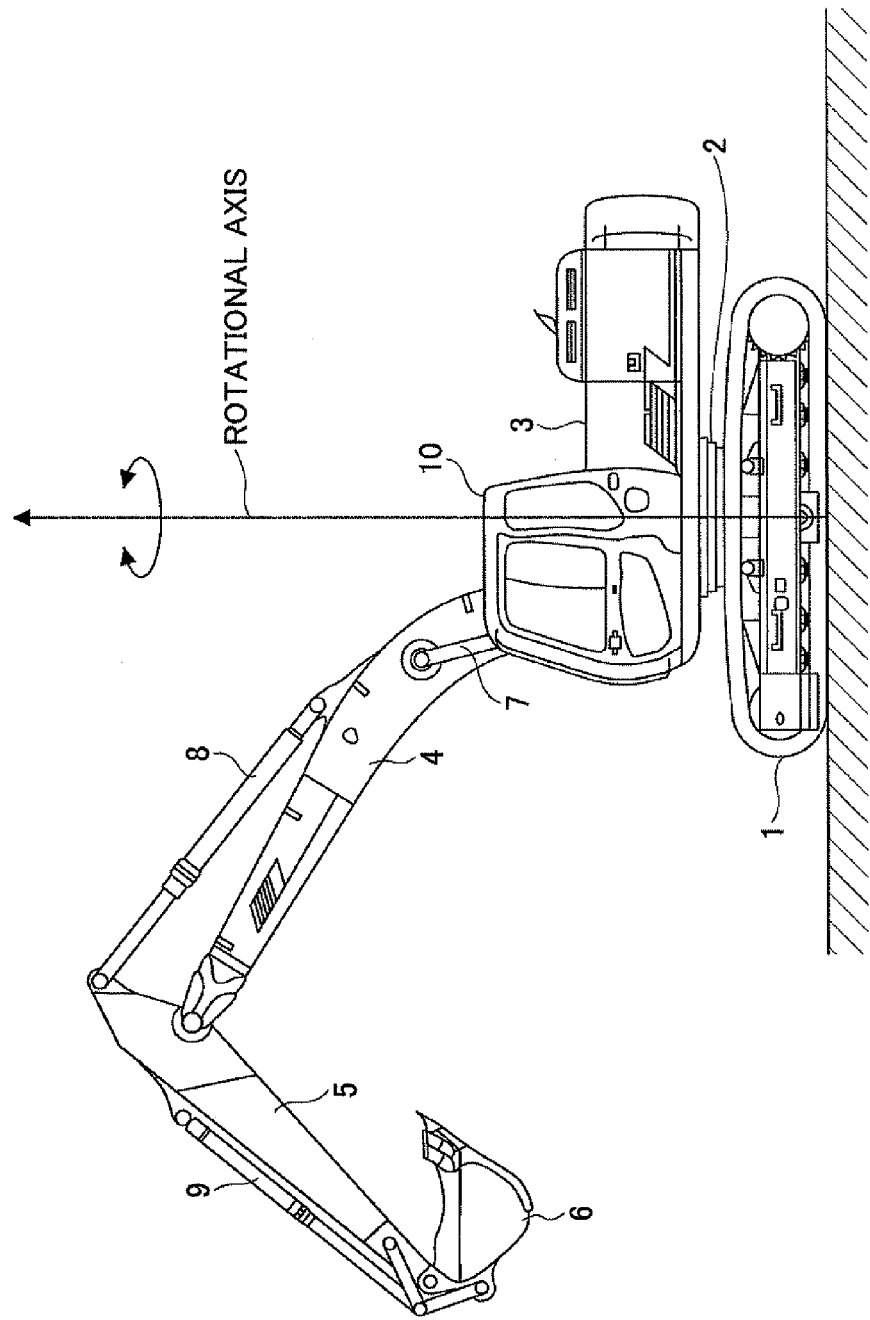
FIG. 1 is a side view of a hybrid power shovel.

FIG. 1 is a side view of the hybrid power shovel. An upper-part turning body 3 is installed in a lower-part traveling body 1 of the hybrid power shovel via a turning mechanism 2. A boom 4 extends from the upper-part turning body 3. An arm 5 is connected to the end of the boom 4. Further, a bucket 6 is connected to the end of the arm 5. The boom 4, the arm 5, and the bucket 6 are hydraulically driven by a boom cylinder 7, an arm cylinder 8, and a bucket cylinder 9, respectively. Further, a cabin 10 and power sources (not graphically illustrated) are mounted on the upper-part turning body 3.

Figure 2:
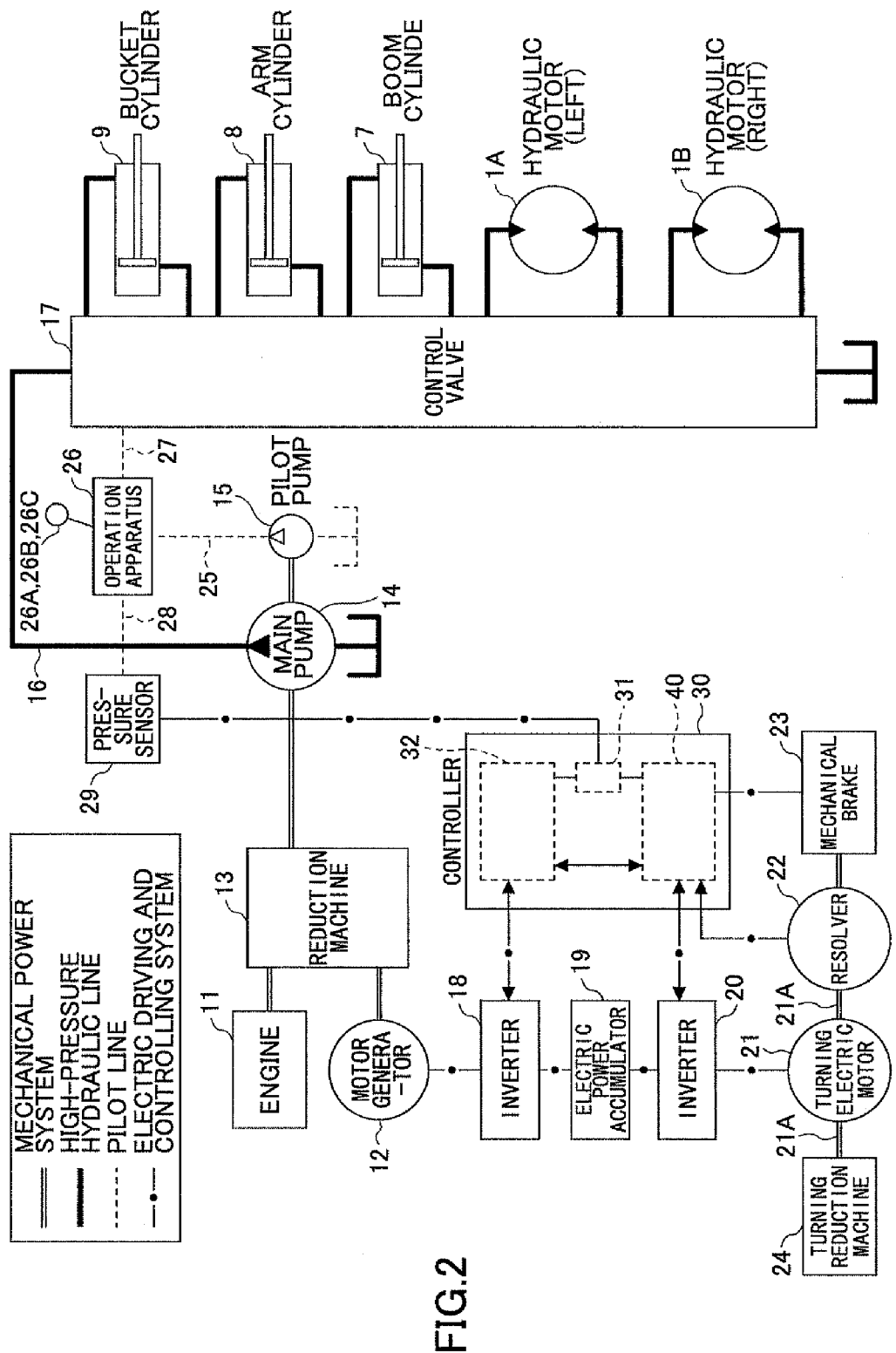
FIG. 2 is a diagram illustrating a drive train of the power shovel illustrated in FIG. 1.

FIG. 2 is a diagram illustrating a drive train of the power shovel illustrated in FIG. 1. Referring to FIG. 2, a double line, a solid line, a broken line, and a one-dot-chain line indicate a mechanical power system, a high-pressure hydraulic line, a pilot line, and an electric drive and control system, respectively.

An engine 11 as a mechanical drive part and a motor generator 12 as an assist drive part are both connected to the input shafts of a reduction machine 13 as a power-up machine. A main pump 14 and a pilot pump 15 are connected to an output shaft of the reduction machine 13. A control valve 17 is connected to the main pump 14 via a high-pressure hydraulic line 16.

The control valve 17 is a control unit that controls a hydraulic system. Hydraulic motors 1A (for the right) and 1B (for the left) for the lower-part traveling body 1, a boom cylinder 7, an arm cylinder 8, and a bucket cylinder 9 are connected to the control valve 17 via the high-pressure hydraulic line 16.

A battery 19 as an electric power accumulator is connected to the motor generator 12 via an inverter 18. A turning electric motor 21 is connected to the battery 19 via an inverter 20. The turning electric motor 21 is an electrical load in the hybrid shovel. A resolver 22, a mechanical brake 23, and a turning reduction machine 24 are connected to a rotation shaft 21A of the turning electric motor 21. An operation apparatus 26 is connected to a pilot pump 15 via a pilot line 25. The control valve 17 and a pressure sensor 29 as a lever operation detecting part are connected to the operation apparatus 26 via hydraulic lines 27 and 28, respectively. The pressure sensor 29 is connected to a controller 30 that controls an electric power train.

The hybrid hydraulic shovel having the above-described configuration is a hybrid working machine that uses the engine 11, the motor generator 12, and the turning electric motor 21 as power sources. These power sources are mounted on the upper-part turning body 3 illustrated in FIG. 1. A description is given below of each part.

The engine 11 such as an internal combustion engine is, for example, a diesel engine. The output shaft of the engine 11 is connected to one of the input shafts of the reduction machine 13. The engine 11 is constantly operated during the operation of the working machine.

The motor generator 12 may carry out both of a power running operation and a regenerating operation. Here, the motor generator 12 may be driven by the inverter 20. This motor generator 12 may be constituted of, for example, an IPM (Interior Permanent Magnet) motor having magnets embedded in a rotor. The rotation shaft of the motor generator 12 is connected to the other of the input shafts of the reduction machine 13.

The reduction machine 13 has the two input shafts and the one output shaft. The two input shafts are connected to the drive shaft of the engine 11 and the drive shaft of the motor generator 12, respectively. Further, the output shaft of the reduction machine 13 is connected to the drive shaft of the main pump 14. When the load on the engine 11 is heavy, the motor generator 12 carries out a power running operation to transmit driving force of the motor generator 12 to the main pump 14 via the output shaft of the reduction machine 13. With this, the engine 11 is assisted by the motor generator 12. On the other hand, when the load on the engine 11 is light, part of the driving force of the engine 11 is transmitted to the motor generator 12 via the reduction machine 13. Thus, the motor generator generates electric power with the regenerating operation. The power running operation and the regenerating operation of the motor generator 12 are switched by the controller 30 depending on the load on the engine 11 or the like.

The main pump 14 is a hydraulic pump that generates a hydraulic pressure to be supplied to the control valve 17. The hydraulic pressure generated by the main pump 14 is supplied to the hydraulic motors 1A and 1B, the boom cylinder 7, the arm cylinder 8, and the bucket cylinder 9 via the control valve 17 in order to drive the hydraulic motors 1A and 1B, the boom cylinder 7, the arm cylinder 8, and the bucket cylinder 9, which are hydraulic loads. The pilot pump 15 is a pump that generates a pilot pressure necessary for a hydraulic operation power train.

The control valve 17 is a hydraulic pressure control unit that hydraulically controls driving of the hydraulic motors 1A and 1B for the lower-part traveling body 1, the boom cylinder 7, the arm cylinder 8, and the bucket cylinder 9, which are connected via the high-pressure hydraulic line 16 to the main pump 14, by controlling the hydraulic pressure to be supplied to each of them in response to an input operation by an operator.

The inverter 18, which is provided between the motor generator 12 and the battery 19 as described above, controls the operation of the motor generator 12 based on commands from the controller 30. With this, when the inverter 18 controls power running (rotation) of the motor generator 12, the inverter 18 supplies necessary electric power to the motor generator 12 from the battery 19. While the regeneration with the motor generator 12 is being controlled, the inverter 18 charges the electric power accumulator 19 with the electric power generated by the motor generator 12.

The electric power accumulator 19, which includes the battery, is provided between the inverter 18 and the inverter 20. When at least one of the motor generator 12 and the turning electric motor 21 carries out the power running operation, the power for the power running operation is supplied by the electric power accumulator 19. Meanwhile, when at least one of the motor generator 12 and the turning electric motor 21 carries out the regenerating operation, the regenerated electric power generated by the regenerating operation is stored by the electric power accumulator 19.

The inverter 20, which is provided between the turning electric motor 21 and the electric power accumulator 19 as described above, controls the operation of the turning electric motor 21 based on commands from the controller 30. Thus, during the power running operation of the turning electric motor 21, electric power is supplied from the electric power accumulator 19 to the turning electric motor 21. Further, during the regenerating operation of the turning electric motor 21, the electric power accumulator 19 is charged with the electric power generated by the turning electric motor 21.

The turning electric motor 21 may be an electric motor capable of both a power running operation and a regenerating operation, and is provided to drive the turning mechanism 2 of the upper-part turning body 3. At the time of the power running operation, the rotational drive force of the turning electric motor 21 is amplified by the reduction machine 24, and the rotational movement of the upper-part turning body is controlled to accelerate or decelerate. Further, the revolution speed of the turning electric motor 21 is increased by the reduction machine 24 when the inertial rotation of the upper-part turning body 3 is transmitted to the turning electric motor 21 via the reduction machine 24, whereby the regenerated electric power is obtainable. Here, an electric motor ACdriven by the inverter 20 based on a PWM (Pulse Width Modulation) control signals is illustrated as the turning electric motor 21. This turning electric motor 21 may be constituted of, for example, an IPM motor of a magnet embedded type. With this, it is possible to generate greater induced electromotive force. Therefore, the power generated by the turning electric motor 21 can be increased at the time of the regeneration.

The electric power accumulator 19 is controlled to be charged or discharged by the controller 30 based on a charge state of the battery in the electric power accumulator 19, a running state of the motor generator 12 (the power running operation or the regenerating operation), and a running state of the turning electric motor 21 (the power running operation or the regenerating operation).

The resolver 22 is a sensor for detecting a rotational position and a rotational angle of the rotation shaft 21A of the turning electric motor 21. The resolver 22 is mechanically coupled to the turning electric motor 21. By detecting differences between the rotational position of the rotation shaft 21A before the rotation of the turning electric motor 21 and the rotational position after rotating left or right, the rotational angle and the rotational direction of the rotation shaft 21A can be detected. By detecting the rotational angle of the rotation shaft 21A of the turning electric motor 21, the rotational angle and the rotational direction of the turning mechanism 2 can be obtained.

The mechanical brake 23 generates mechanical braking force and mechanically stops the rotation shaft 21A of the turning electric motor 21. Breaking and releasing of the mechanical brake 23 is changed over by an electromagnetic switch. The electromagnetic switch is changed over by the controller 30.

The turning reduction machine 24 reduces the revolution speed of the rotation shaft 21A of the turning electric motor 21 to mechanically transmit the rotation to the turning mechanism 2. With this, the rotational force of the turning electric motor 21 is increased in the power running operation and transmitted to a rotating body as greater rotational force. On the contrary thereto, in the regenerating operation, the revolution speed generated in the rotational body is increased to generate various rotational movements with the turning electric motor 21.

The turning mechanism 2 is enabled to rotate when the mechanical brake 23 of the turning electric motor 21 is released. With this, the upper-part turning body 3 rotates rightward or leftward.

The operation apparatus 26, which is an input device for an operator of the hybrid hydraulic shovel to operate the turning electric motor 21, the lower-part traveling body 1, the boom 4, the arm 5, and the bucket 6, includes levers 26A and 263 and pedals 26C. The lever 26A, which is a lever for operating the turning electric motor 21 and the arm 5, is provided near a driver's seat in the upper-part turning body 3. The lever 26B, which is a lever for operating the boom 4 and the bucket 6, is provided near the driver's seat. The pedals 26C, which are a pair of pedals for operating the lower-part traveling body 1, are provided at the foot of the driver's seat.

The operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs it. The secondary-side hydraulic pressure output from the operation apparatus 26 is supplied to the control valve 17 through the hydraulic line 27, and is also detected by the pressure sensor 29.

When the levers 26A and 26B and the pedal 26C are operated, the control valve 17 is driven via the hydraulic line 27, so that the hydraulic pressures inside the hydraulic motors 1A and 1B, the boom cylinder 7, the arm cylinder 8, and the bucket cylinder 9 are controlled. Thus, the lower-part traveling body 1, the boom 4, the arm 5, and the bucket 6 are driven.

The hydraulic line 27, which is actually composed of eight hydraulic lines in total: two each for operating the hydraulic motors 1A and 1B (that is, two in total) and two each for operating the boom cylinder 7, the arm cylinder 8, and the bucket cylinder 9 (that is, six in total), is illustrated as a single hydraulic line for convenience in FIG. 2.

In the pressure sensor 29 as a lever operation detecting part, a change in the hydraulic pressure inside the hydraulic line 28 due to the turning operation of the lever 26A is detected. The pressure sensor 29 outputs an electrical signal representing the hydraulic pressure inside the hydraulic line 28. This electrical signal is input to the controller 30. This makes it possible to determine the amount of turning operation of the lever 26A with accuracy. Further, while the pressure sensor is used as the lever operation detecting part in this embodiment, a sensor may alternatively be used that reads the amount of turning operation of the lever 26A directly as an electrical signal.

The controller 30 controls driving of the power shovel and includes a speed command converting unit 31, a drive control unit 32 and a rotational drive control unit 40. The controller 30 is made of an arithmetic processing unit including a Central Processing Unit (CPU) and an internal memory. The speed command converting unit 31, the drive control unit 32 and the rotational drive control unit 40 are realized by executing a program for controlling driving of these stored in the internal memory with the CPU of the controller 30.

The speed command converting unit 31 converts a signal input from the pressure sensor 29 to a speed command. The operation amount of the lever 26A is converted to the speed command (rad/s) for rotating the turning electric motor 21. The speed command is input into the drive control unit 32 and the rotational drive control unit 40.

The hybrid working machine of the embodiment of the present invention is described with reference to the driving control of the power shovel.

Figure 3:
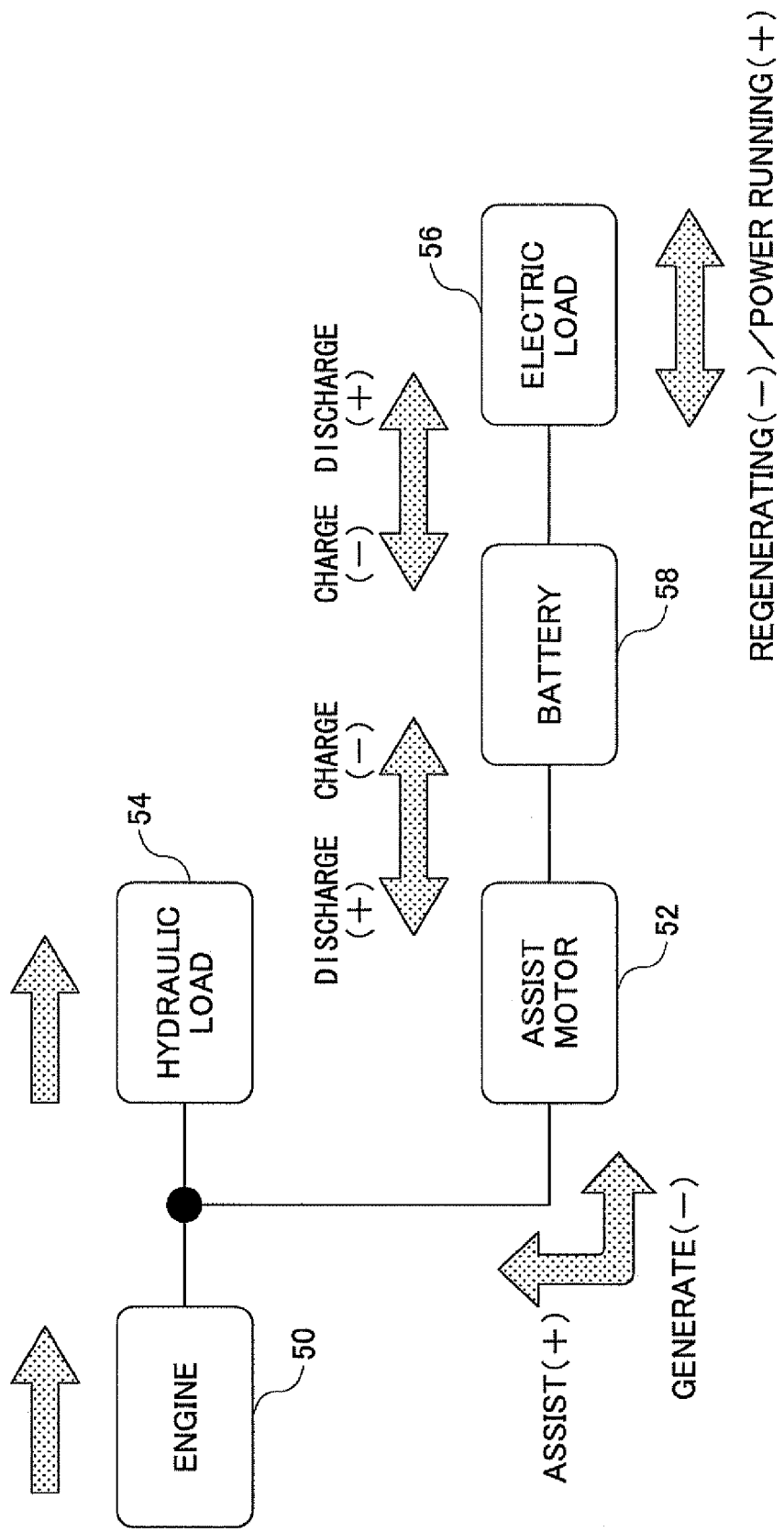
FIG. 3 is a diagram illustrating a modeled power train of the power shovel illustrated in FIG. 1.

FIG. 3 is a diagram illustrating a modeled power train of the above described power shovel. Referring to FIG. 3, the engine 50 corresponds to the engine 11 illustrated in FIG. 2, and the assist motor 52 corresponds to the motor generator 12 having both the functions of the electric motor and the generator. The hydraulic load 54 corresponds to components driven with hydraulic pressure, and includes the above-described boom cylinder 7, the arm cylinder 8, the packet cylinder 9, and the hydraulic motors 1A and 1B. In an aspect of the load for generating the hydraulic pressure, the hydraulic load 54 corresponds to the main pump 14 as a hydraulic pump for generating the hydraulic pressure. An electric load 56, which corresponds to components driven with electric power, such as an electric motor and an electric actuator, includes the above described turning electric motor 21. A battery 58 is an electric power accumulator provided in the above described electric power accumulator 19. With Embodiment 1, a capacitor (an electric double layer capacitor) is used as the battery 58.

The hydraulic pressure generated by the hydraulic pump (the main pump 14) for generating the hydraulic pressure is supplied to the hydraulic load 54. The engine 50 supplies the motive power to the hydraulic pump to drive the hydraulic pump. Said differently, the motive power generated by the engine 50 is converted into the hydraulic pressure by the main pump 14, and the converted power is supplied to the hydraulic load 54.

Meanwhile, the assist motor 52 is connected to the hydraulic pump to supply the motive power generated by the assist motor 52 to the hydraulic pump. Therefore, the hydraulic pump may be driven by the assist motor 52. The electric power supplied to the assist motor 52 may be converted to the motive power by the assist motor 52, and the converted power is converted to the hydraulic pressure so as to be supplied to the hydraulic load 54. At this time, the assist motor 52 functions as the electric motor.

The electric power is supplied from the battery 58 of the electric power accumulator 19 to the electric load 56 and driven. In the power running operation, the electrical load 56 is driven. The electric load 56 can generate the regenerated electric power as machinery being both an electric motor and a generator. The regenerated electric power is supplied to the electric power accumulator and stored by the battery 58 or supplied to the assist motor 52 to drive the assist motor 52.

The battery 58 is charged by the regenerated electric power from the electric load 56 as described above. Further, when the assist motor functions as the generator of receiving the motive power from the engine 50, it is also possible to supply the electric power generated by the assist motor 52 to the electric power accumulator 19 to charge the battery 58. The electric power generated by the assist motor 52 may drive the electric load 56 by directly supplying the electric power to the electric load 56. With the above structure, movement of the electric power (motive power) shows directionality. Referring to FIG. 4, the directionality is indicated by an output polarity.

As to the assist motor 52, when the engine 50 is assisted by the assist motor 52 to generate the hydraulic power and to supply the motive power to the hydraulic load 54, the electric power is output as the motive power. In this case, the output polarity of the assist motor 52 is determined to be (+). On the other hand, when the assist motor 52 is driven by the driving force of the engine 50 to generate the electric power, the motive power is input in the assist motor 52. In this case, the output polarity of the assist motor 52 is determined to be (−).

As to the battery 58 of the electric power accumulator 19, when the battery 58 discharges to drive the electric load 56 or the assist motor 52, the output polarity becomes (+). On the other hand, there is a case where the regenerated electric power is supplied from the electric load 56 or the generated electric power is supplied from the assist motor 52 to charge the battery 58. The output polarity of the battery 58 becomes (−).

Referring to the electric load 56, when the electric power is supplied and driven, said differently, when the output polarity in a case where a power running operation is carried out, provided that the output polarity is determined to be (+), the output polarity in generating the regenerated electric power becomes (−).

As described, in the hybrid power shovel, an operating condition may be determined by considering operating states of the assist motor 52 and the electric load 56 being constitutional components related to the electric power and a charging state of the battery 58 of the electric power accumulator 19. Especially, it is important to control the distribution of outputs to the hydraulic load 54 and the electric load 56 by adjusting the output polarity of the assist motor 52 so that the battery is constantly and appropriately charged.

The following seven variables are used for the control.

1) Actual Engine Revolution Speed Nengact

The actual engine revolution speed Nengact indicates the actual revolution speed of the engine 50. The engine 50 is constantly driven when the power shovel is operated and actual engine revolution speed Nact is detected.

2) Required Hydraulic Load Output Phydreq

The required hydraulic load output Phydreq is a variable indicative of the motive power for the hydraulic load 54. For example, the variable corresponds to an operating amount of an operating lever operated by an operator of the power shovel.

3) Required Electric Load Output Pelcreq

The required electric load output Pelcreq is a variable indicative of the power for the electric load 56. For example, the variable corresponds to an operating amount of an operating lever operated by the operator of the power shovel.

4) Battery Voltage Vact

The battery voltage Vact is a variable indicative of the output voltage of the battery 58. With Embodiment 1, the electric power accumulator 18 is used as the battery. The amount of charge of a capacitor is proportional to a square value of a difference of terminal voltages. Therefore, it is possible to know a charging state (a charge rate SOC) of the battery 58 by detecting the output voltage.

5) Actual Engine Output Pengact

The actual engine output Pengact is an actually measured value of the engine 50 and obtained from a product of the revolution number and the torque of the engine 500.

6) Target Engine Revolution Speed Nengref

The engine 50 is controlled to constantly rotate at a predetermined revolution speed. The predetermined revolution speed is the target engine revolution speed Nengref.

7) Actual Assist Motor Revolution Speed Nasmact

The actual assist motor revolution speed Nasmact is a variable indicative of the actual revolution speed of the assist motor 52. The assist motor 52 is connected to the engine 50, and constantly driven at a time of operating the power shovel. Therefore, the actual assist motor revolution speed Nasmact is detectable.

Based on these seven variables, the following outputs are controlled to attain the optimum operating condition.

1) Hydraulic Load Actual Output Phydout

The hydraulic load actual output Phydout is motive power actually supplied to the hydraulic load in response to the required hydraulic load output Phydreq. If the motive power required by the required hydraulic load output Phydreq is constantly supplied, a demand for the electric load 56 which is simultaneously operated may not be satisfied, and a charging rate SOC of the battery 58 may not be maintained in an appropriate range. Therefore, there may be a case where the motive power actually supplied to the hydraulic load 54 is limited to a certain extent.

2) Electric Load Actual Output Pelcout

The electric load actual output Pelcout is an electric power actually supplied in response to the required electric load output Pelcreq. If the power required by the required electric load output Pelcreq is constantly supplied, a demand for the hydraulic load 54 which is simultaneously operated may not be satisfied, and a charging rate SOC of the battery 58 may not be maintained in an appropriate range. Therefore, there may be a case where the electric power actually supplied to the electric load 56 is limited to a certain extent.

3) Assist motor output command Pasmref

Figure 5:
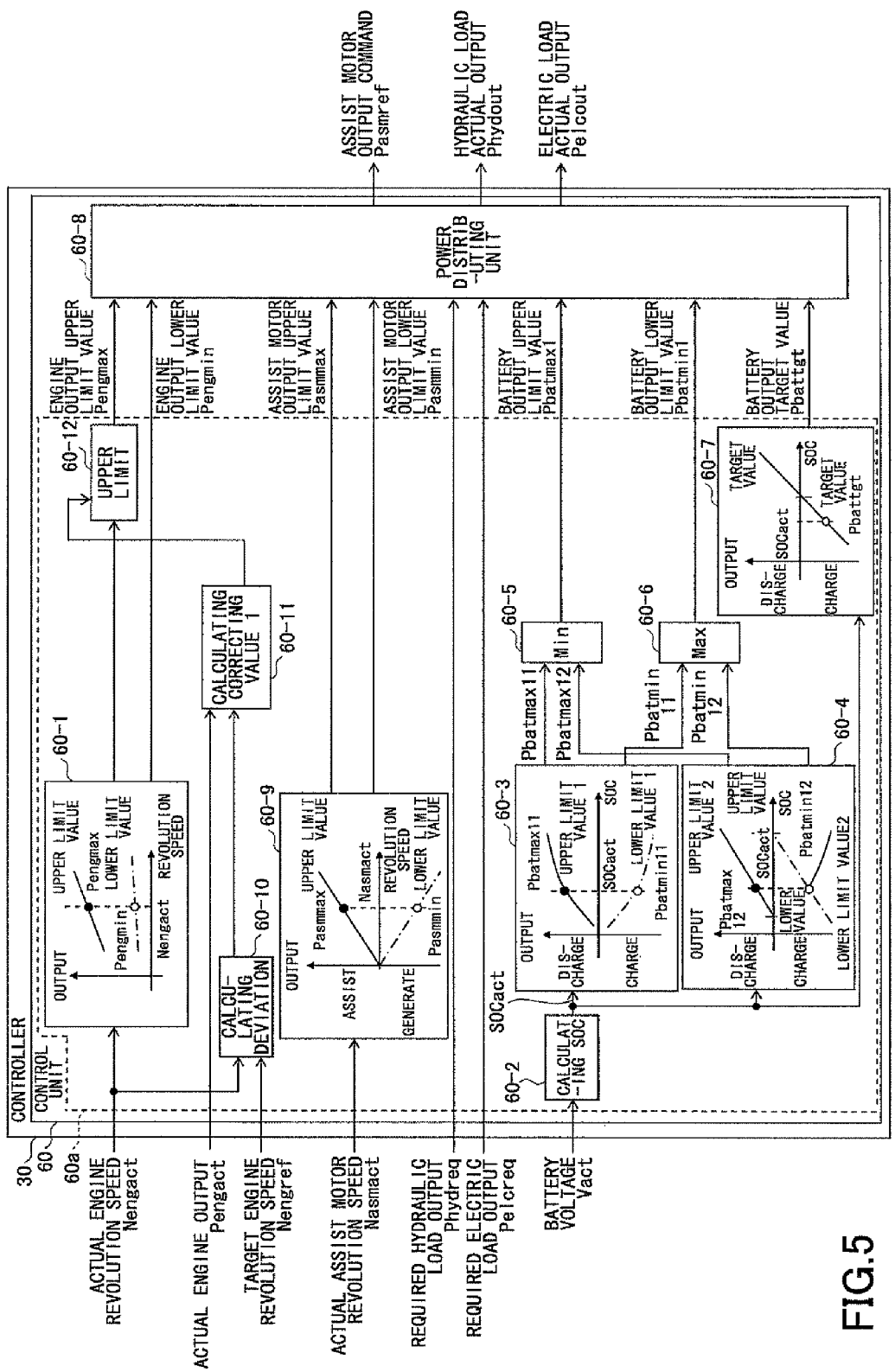
FIG. 5 is a functional block chart of a control unit included in a controller described in Embodiment 1 of the present invention.

The assist motor output command Pasmref is a value indicative of the output of the assist motor 52. With the assist motor output command Pasmref, it is instructed whether the assist motor 52 functions as an electric motor to assist the engine 50 to supply the motive power to the hydraulic load 54 or a generator to charge the battery 58 for supplying the electric power to the electric load 56. The drive control unit 32 included in the controller 30 controls the hydraulic load actual output Phydout, the electric load actual output Pelcout, and the assist motor output command Pasmref based on the actual engine revolution speed Nact, the required hydraulic load output Phydreq, the required electric load output Pelcreq, the battery voltage Vact, the actual engine output Pengact, the target engine revolution speed Nengref, and the actual assist motor revolution speed Nasmact. Hereinafter, the drive control unit 32 is referred to as the control unit 60 for convenience. FIG. 5 is a functional block chart of a control unit 60 included in a controller 30 described in Embodiment 1 of the present invention. Referring to FIG. 5, the control function of the control unit 60 is described in detail.

The control unit 60 includes an output condition calculating unit 60a and a power distributing unit 60-8. The output condition calculating unit 60a includes blocks 60-1 to 60-12 and calculates an upper and lower limit value being output conditions of the engine 50 and the battery 58.

An actual engine revolution speed Nengact input in the output condition calculating unit 60a of the control unit 60 is input in a block 60-1. The block 60-1 determines the upper and lower limit values Pengmax and Pengmin of the input actual engine revolution speed Nengact output in response to the actual engine revolution speed Nengact. A block 60-8 functions as the power distributing unit receives the upper and lower limit values Pengmax and Pengmin. Referring to FIG. 5, the block 60-1 includes a map or a conversion table indicating the upper and lower limit values in a relation between the revolution speed and output of the engine 50. The block 60-1 determines the upper and lower limit values Pengmax and Pengmin of the input actual engine revolution speed Nengact output by referring to the map or the conversion table. The map and the conversion table may be previously made and stored in a memory of the controller 30. The map and the conversion table may not be used. The actual engine revolution speed Nengact may be input into formulas for obtaining the upper limit value and the lower limit value may be used to obtain the upper limit value Pengmax and the lower limit value Pengmin. A required hydraulic load output Phydreq and a required electric load output Pelcreq may be input in the block 60-8 as the power distributing unit of the control unit 60.

The battery voltage Vact input in the output condition calculating unit 60a of the control unit 60 is input in a block 60-2. A present charging rate SOCact of the battery 58 is obtained from the input battery voltage Vact. The obtained present charging rate SOCact is output to blocks 60-3, 60-4 and 60-7. With Embodiment 1, because a capacitor is used as the battery 58, it is possible to easily obtain the charging rate from the measured battery voltage (the voltage between the terminals of the capacitor) with operations.

The block 60-3 obtains a battery output upper limit value Pbatmax11, which is the maximum value of the discharge power which can be presently dischargeable, and a battery output lower limit value Pbatmin11, which is the maximum value of the charge power which can be presently chargeable from the present charging rate SOCact and a predetermined maximum discharge current. Referring to FIG. 5, the block 60-3 stores a map or a conversion table indicating a maximum charging power [kW] and a maximum discharging power [kW] exerted under a predetermined constant current with the charging rate SOC. The map in the block 60-3 illustrates a power (a maximum charging and discharging current×a capacitor voltage) determined at a time of applying maximum charging and discharging current which is limited by capabilities of the converter and of the capacitor at the certain charging rate SOC. Because the charging rate SOC is proportional to the square of the charging and discharging voltage (capacitor voltage), the maximum charging power and the maximum discharging power in the block 60-3 form parabolas.

As described the block 60-3 obtains the maximum discharging power (battery output upper limit value Pbatmax11) and the maximum charging power (battery output lower limit value Pbatmin11) which are allowed under the predetermined electric current at the present charging rate SOCact by referring to the map or the conversion table. The obtained maximum discharging power (the battery output upper limit value Pbatmin11) is output to a block 60-5. The obtained maximum charging power (the battery output lower limit value Pbatmin11) is output to a block 60-6.

The block 60-4 obtains the maximum value of the discharging current which can be presently discharged (a battery output upper limit value Pbatmax12) and the minimum value of the charging current which can be presently charged (a battery output lower limit value Pbatmin12) based on the presently input charging rate SOCact, the predetermined SOC lower limit value and the predetermined SOC upper limit value. Referring to FIG. 5, the block 60-4 stores a map or a conversion table indicating the maximum discharging power [kW] and the maximum charging power [kW] with which the battery charging rate (SOC) does not become the SOC lower limit value or less and the SOC upper limit value or more.

Said differently, the map of the block 60-4 indicates an appropriate charging and discharging power relative to the charging rates SOC. The lower limit value in the map of the block 60-4 is set to avoid the charging rate from becoming zero as a margin. If the charging rate decreases to be zero or a value close to zero, discharge may not occur when requested. Therefore, it is preferable to maintain the battery so as to be charged to a certain extent. Therefore, the lower limit value (e.g., 30%) of the charging rate SOC may be determined to prevent the battery from discharging when the charging rate SOC is the lower limit value or less. Therefore, the maximum discharging power (a dischargeable maximum power) is zero at the lower limit value of the charging rate SOC. The greater the charging rate SOC becomes, the greater a margin of the dischargeable power becomes. Therefore, the maximum discharging power may be increased. In the map of the block 60-4, the maximum discharging power linearly increases after the lower limit value of the charging rate SOC. However, it is not limited to the linear increment, and an arbitrary pattern of the increment may be employed.

On the other hand, for example, when the charging rate SOC is 100% and the regenerated electric power is generated by the electric load, the electric power accumulator may not immediately absorb the regenerated electric power. Therefore, the upper limit value (e.g., 90%) is determined so as not to be 100%. The charge is controlled so as not to be done at the charging rate SOC of the upper limit value or more. Therefore, the maximum charging power (a chargeable maximum power) becomes zero at the upper limit value of the charging rate SOC. The smaller the charging rate SOC becomes, the smaller a margin of the dischargeable power becomes. Therefore, the maximum discharging power may be increased. In the map of the block 60-4, the maximum charging power linearly increases after the upper limit value of the charging rate SOC. However, it is not limited to the linear increment, and an arbitrary pattern of the increment may be employed.

As described, the block 60-4 obtains the maximum discharging power (battery output upper limit value Pbatmax12) and the maximum charging power (battery output lower limit value Pbatmin12) which are allowed at the present charging rate SOCact by referring to the map or the conversion table.

The obtained maximum discharging power (the battery output upper limit value Pbatmax12) is output to the block 60-5. The obtained maximum charging power (the battery output lower limit value Pbatmin12) is output to the block 60-6.

The block 60-5 outputs a smaller one of the battery output upper limit value Pbatmax11 supplied from the block 60-3 and the battery output upper limit value Pbatmax12 supplied from the block 60-4 to the block 60-8 as the battery output upper limit value Pbatmax1 to the block 60-8 as the power distributing unit. The block 60-5 functions as a minimum value selector.

Meanwhile, the block 60-6 outputs a greater one of the battery output lower limit value Pbatmin11 supplied from the block 60-3 and the battery output lower limit value Pbatmin12 supplied from the block 60-4 to the block 60-8 as the battery output lower limit value Pbatmin1 to the block 60-8 as the power distributing unit. Because a negative battery output value corresponds to a charging state, if the battery output lower limit value is great, the battery output value is close to zero (being small in its absolute value). With this, it is possible to protect the block 60-8 from excessive discharge exceeding the output capability of the battery 19. The block 60-6 functions as a maximum value selector.

As described, it is possible to obtain the maximum power with which charge and discharge can be done depending on the charging state of the battery 58.

The block 60-7 obtains a battery output target value Pbattgt for the charging rate SOC based on the presently input charging rate SOCact and the predetermined SOC target value. Referring to FIG. 5, the block 60-7 stores a map or a conversion table indicating the battery output target value Pbattgt at the charging rate used for approaching the SOC target value. The block 60-7 refers to the map or the conversion table to obtain a charge power indicating how much the electric power is to be charged and a discharge power indicating how much the electric power is to be discharged to make the charging rate be an optimum target value by referring to the map or the conversion table.

The output along the axis of ordinate in the map referred by the block 60-7 is zero when there is no charge and discharge. The charging state corresponds to minus the discharging state corresponds to plus. Referring to FIG. 5, the present charging rate SOCact is smaller than the target value. Therefore, the battery 58 needs to be charged, and a charging power target value, namely a battery output target value Pbattgt is indicated. A positive value of the battery output target value Pbattgt represents a target discharging power, and a negative value of the battery output target value Pbattgt represents a target charging power. The battery output target value Pbattgt obtained in the block 60-7 is output to the block 60-8 as the power distributing unit.

The block 60-9 obtains an assist motor output lower limit value Pasmmin and an assist motor output upper limit value Pasmmax in the presently input actual assist motor revolution speed Nasmact from a previously prepared map or conversion table. Referring to FIG. 5, the upper limit and the lower limit of the output relative to the revolution speed of the assist motor 52 are illustrated in the map and the conversion table. The upper limit value designates the maximum assisting capacity (electromotive capacity) powered by the assist motor 52, and the lower limit value designates the maximum electric-generating capacity with the assist motor 52. The block 60-9 outputs the lower limit value Pasmmin and the upper limit value Pasmmax of the output of the obtained assist motor 52 to the power distributing unit 60-8.

In addition to the function block described above, the following function block is provided in Embodiment 1. The function block described below is provided to rapidly recover the revolution speed of the engine 50 to the target revolution speed Nengref by limiting the output upper limit value Pengmax of the engine to prevent engine stall when the revolution speed of the engine 50 decreases.

A block 60-10 calculates a deviation between a deviation Nengerr between the input target engine revolution speed Nengref and the actual engine revolution speed Nengact. A block 60-11 calculates a correcting value 1 from the input actual engine output Pengact and a deviation Nengerr supplied from a block 60-10, and outputs the correcting value 1 to the block 60-12.

A block 60-12 compares the engine output upper limit value Pengmax1 supplied from the block 60-1 with the correcting value 1 supplied from the block 60-11, and outputs the engine output upper limit value Pengmax1 without change to the power distributing unit 60-8 when the engine output upper limit value Pengmax1 is the correcting value 1 or less. On the other hand, when the engine output upper limit value Pengmax1 is the correcting value 1 or more, the block 60-12 outputs the correcting value 1 as the engine output upper limit value instead of the engine output upper limit value Pengmax to the power distributing unit 60-8. Said differently, the block 60-12 limits the engine output upper limit value Pengmax so as not to exceed the correcting value 1.

A limitation of the engine output upper limit value Pengmax is described further in detail.

Figure 6:
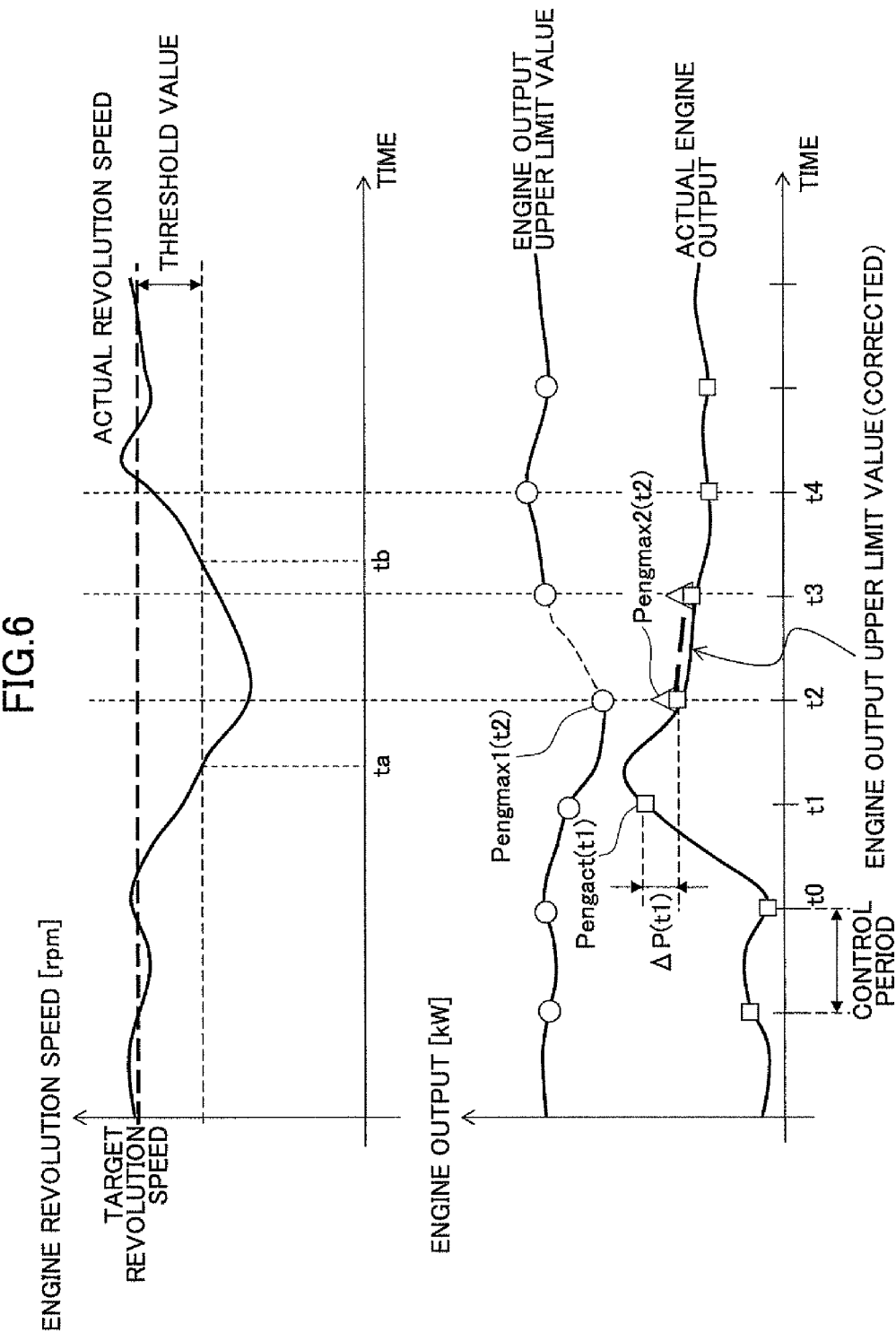
FIG. 6 is a graph illustrating a change of an engine output upper limit value Pengmax, a change of an actual engine output Pengact, and an actual engine revolution speed Nengact by associating these.

FIG. 6 is a graph illustrating a change of the upper limit value Pengmax of the engine, a change of an actual engine output Pengact, and an actual engine revolution speed Nengact by associating these. With the graph in FIG. 6, because the load on the engine increases after the time t0, the actual engine output Pengact rapidly increases. Along with the increment of the engine load, the actual engine revolution speed Nengact starts to decrease from the target revolution speed Nengref after the time t0. The increment of the actual engine output Pengact until the time t1 after one control period. Along with this, the actual engine revolution speed Nengact continues to decrease. However, a deviation Nengerr between the actual engine revolution speed Nengact and the target engine revolution speed Nengref should not exceed a threshold value. With the decrement of the actual engine revolution speed Nengact from the time t0 to the time t1, the engine output upper limit value Pengmax1 determined in the block 60-1 gradually decreases to suppress the engine output and increase the actual engine revolution speed Nengact.

The incrementing of the engine output continues after the time t1. The actual engine revolution speed Nengact further decreases along with this. If the actual engine revolution speed Nengact continues to decrease, the engine may not hold the load to thereby cause the engine stall. With Embodiment 1, when the deviation Nengerr between the actual engine revolution speed Nengact and the target engine revolution speed Nengref exceeds the threshold value, the engine output upper limit value Pengmax is set to be an engine output upper limit value Pengmax2 smaller than the engine output upper limit value Pengmax1 determined by the block 60-1 to thereby forcibly reduce the load on the engine. The engine output upper limit value Pengmax2 corresponds to the correcting value 1 calculated in the block 60-11.

Referring to FIG. 6, a deviation Nengerr between the actual engine revolution speed Nengact and the target engine revolution speed Nengref increases beyond the threshold value from the time to between the time t1 and the time t2. At the time t2, the Nengerr between the actual engine revolution speed Nengact and the target engine revolution speed Nengref is larger than the threshold value. With Embodiment 1, it is determined that the engine output upper limit value Pengmax (=Pengmax1) may not sufficiently decrease the load on the engine. Then, the engine output upper limit value Pengmax is forcibly changed from the engine output upper limit value Pengmax1 to the engine output upper limit value Pengmax2 smaller than the engine output upper limit value Pengmax1. At the time t2, the engine output upper limit value Pengmax is changed from the engine output upper limit value Pengmax1 to the engine output upper limit value Pengmax2 smaller than the engine output upper limit value Pengmax1. Said differently, by setting the engine output upper limit value Pengmax to be the engine output upper limit value Pengmax2 smaller than the engine output upper limit value Pengmax1 which can be obtained from the revolution speed of the engine, the engine output upper limit value Pengmax2 after the change is input in the power distributing unit 60-8. With this, the hydraulic load Phydout calculated by the power distributing unit 60-8 is reduced, or an assist motor output command Pasmref for increasing the assist power is output to thereby forcibly reduce the load on the engine and to prompt recovery of the revolution speed of the engine to the target engine revolution speed Nengref.

Between the time t2 to the time t3, because the engine output upper limit value Pengmax is set to be the engine output upper limit value Pengmax2, the load on the engine reduces to thereby increase the actual engine revolution speed Nengact. With this, it is possible to prevent the actual engine revolution speed Nengact from continuing to decrease thereby preventing the engine stall. At time tb, the actual revolution speed is recovered to be within a threshold value. At the time t4, the deviation Nengerr between the actual engine revolution speed Nengact and the target engine revolution speed Nengref is less than the threshold value. Therefore, it is determined that decrement of the revolution speed caused by an excessive overload of the engine disappears. Thus, the engine output upper limit value Pengmax is set to be the engine output upper limit value Pengmax1 again, and an ordinary control is retrieved.

Figure 7:
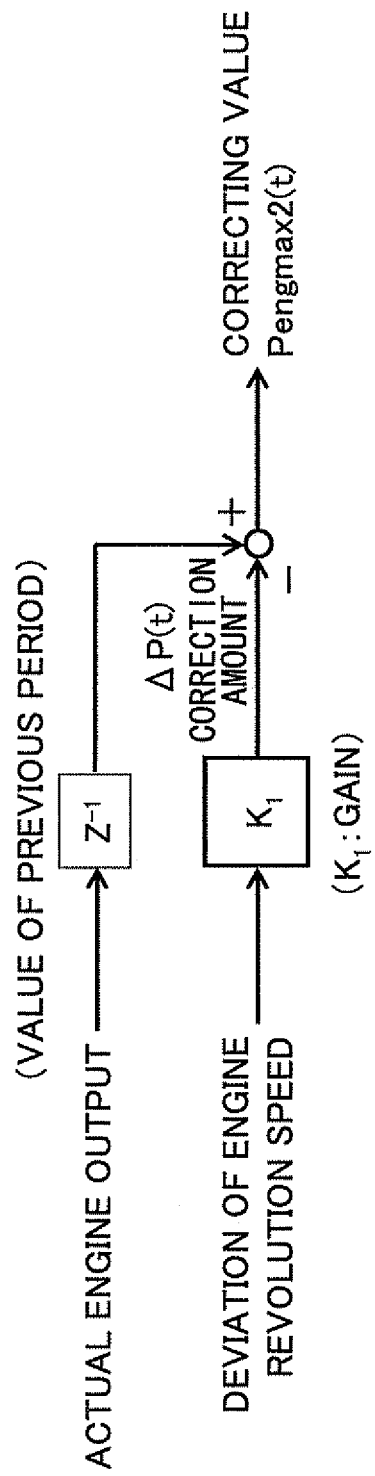
FIG. 7 illustrates a calculating method of an engine upper limit value Pengmax2.
Figure 8:
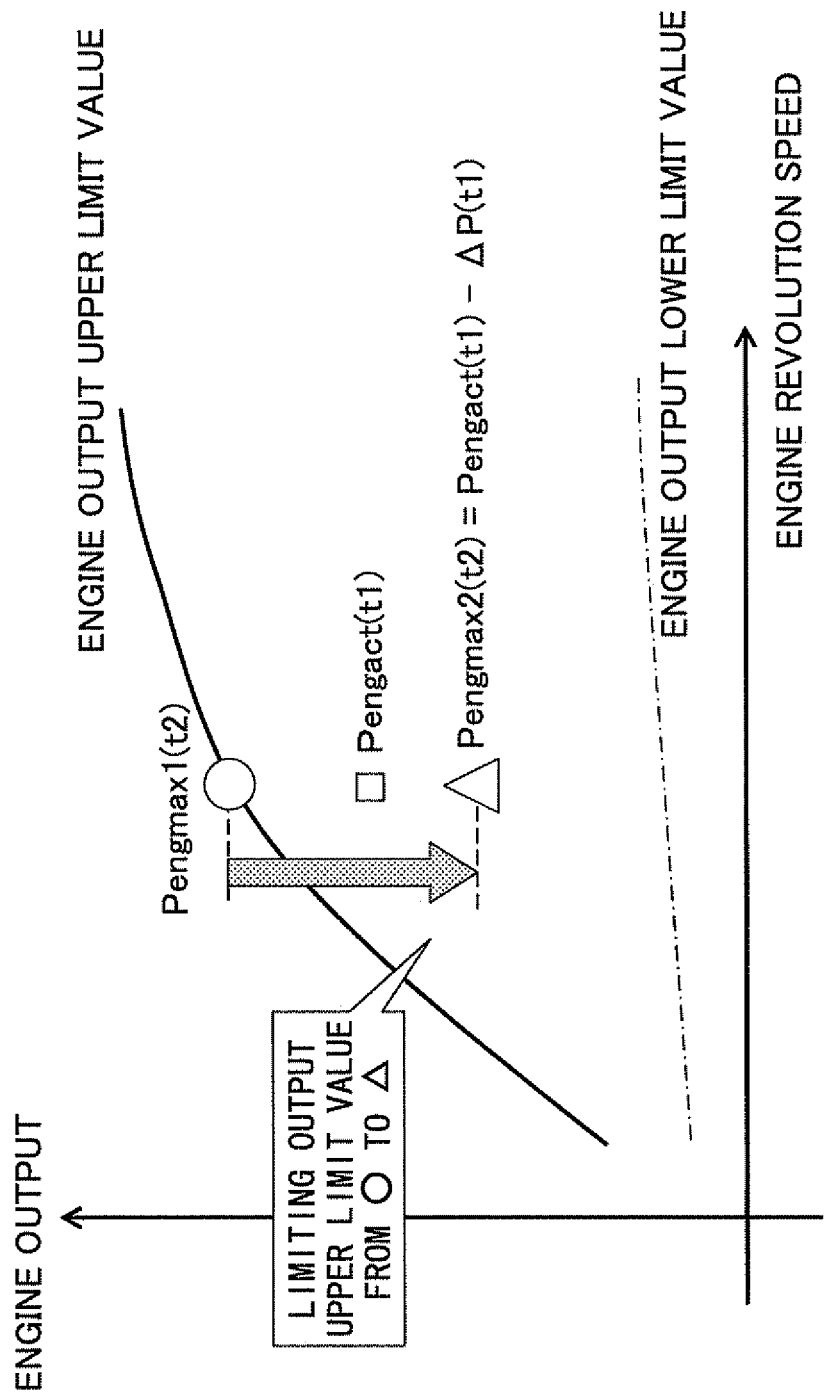
FIG. 8 is a graph illustrating a relationship among an engine output upper limit value Pengmax1($t1$), an actual engine output Pengact(t1), and an engine output upper limit value Pengmax2($t2$).

Referring to FIG. 6, FIG. 7 and FIG. 8, a method of determining the engine output upper limit value Pengmax2 is described. After the time t1, the actual engine revolution speed Nengact continues to decrease. This means that the revolution speed of the engine continues to decrease due to the excessive load on the engine even with the actual engine output Pengact limited to the engine output upper limit value Pengmax1 set at the time t1. Therefore, a value of the engine output upper limit value Pengmax2($t2$) at the time t2 obtained by subtracting a predetermined value $\Delta P(t1)$ from the actual engine output Pengact (t1) at the time t1 is set as the engine output upper limit value Pengmax2($t2$).

Referring to FIG. 7, the predetermined value $\Delta P(t1)$ is calculated by multiplying the deviation Nengerr between the actual engine revolution speed Nengact at the time t2 and the target engine revolution speed Nengref with a predetermined gain K1. Referring to FIG. 8, the value on the prior control period corresponds to the actual engine output Pengact(t1) at the time t1 based on the time t2. Therefore, the engine output upper limit value Pengmax2($t2$) calculated at the time t2 is obtained by subtracting a correcting value $\Delta P(t1)$ calculated by multiplying a predetermined gain K1 with the deviation Nengerr between the actual engine revolution speed Nengact and the target engine revolution speed Nengref at the time t2 from the actual engine output Pengact(t1) at the time t1. FIG. 8 is a graph for illustrating the engine output upper limit value Pengmax1 determined by the revolution speed of the engine. Referring to FIG. 8, the engine output upper limit value Pengmax1($t2$) determined at the time t2, the actual engine output Pengact(t1) and the engine output upper limit value Pengmax2($t2$) are illustrated. The actual engine output Pengact(t1) at the time t1 prior to the time t2 is smaller than the engine output upper limit value Pengmax1($t2$) at the time t2. Because the engine output upper limit value Pengmax2($t2$) at the time t2 is obtained by subtracting the correction amount $\Delta P(t1)$ from the actual engine output Pengact(t1) at the previous time t1, the engine output upper limit value Pengmax2($t2$) at the time t2 becomes further smaller than the actual engine output Pengact(t1).

Because the revolution speed of the engine decreases with the actual engine output Pengact(t1) at the time t1, the engine output upper limit value Pengmax2($t2$) at the time t2 is set to be smaller than the actual engine output Pengact(t1) to cause the changed engine output upper limit value Pengmax2 to be input in the power distributing unit 60-8. With this, the hydraulic load Phydout calculated by the power distributing unit 60-8 is reduced, or the assist motor output command Pasmref for increasing the assist power is output to thereby forcibly reduce the load on the engine and to prompt recovery of the target revolution speed of the engine to the target engine revolution speed Nengref. The correction amount $\Delta P(t1)$ is obtained by multiplying the deviation Nengerr between the actual engine revolution speed Nengact at the time t2 and the target engine revolution speed Nengref with a predetermined gain. Therefore, the correction amount $\Delta P(t1)$ reflects the deviation Nengerr between the actual engine revolution speed Nengact at the time t2 and the target engine revolution speed Nengref. Said differently, the correction amount $\Delta P(t1)$ reflects a degree of reducing the actual engine revolution speed Nengact relative to the target engine revolution speed Nengref. Therefore, the engine output upper limit value Pengmax2($t2$) at the time t2 is determined based on the degree of reducing the actual engine revolution speed Nengact relative to the target engine revolution speed Nengref. The engine output upper limit value Pengmax2($t$) illustrated in FIG. 7 is calculated in the block 60-11 illustrated in FIG. 6. In the block 60-12, the engine output upper limit value Pengmax2 (a value smaller than the engine output upper limit value Pengmax1 determined in the block 60-1) supplied from the block 60-11 is determined as the engine output upper limit value Pengmax and is output to the power distributing unit 60-8.

As described, the block 60-8 as the power distributing unit receives an engine output upper limit value Pengmax as an engine output limit value, an engine output lower limit value Pengmin as the engine output limit value, an assist motor output upper limit value Pasmmax as an assist motor output limit value, an assist motor output lower limit value Pasmmin, a battery output upper limit value Pbatmax1 as a battery discharge limit value, a battery output lower limit value Pbatmin1 as a battery charge limit value, and a battery output target value Pbattgt. The block 60-8 determines a hydraulic load actual output Phydout, an electric load actual output Pelcout, and an assist motor output command Pasmref based on the input values, and outputs the determined values to various portions of the controller 30.

The controller 30 controls a hydraulic pressure supplied to the hydraulic load 54 based on a hydraulic load actual output Phydout, electric power supplied to the electric load 56 based on an electric load actual output Pelcout, and an assisting capacity of the engine 50 with the assist motor 52 or an electric-generating capacity with the assist motor 52 based on the assist motor output command Pasmref.

As described, with Embodiment 1, when the target revolution speed of the engine 50 continues to decrease, the output upper limit value Pengmax is reduced to decrease the load on the engine 50 to prompt recovery of the target revolution speed. This is especially effective when the electricity storage amount of the battery 58 is small and the load on the engine is not reduced even with the assistance of the assist motor 52 as described below.

Figure 9:
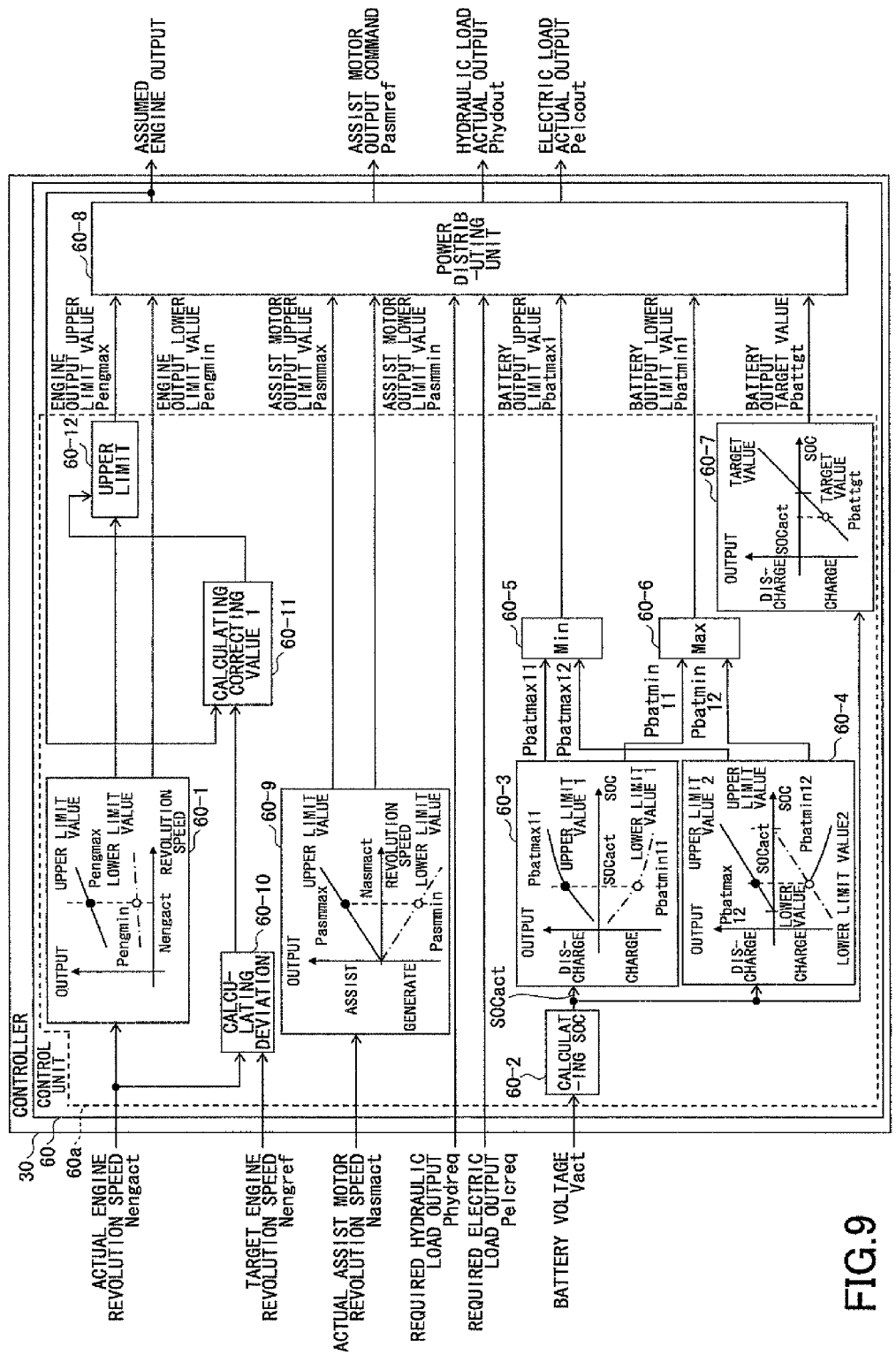
FIG. 9 is a functional block chart of a modified example of the control unit included in the controller described in Embodiment 1 of the present invention.

With Embodiment 1, when the engine output upper limit value Pengmax2 is calculated, the actual engine output Pengact (an actually measured value) in the previous cycle is used. However, if the actual value of the engine output is not obtained, an assumed engine output calculated by the power distributing unit 60-8 may be used instead of the actual engine output Pengact (the actually measured value) in the previous cycle as illustrated in FIG. 9.

Figure 10:
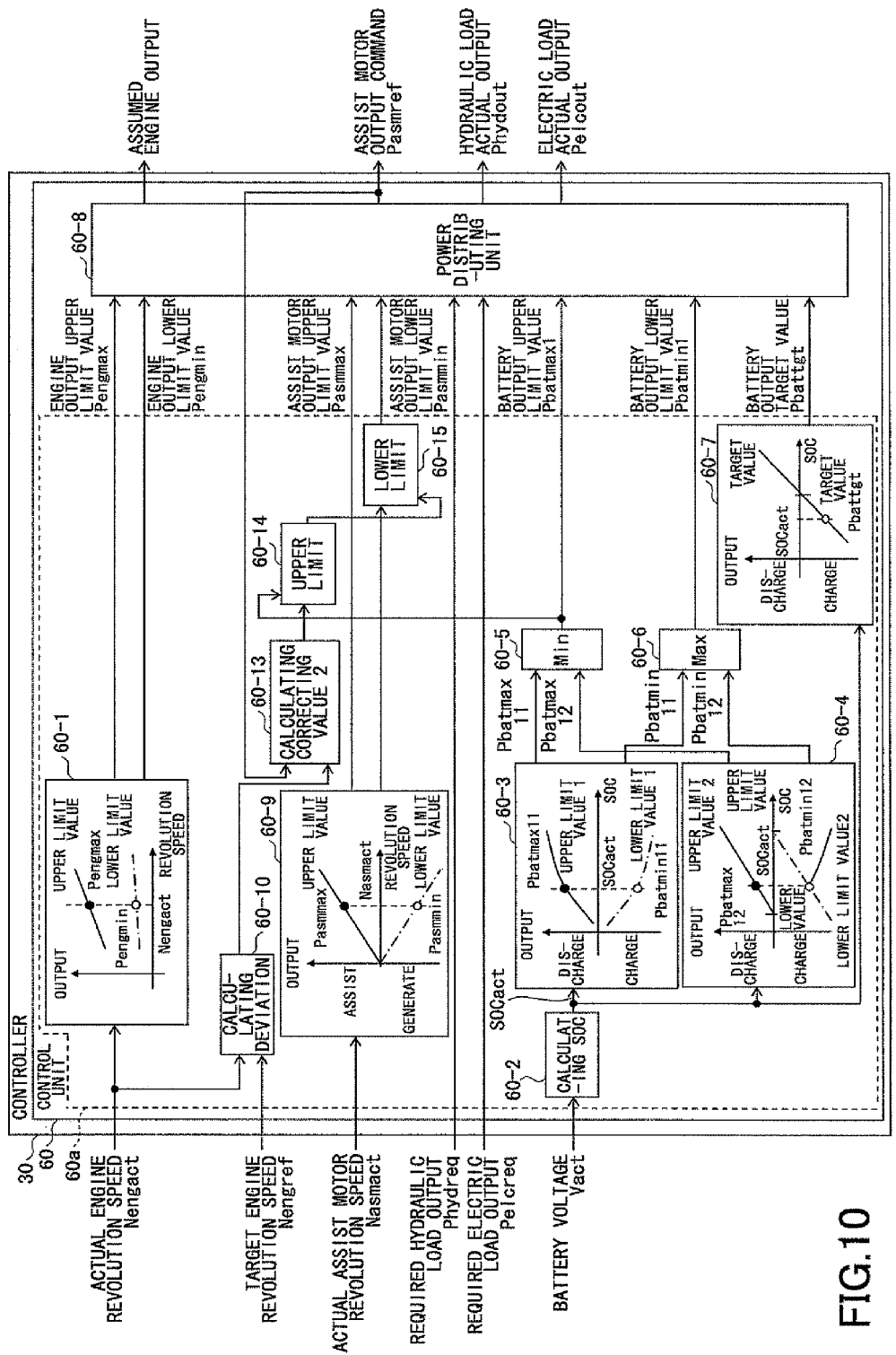
FIG. 10 is a functional block chart of a control unit included in a controller described in Embodiment 2 of the present invention.

Next, Embodiment 2 of the present invention is described with reference to FIG. 10. FIG. 10 is a functional block chart of a control unit 60 included in the controller 30 described in Embodiment 1 of the present invention. Referring to FIG. 10, the same reference symbols as those illustrated in FIG. 5 are attached to the same components as those illustrated in FIG. 5, and description of those is omitted.

With Embodiment 2, when the target revolution speed of the engine 50 continues to decrease, the engine 50 is assisted by the assist motor 52 in order to decrease the load on the engine 50. In order to control as described above, blocks 60-13, 60-14 and 60-15 are provided. The block 60-13 is a functional block for determining the assist motor output lower limit value Pasmmin2 which is determined by the block 60-9 by correcting the assist motor output command Pasmref calculated in the power distributing unit 60-8 as being a value greater than the assist motor output lower limit value Pasmmin1.

A block 60-14 is a functional block limiting the assist motor output lower limit value Pasmmin2 so that the assist motor output lower limit value Pasmmin2 determined in the block 60-13 does not exceed the battery output upper limit value Pbatmax1 determined by the block 60-5.

The block 60-15 is a functional block for setting the assist motor output lower limit value Pasmmin2 supplied from the block 60-14 to the power distributing unit 60-8 as the assist motor output lower limit value Pasmmin.

With Embodiment 2, if the load on the engine increases and the target revolution speed continues to decrease, the assist motor output lower limit value Pasmmin (=Pasmmin2) set in the block 60-15 is supplied to the limited power distributing unit 60-8 when the load on the engine increases and the revolution speed of the engine continues to decrease. With this, the power distributing unit 60-8 can calculate the assist motor output command Pasmref having a greater value than the value calculated based on the assist motor output lower limit value Pasmmin1 determined by the block 60-9.

The limitation of the assist motor output lower limit value Pasmmin is described further in detail.

Figure 11:
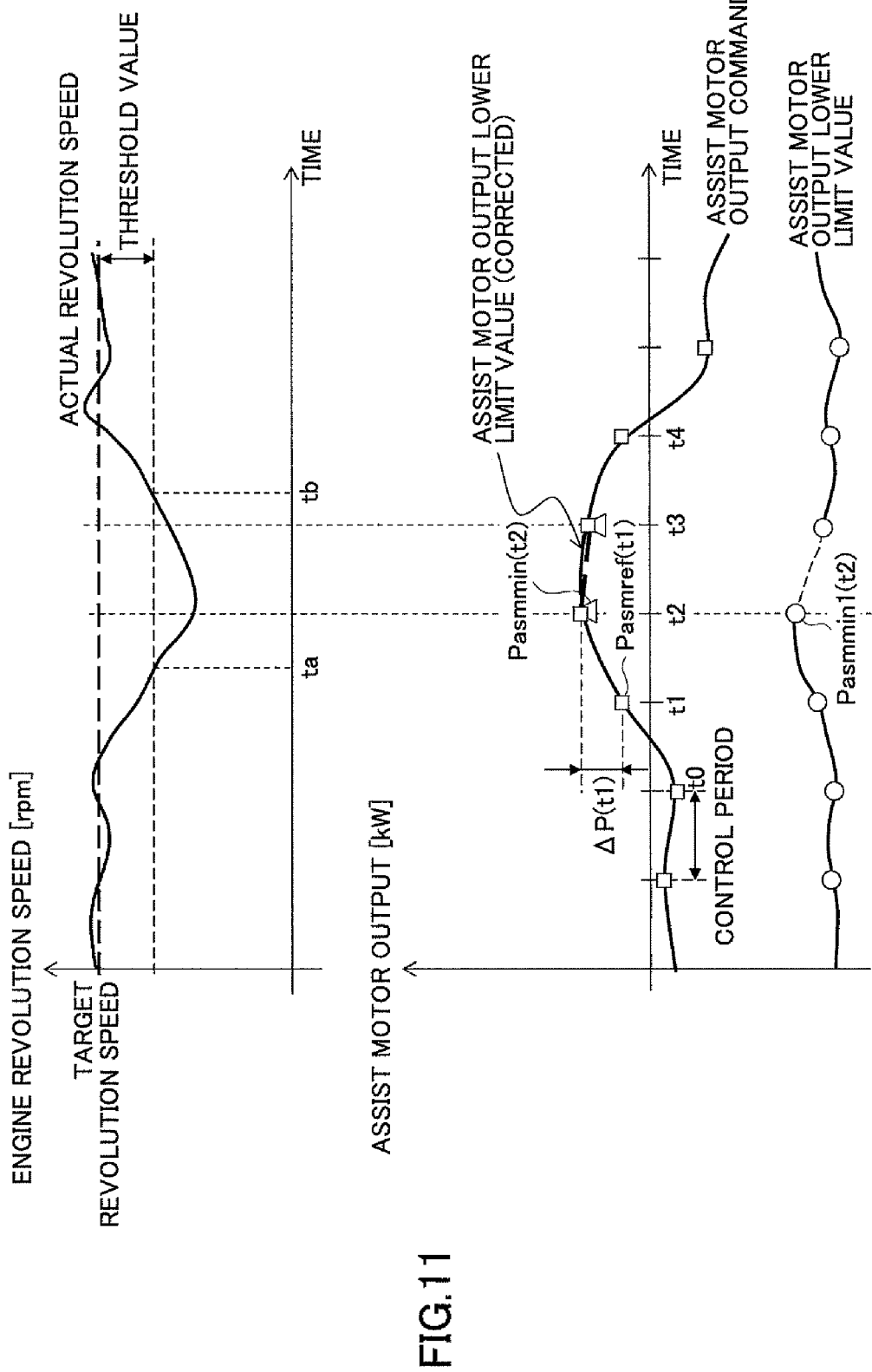
FIG. 11 is a graph illustrating a relationship among a change of an engine output upper limit value Pengmax1, a change of an assist motor output lower limit value Pasmmin, and a change of an assist motor output command Pasmref by associating these.

FIG. 11 is a graph illustrating a change of the assist motor output lower limit value Pasmmin1, a change of the assist motor output command Pasmref, and a change of the actual engine revolution speed Nengact by associating these. Referring to the graph of FIG. 11, the load on the engine increases after the time t0, and the load on the engine is great at the time t1. Therefore, the assist motor output command is in an assisting mode (a positive value). However, because sufficient assistance is not carried out, the engine is overloaded and the revolution speed of the engine decreases. Therefore, there is a danger that the engine stalls without withstanding the load when the actual engine revolution speed Nengact continues to decrease.

With the Embodiment 2, when the deviation Nengerr between the actual engine revolution speed Nengact and the target engine revolution speed Nengref exceeds the threshold value, the assist motor output lower limit value Pasmmin is set to be an engine output upper limit value Pengmax2 smaller than assist motor output lower limit value Pasmmin1 determined by the block 60-9 to thereby forcibly reduce the load on the engine. The assist motor output lower limit value Pasmmin2 corresponds to the correcting value 2 calculated in the block 60-13.

Referring to FIG. 11, a deviation Nengerr between the actual engine revolution speed Nengact and the target engine revolution speed Nengref increases beyond the threshold value from the time to between the time t1 and the time t2. At the time t2, the Nengerr between the actual engine revolution speed Nengact and the target engine revolution speed Nengref is larger than the threshold value. With the Embodiment 2, it is determined that, until the time t2, the assist motor output lower limit value Pasmmin (=Pasmmin1) is insufficient to reduce the load on the engine 50 with the assist motor 52. Then, the assist motor output lower limit value Pasmmin is forcibly changed from the assist motor output lower limit value Pasmmin1 to the assist motor output lower limit value Pasmmin2 much greater than the assist motor output lower limit value Pasmmin1. At the time t2, the assist motor output lower limit value Pasmmin is changed from the assist motor output lower limit value Pasmmin1 to the assist motor output lower limit value Pasmmin2 greater than the assist motor output lower limit value Pasmmin1. Said differently, by setting the assist motor output lower limit value Pasmmin to the assist motor output lower limit value Pasmmin2 which is greater than the assist motor output lower limit value Pasmmin1 obtained from the actual assist motor revolution speed Nasmact, the load on the engine is forcibly decreased or the generating operation of the assist motor is changed to the assisting operation, thereby assisting the engine and prompting the revolution speed of the engine to recover to the target engine revolution speed Nengref.

Between the time t2 and the time t3, the assist motor output lower limit value Pasmmin is set to the assist motor output lower limit value Pasmmin2. Therefore, the load on the engine 50 decreases and is assisted by the assist motor 52 to thereby increase the actual engine revolution speed Nengact. With this, it is possible to prevent the actual engine revolution speed Nengact from continuing to decrease thereby preventing engine stall. At time tb, the actual revolution speed is recovered to be within the threshold value. At the time t4, the deviation Nengerr between the actual engine revolution speed Nengact and the target engine revolution speed Nengref is less than the threshold value. Therefore, it is determined that the decrement of the revolution speed caused by an excessive overload of the engine disappears. Thus, the assist motor output lower limit value Pasmmin is set to be the assist motor output lower limit value Pasmmin1 again, and an ordinary control is retrieved.

Figure 12:
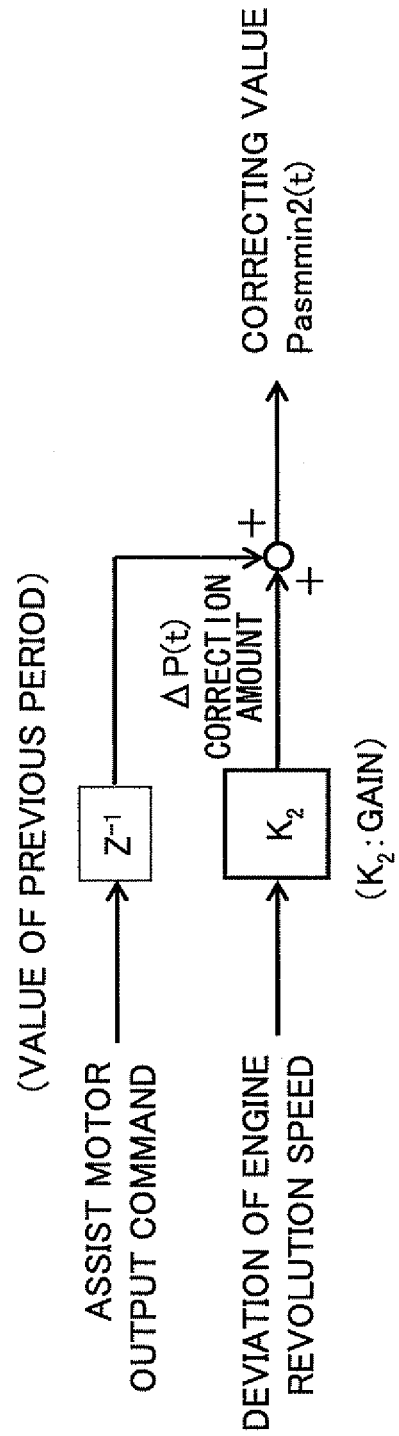
FIG. 12 illustrates a calculating method of the assist motor output lower limit value Pasmmin2.
Figure 13:
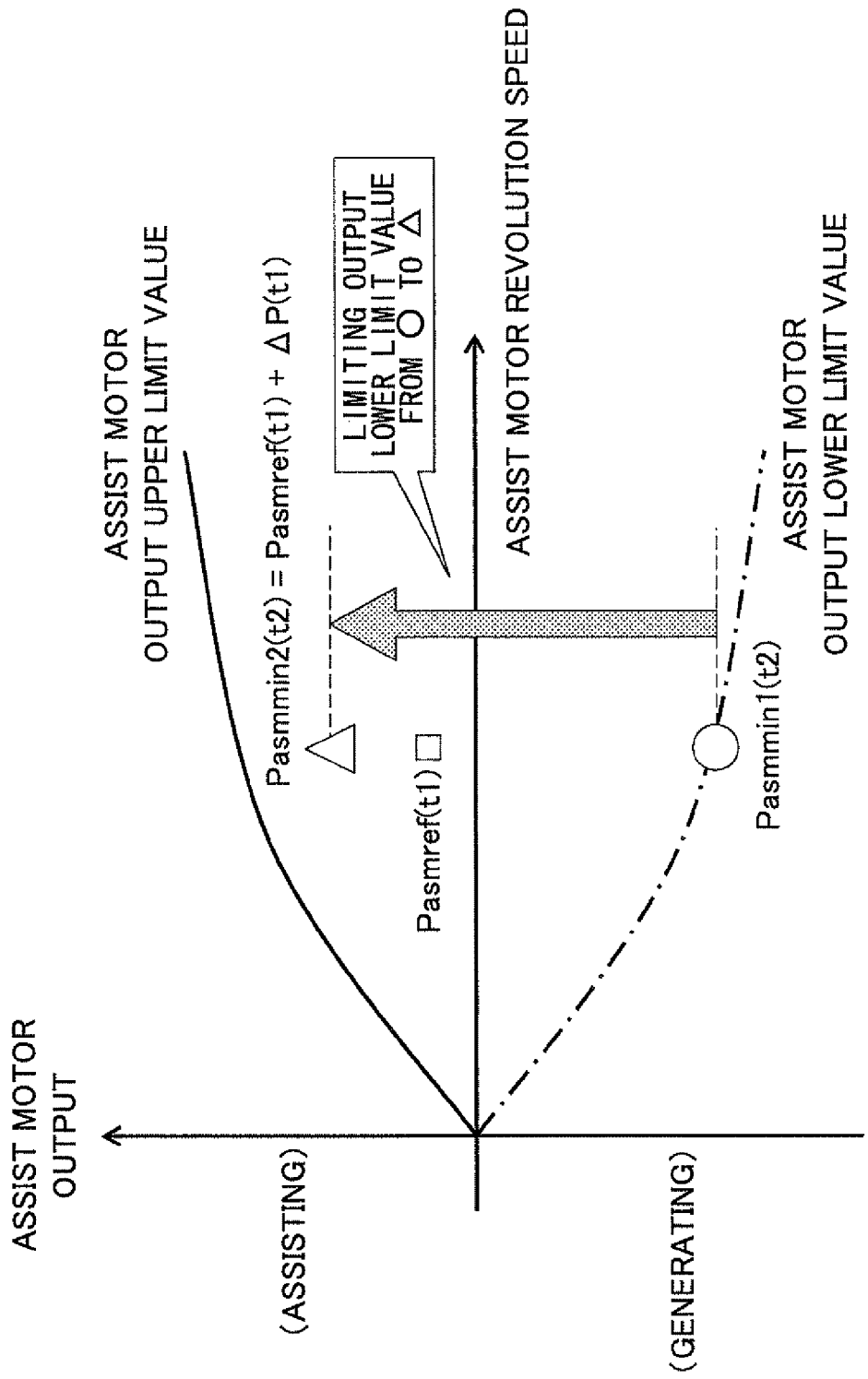
FIG. 13 is a graph illustrating a relationship among an assist motor output lower limit value Pasmmin1($t2$), an assist motor output command Pasmref(t1), and an assist motor output lower limit value Pasmmin2 ($t2$).

Referring to FIG. 11, FIG. 12 and FIG. 13, a method of determining the assist motor output lower limit value Pasmmin2 is described. After the time t1, the actual engine revolution speed Nengact continues to decrease. This means that the revolution speed of the engine continues to decrease due to the excessive load on the engine even with the actual engine output Pengact limited by the assist motor output lower limit value Pasmmin1 which is set as the engine output lower limit value Pasmmin set at the time t1. Therefore, a value obtained by adding the predetermined value $\Delta P(t1)$ to the assist motor output command Pasmref at the time t1 (the previous time) is set as the assist motor output lower limit value Pasmmin2($t2$).

Referring to FIG. 12, the predetermined value $\Delta P(t1)$ is calculated by multiplying the deviation Nengerr between the actual engine revolution speed Nengact at the time t2 (the present time) and the target engine revolution speed Nengref with a predetermined gain K2. Referring to FIG. 12, the value on the prior control period corresponds to the assist motor output command Pasmref at the time t1 based on the time t2. Therefore, the assist motor output lower limit value Pasmmin2(t2) calculated at the time t2 is obtained by adding a correcting value ΔP(t1) calculated by multiplying the predetermined gain K2 with the deviation Nengerr between the actual engine revolution speed Nengact and the target engine revolution speed Nengref at the time t2 to the assist motor output command Pasmref at the time t1.

FIG. 13 is a graph illustrating an assist motor output upper limit value Pasmmax determined by the assist motor target revolution speed and the assist motor output lower limit value Pasmmin1, in which a relationship among an assist motor output lower limit value Pasmmin1(t2) determined at the time t2, an assist motor output command Pasmref(t1) at the time t1, and assist motor output lower limit value Pasmmin2 (t2) calculated at the time t2 is illustrated. The assist motor output command Pasmref(t1) at the time t1 earlier than the time t2 is greater than the assist motor output lower limit value Pasmmin1(t2). The assist motor output lower limit value Pasmmin2(t2) at the time t2 has a value obtained by adding the correction amount ΔP(t1) to the assist motor output command Pasmref(t1) at the previous time t1. Therefore, the assist motor output lower limit value Pasmmin2(t2) has a value even greater than the assist motor output command Pasmref(t1).

Because, with the assist motor output command Pasmref(t1) at the previous time t1, the revolution speed of the engine yet decreases, the assist motor output lower limit value Pasmmin1(t2) at the time t2 is set greater than the assist motor output command Pasmref(t1). Thus, the electric-generating capacity of the assist motor 52 is decreased to reduce the load on the engine 50 or the engine is assisted by carrying out an assisting operation of the assist motor 52 to recover the revolution speed of the engine. The correction amount ΔP(t1) is obtained by multiplying the deviation Nengerr between the actual engine revolution speed Nengact at the time t2 and the target engine revolution speed Nengref with a predetermined gain K2. Therefore, the correction amount ΔP(t1) reflects the deviation Nengerr between the actual engine revolution speed Nengact at the time t2 and the target engine revolution speed Nengref. Said differently, the correction amount ΔP(t1) reflects a degree of reducing the actual engine revolution speed Nengact relative to the target engine revolution speed Nengref. Therefore, the assist motor output command Pasmref2(t2) at the time t2 is determined based on the degree of reducing the actual engine revolution speed Nengact relative to the target engine revolution speed Nengref.

The assist motor output lower limit value Pasmmin 2 illustrated in FIG. 12 is calculated in the block 60-13 illustrated in FIG. 12. The assist motor output lower limit value Pasmmin2 calculated in the block 60-13 is supplied to the block 60-14. A block 60-14 limits the assist motor output lower limit value Pasmmin2 so that the assist motor output lower limit value Pasmmin2 calculated in the block 60-13 does not exceed the battery output upper limit value Pbatmax1 determined by the block 60-5. The assist motor output lower limit value Pasmmin2 calculated in the block 60-13 indicates the maximum electric-generating capacity of the assist motor 52 for reducing the load on the engine by restricting the generating operation of the assist motor 52 or the minimum value of the output of the assist motor 52 for carrying out assisting operation of the assist motor 52. The assisting operation of the assist motor 52 is carried out by supplying the electric power from the battery 58. If the assist motor undertakes the assisting operation with electric power exceeding electric power supplied from the battery, it becomes impossible to maintain the battery 58 in a normal charging state. In the blocks 60-3 and 60-5 illustrated in FIG. 10, the battery output upper limit value Pbatmax1 is determined as the maximum discharge amount of the battery. Therefore, when the block 60-14 limits the assist motor output lower limit value Pasmmin2 using the battery output upper limit value Pbatmax1 output from the block 60-5, the power permissible by the battery 58 is controlled to be supplied to the assist motor 52.

In the block 60-15, the assist motor output lower limit value Pasmmin2 (a value greater than the assist motor output lower limit value Pasmmin1) supplied from the block 60-14 is determined as the assist motor output lower limit value Pasmmin and is output to the power distributing unit 60-8.

As described, the block 60-8 as the power distributing unit receives an engine output upper limit value Pengmax as an engine output limit value, an engine output lower limit value Pengmin as the engine output limit value, an assist motor output upper limit value Pasmmax as an assist motor output limit value, an assist motor output lower limit value Pasmmin as an assist motor generation limit value, a battery output upper limit value Pbatmax1 as a battery discharge limit value, a battery output lower limit value Pbatmin1 as a battery charge limit value, and a battery output target value Pbattgt. The block 60-8 determines a hydraulic load actual output Phydout, an electric load actual output Pelcout, and an assist motor output command Pasmref based on the input values, and outputs the determined values to various portions of the controller 30.

The controller 30 controls a hydraulic pressure supplied to the hydraulic load 54 based on a hydraulic load actual output Phydout, electric power supplied to the electric load 56 based on an electric load actual output Pelcout, and the assisting capacity of the engine 50 with the assist motor 52 or the electric-generating capacity with the assist motor 52 based on the assist motor output command Pasmref.

With the Embodiment 2, when the revolution speed of the engine 50 continues to decrease, the output lower limit value Pasmmin of the assist motor 52 is increased to thereby recover the revolution speed of the engine 50 with the assistance of the assist motor 52. However, because the assist motor output lower limit value Pasmmin2 is limited to prevent the assist motor output lower limit value Pasmmin from being greater than the battery output upper limit value Pbatmax1, the engine 50 is controlled to be assisted by the assist motor 52 while checking the charge state of the battery 58. Therefore, if the electricity storage amount of the battery 58 of the electric power accumulator 19 is small and the assist motor 52 is not provided for the assisting operation, the engine does not undergo the output control of the Embodiment 2.

Figure 14:
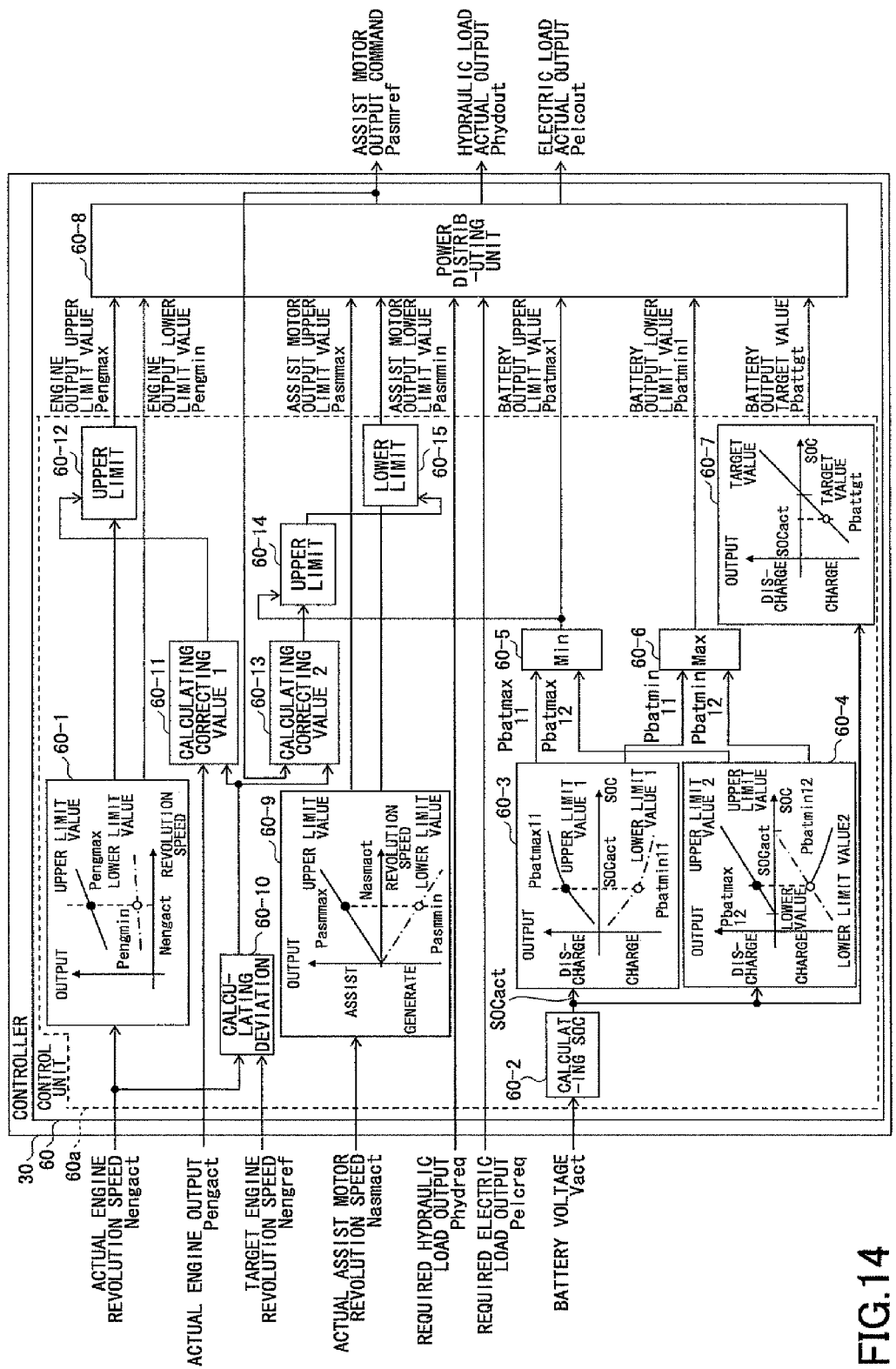
FIG. 14 is a functional block chart of a control unit included in a controller described in Embodiment 3 of the present invention.

Next, Embodiment 3 of the present invention is described with reference to FIG. 14. FIG. 14 is a functional block chart of a control unit 60 included in a controller 30 described in Embodiment 3 of the present invention. Referring to FIG. 14, the same reference symbols as those illustrated in FIG. 5 and FIG. 10 are attached to the same components as those illustrated in FIG. 5 and FIG. 10, and description of these is omitted.

The Embodiment 3 is a combination of the Embodiment 1 and the Embodiment 2. When the revolution speed of the engine 50 continues to decrease, the output upper limit value Pengmax of the engine is limited to thereby decrease the load on the engine 50 as in the Embodiment 1, and the load on the engine 50 is reduced by setting the assist motor output lower limit value Pasmmin to be high as in the Embodiment 2 to resultantly recover the target revolution speed by increasing the revolution speed of the engine 50.

Figure 15:
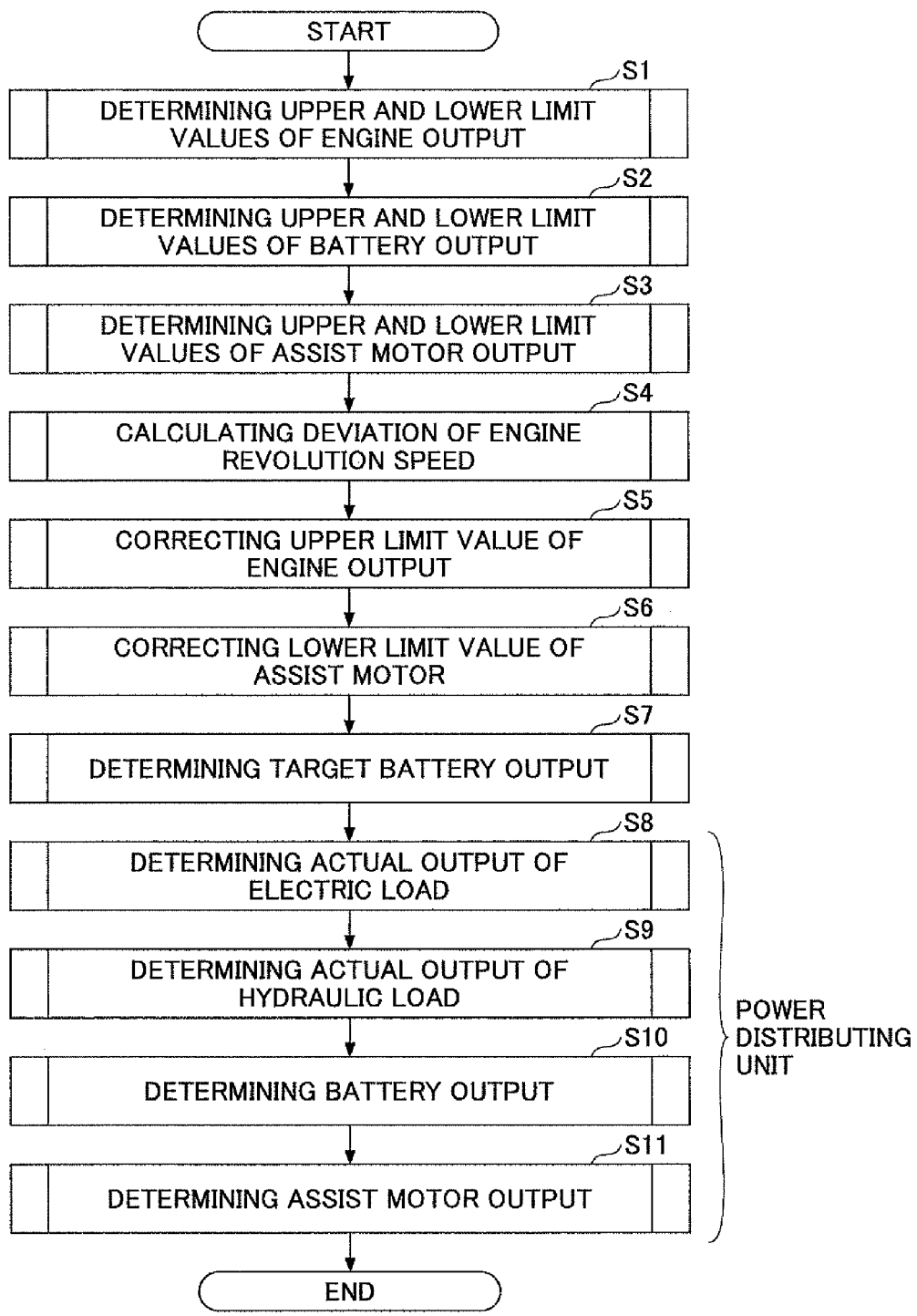
FIG. 15 is a flowchart of processes carried out in the control unit illustrated in FIG. 14.

The function block illustrated in FIG. 14 is the same as the function blocks illustrated in FIG. 5 and FIG. 10, and description of the function block is omitted. A process of determining the hydraulic load actual output Phydout, the electric load actual output Pelcout, and the assist motor output command Pasmref in the control unit 60 is described. FIG. 15 is a flowchart of the process carried out in the control unit 60.

In step S1, the map or the conversion table is used to determine the engine output upper limit value Pengmax and the engine output lower limit value Pengmin of the engine 50 from the actual engine revolution speed Nengact indicative of a present revolution speed of the engine 50. The process is carried out by the block 60-1. At this time, when the engine output upper limit value Pengma and the engine output upper limit value Pengmin may be set to be in a map or a conversion table within a range exerting good fuel efficiency of the engine 50, an energy saving effect of the engine 50 is obtainable.

In step S2, the battery output upper limit value Pbatmax1 and the present battery output lower limit value Pbatmin1 are determined. The process is carried out by the blocks 60-2 to 60-6.

The block 60-2 obtains a present charge rate SCDact as an operation using a present battery voltage Vact. The block 60-3 determines the battery output upper limit value Pbatmax11 and the battery output lower limit value Pbatmin11 from the present charging rate SOCact, a predetermined maximum charge current and the maximum discharge current using a map or a conversion table. At the same time, the block 60-4 determines the battery output upper limit value Pbatmax12 and the battery output lower limit value Pbatmin12 which do not cause the charging rate to be the SOC lower limit value or less and to be the SOC upper limit value or more from the present charging rate SOCact using a map or a conversion table. Subsequently, the block 60-5 determines a smaller value of the battery output upper limit value Pbatmax11 and the battery output upper limit value Pbatmax12 as the battery output upper limit value Pbatmax1. The battery output upper limit value Pbatmax1 designates the maximum discharging power, and the battery output lower limit value Pbatmin1 designates the maximum charging power. Subsequently, the block 60-6 determines a greater value of the battery output upper limit value Pbatmax11 and the battery output upper limit value Pbatmax12 as the battery output lower limit value Pbatmin1.

Subsequently, in step S3, the lower limit value Pasmmin and the upper limit value Pasmmax of the assist motor in the input present actual assist motor revolution speed Nasmact from a previously prepared map or conversion table. Referring to FIG. 5, the map or the conversion table illustrates the lower limit value and the upper limit value of the output relative to the revolution speed of the assist motor 52. The process is carried out by the block 60-9. The block 60-9 outputs the obtained lower limit value Pasmmin and the obtained upper limit value Pasmmax of the output of the obtained assist motor 52 to the power distributing unit 60-8.

In step S4, a deviation Nengerr between the target engine revolution speed Nengref and the actual engine revolution speed Nengact is calculated. The process is carried out by the block 60-10. The calculated deviation Nengerr is supplied to the block 60-11 and the block 60-13.

Subsequently, in step S5, the engine output upper limit value Pengmax2 is calculated. The engine output upper limit value Pengmax2 is calculated with the method illustrated in FIG. 7 by the block 60-11. Said differently, the block 60-11 calculates the engine output upper limit value Pengmax2 as a correcting value 1 from the input actual engine output Pengact and the deviation Nengerr supplied from a block 60-10, and outputs the calculated engine output upper limit value Pengmax2 to the block 60-12. A block 60-12 compares the engine output upper limit value Pengmax1 supplied from the block 60-1 with the engine output upper limit value Pengmax2 supplied from the block 60-11, and outputs the engine output upper limit value Pengmax1 without change to the power distributing unit 60-8 when the engine output upper limit value Pengmax1 is the engine output upper limit value Pengmax2 or less. On the other hand, when the engine output upper limit value Pengmax1 is greater than the engine output upper limit value Pengmax2, the block 60-12 outputs the engine output upper limit value Pengmax2 as the engine output upper limit value Pengmax instead of the engine output upper limit value Pengmax1 to the power distributing unit 60-8. Said differently, the block 60-12 limits the engine output upper limit value Pengmax so as not to exceed the engine output upper limit value Pengmax2.

Subsequently in step S6, an assist motor output lower limit value Pasmmin2 is calculated, and the calculated assist motor output lower limit value Pasmmin2 is supplied to the power distributing unit 60-8 as the assist motor output lower limit value Pasmmin. The assist motor output lower limit value Pasmmin2 is calculated with the method illustrated in FIG. 12 by the block 60-13. Said differently, the block 60-13 corrects the assist motor output command Pasmref calculated in the power distributing unit 60-8 and calculates the assist motor output lower limit value Pasmmin2 greater than the assist motor output lower limit value Pasmmin1 determined by the block 60-9. The assist motor output lower limit value Pasmmin2 calculated in the block 60-13 is supplied to the block 60-14. The block 60-14 limits the assist motor output lower limit value Pasmmin2 so that the assist motor output lower limit value Pasmmin2 calculated in the block 60-13 does not exceed the battery output upper limit value Pbatmax1 determined by the block 60-5. The limited assist motor output lower limit value Pasmmin2 is supplied to the block 60-15, is set as the assist motor output lower limit value Pasmmin, and is supplied to the power distributing unit 60-8.

Subsequently, in step S7, the battery output target value Pbattgt is determined from the present charging rate SOCact in step S7. The process is carried out by the block 60-7.

Subsequently, in step S8, the electric load actual output Pelcout is determined based on limit values of required outputs of the engine 50 and the battery 58. The process in step S8 is carried out in the block 60-8. This process is described later. Subsequently, in step S9, the hydraulic load actual output Phydout is determined based on limit values of required outputs of the engine 50 and the battery 58. The process in step S9 is carried out in the block 60-8. This process is described later.

In step S10, the battery output Pbatout is determined by calculated outputs of the engine 50, the electric loads 56 and the battery 58. The battery output Pbatout is charge and discharge power to the battery 58. The process in step S10 is carried out in the block 60-8 being the power distributing unit. This process is described later.

Subsequently, in step S11, the assist motor output command Pasmref is determined based on a comparison between the electric load actual output Pelcout and the battery output Pbatout. The process in step S11 is carried out in the block 60-8 being the power distributing unit. This process is described later.

After the step S11, the process in the control unit 60 ends. A process in the control unit 60 determines the hydraulic load actual output Phydout, the electric load actual output Pelcout, and the assist motor output command Pasmref.

Figure 16:
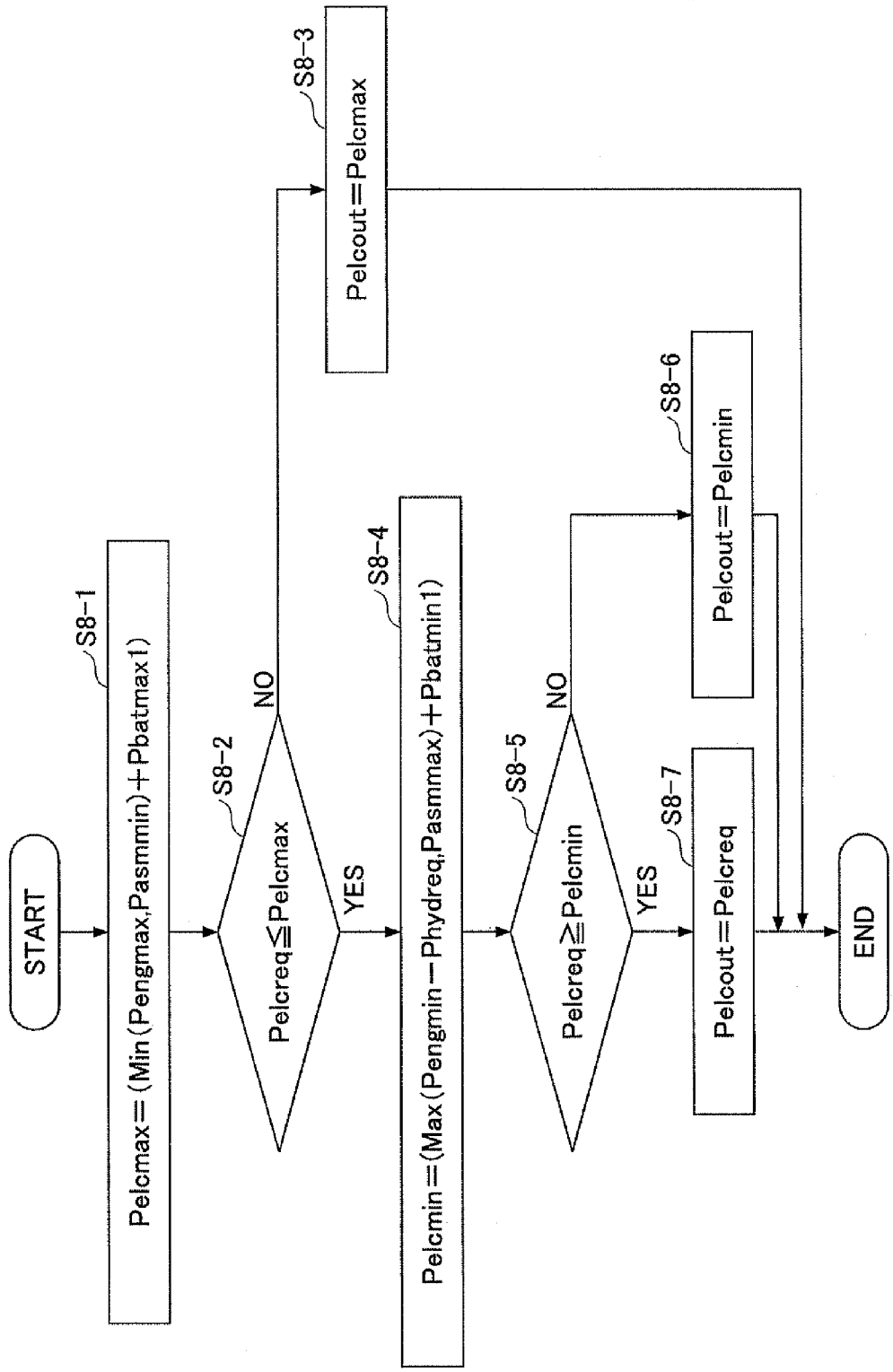
FIG. 16 is a flowchart of the process in step S8 illustrated in FIG. 15.

The processes in the step S8 are described in detail. FIG. 16 is a flowchart of the process in step S8.

In step S8-1, the electric load output upper limit value Pelcmax being the maximum electric power supplied to the electric load 56 is calculated. The electric load output upper limit value Pelcmax is the maximum electric power supplied at a time of a power running operation of the electric load 56. The electric power generated in the power running operation is set as a positive value. Because the hydraulic load 54 does not function as a power source for the electric load 56, a hydraulic load output request Phydreq is not considered to be zero. Therefore, the electric load output upper limit value Pelcmax is obtained by adding a smaller of the engine output upper limit value Pengmax limited by the engine output upper limit value Pengmax2 and the assist motor output lower limit value Pasmmin limited by the assist motor output lower limit value Pasmmin2 to the battery output upper limit value Pbatmax1. Said differently, the maximum electric-generating capacity of the assist motor 52 determined by the revolution speed Nasmac is the assist motor output lower limit value Pasmmin1. This is determined in the block 60-9 illustrated in FIG. 14. Therefore, if the power as much as the engine output upper limit value Pengmax being the motive power supplied from the engine to the assist motor 52 exceeds the assist motor output lower limit value Pasmmin, the generating electric power from the assist motor needs to be limited less than the assist motor output lower limit value Pasmmin or less.

Figure 17:
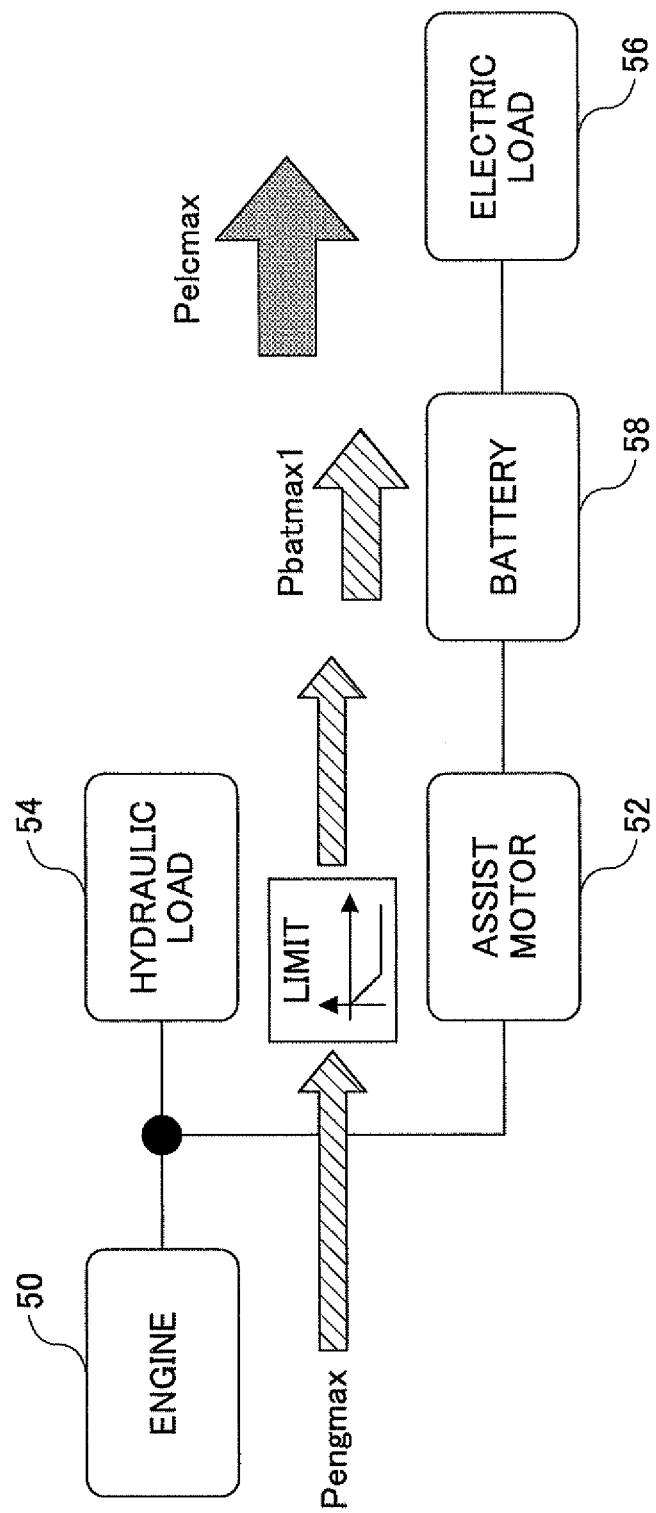
FIG. 17 is a diagram illustrating modeled calculation of an electric load output upper limit value Pelcmax.

The assist motor output lower limit value Pasmmin is ordinarily set as the assist motor output lower limit value Pasmmin1 determined in the block 60-9. The engine output upper limit value Pengmax is limited by the assist motor output lower limit value Pasmmin1. However, if the revolution speed of the engine suddenly decreases, the assist motor output lower limit value Pasmmin is set as the assist motor output lower limit value Pasmmin2 calculated in the block 60-13. The engine output upper limit value Pengmax is limited by the assist motor output lower limit value Pasmmin2. FIG. 17 is a diagram illustrating modeled calculation of an electric load output upper limit value Pelcmax.

Next, in step S8-2, the required electric load output Pelcreq is compared with the electric load output upper limit value Pelcmax to thereby determine whether the required electric load output Pelcreq is the electric load output upper limit value Pelcmax or less.

In step S8-2, if the required electric load output Pelcreq is greater than the electric load output upper limit value Pelcmax in No of step S8-2, the process goes to step S8-3. In step S8-3, the value of the electric load actual output Pelcout is set to be equal to the value of the electric load output upper limit value Pelcmax, and the process ends. Said differently, if the power required by the electric load 56 is greater than the maximum electric power supplied by the assist motor 52 and the battery 58, only the maximum power supplied by the assist motor 52 and the battery 58 is supplied to the electric load 56 to thereby provide a limit to the electric power supplied to the electric load.

In step S8-2, if the required electric load output Pelcreq is the electric load output upper limit value Pelcmax or less in Yes of step S8-2, the process goes to step S8-4.

In step S8-4, the maximum power at the time of the regenerating operations of the electric load 56 is calculated. Because the electric power at the time of the regenerating operations is treated as a negative value in the electric load 56, the maximum electric power at the time of the regenerating operations is calculated as the electric load output lower limit value Pelcmin. The electric load output lower limit value Pelcmin is obtained by adding the battery output lower limit value Pbatmin1 to a greater value of a value obtained by subtracting a hydraulic load output request Phydreq from the engine output lower limit value Pengmin and the assist motor output upper limit value Pasmmax.

Figure 18:
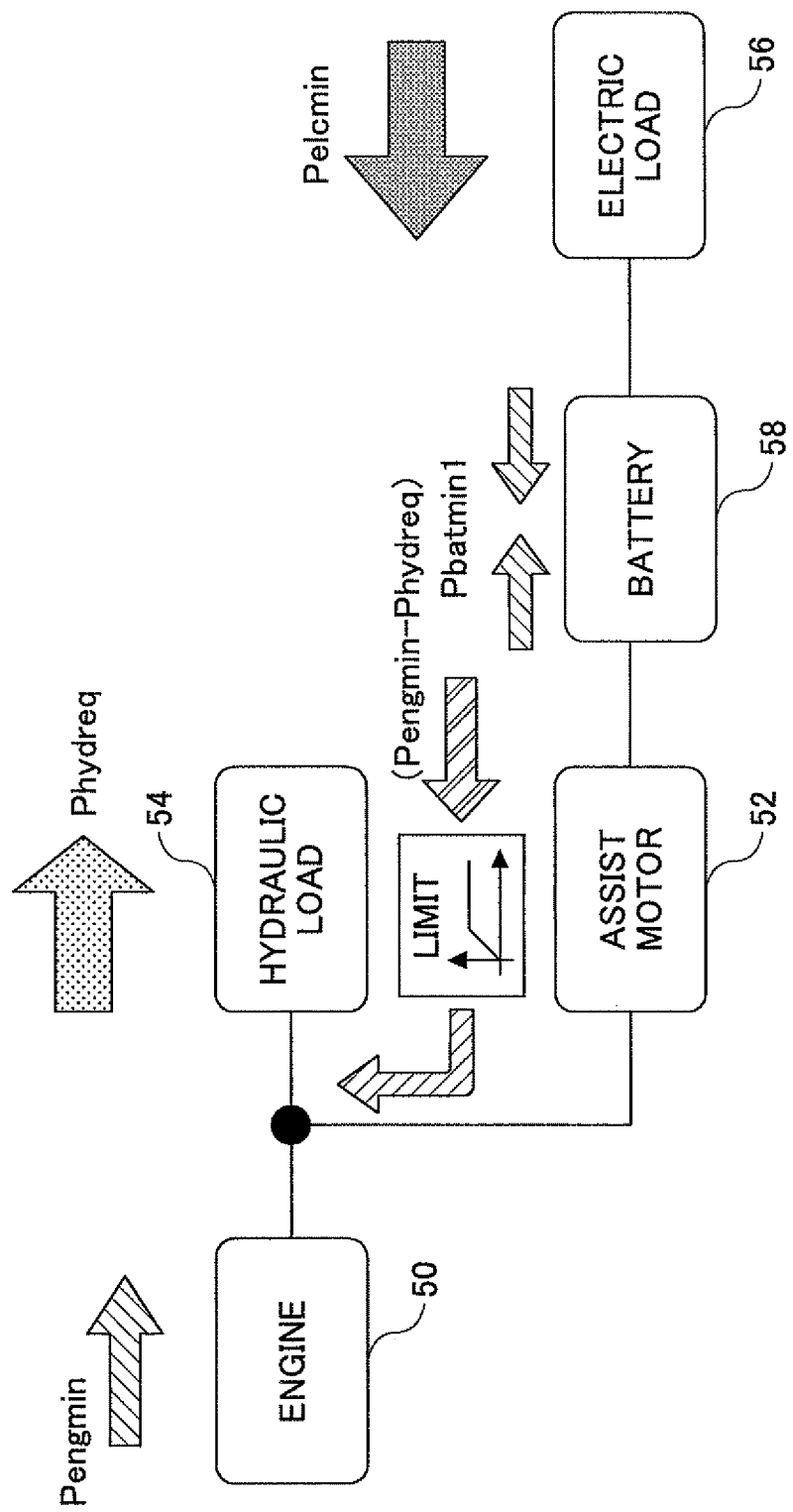
FIG. 18 is a diagram illustrating modeled calculation of an electric load output lower limit value Pelcmin.

FIG. 18 is a diagram illustrating modeled calculation of an electric load output lower limit value Pelcmin. The power supplied from the engine 50 in response to the required hydraulic load output Phydreq, which is the motive power required by the hydraulic load 54, is minimized. Therefore, it is possible to make the assist motor consume the maximum electric power to thereby assist the engine 50. However, in the assist motor 52, there is the assist motor output upper limit value Pasmmax which is the maximum power determined by the revolution speed Nasmact. The assist motor output upper limit value Pasmmax is determined by the block 60-9 of FIG. 14. Therefore, when a value (i.e., the maximum output of assisting the engine 50 with the assist motor 52) obtained by subtracting the engine output lower limit value Pengmin from the required hydraulic load output Phydreq exceeds the assist motor output upper limit value Pasmmax, it is necessary to limit the assist of the assist motor 52 to the assist motor output upper limit value Pasmmax. In step S8-4, a smaller one of the value obtained by subtracting the engine output lower limit value Pengmin from the required hydraulic load output Phydreq and the assist motor output upper limit value Pasmmax is selected and is made the maximum power to be consumed by the assist motor 52.

Next, in step S8-5, the required electric load output Pelcreq is compared with the electric load output lower limit value Pelcmin to thereby determine whether the required electric load output Pelcreq is the electric load output lower limit value Pelcmin or more.

In step S8-5, if the required electric load output Pelcreq is determined to be smaller than the electric load output lower limit value Pelcmin in No of step S8-5, the process goes to step S8-6. In step S8-6, the value of the electric load actual output Pelcout is set to be equal to the value of the electric load output lower limit value Pelcmin, and the process ends. If the electric power regenerated by the electric load 56 is greater than the sum of the maximum electric power to be consumed by the assist motor 52 and the maximum electric power to be stored in the battery 58, an upper limit of the electric power regenerated by the electric load 56 is set so that the electric power regenerated by the electric load 56 does not exceed the sum of the maximum electric power to be consumed by the assist motor 52 and the maximum electric power to be stored in the battery 58.

In step S8-5, if the required electric load output Pelcreq is determined to be the electric load output lower limit value Pelcmin or more in Yes of step S8-5, the process goes to step S8-7. In step S8-7, the value of the electric load actual output Pelcout is set to be equal to the value of the required electric load output Pelcreq, and the process ends. Said differently, if the electric power regenerated by the electric load 56 is the sum of the maximum electric power to be consumed by the assist motor 52 and the maximum electric power to be stored in the battery 58 or less, the electric power regenerated by the electric load 56 is output without change. As described, by considering the engine output upper and lower limit values Pengmax and Pengmin and the battery output upper and lower limit values Pbatmax and Pbatmin for calculating the value of the electric load actual output Pelcout, the electric load 56 can be stably controlled.

Figure 19:
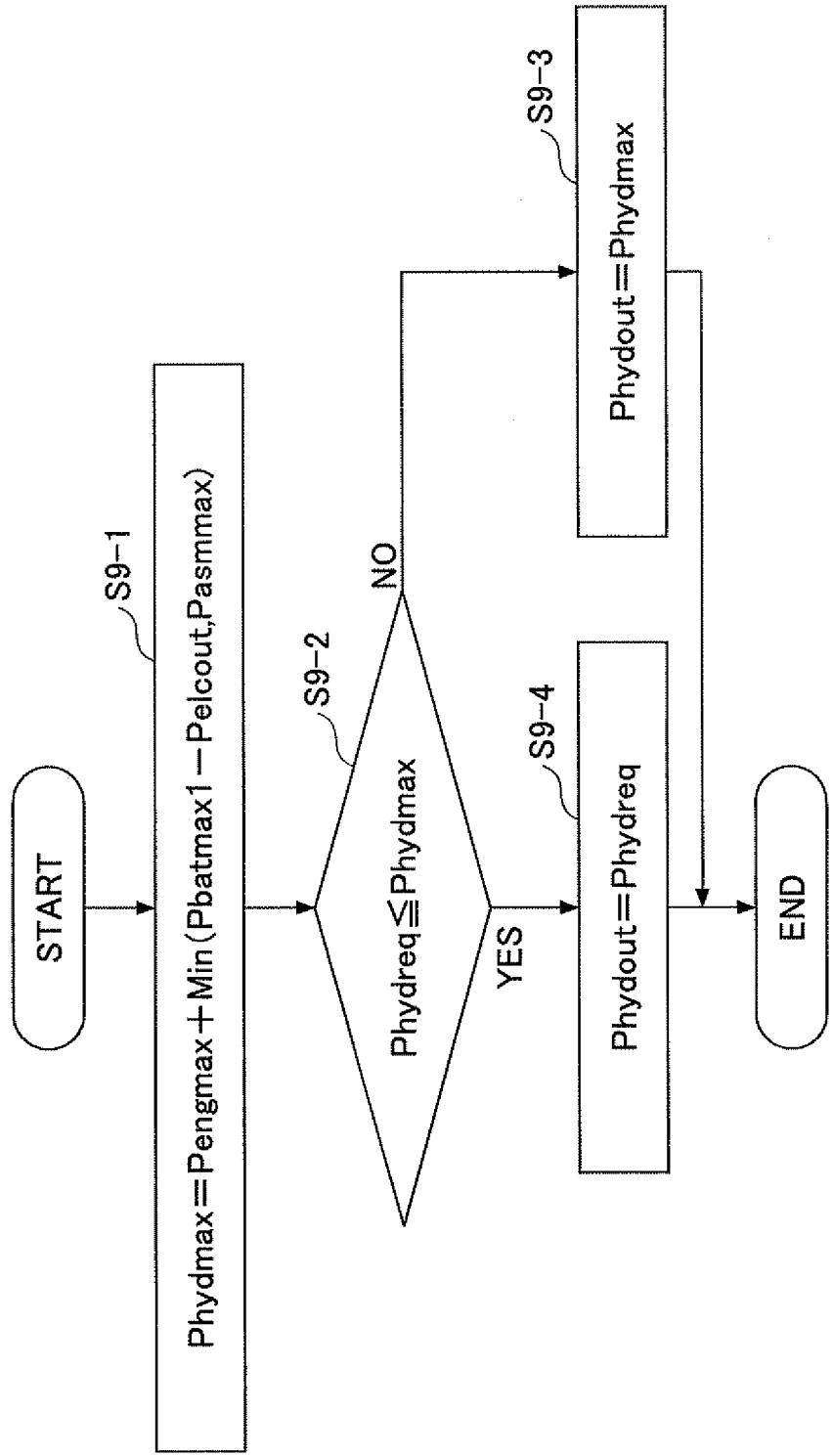
FIG. 19 is a flowchart of the process in step S9 illustrated in FIG. 15.

The process in the step S9 is described in detail. FIG. 19 is a flowchart of the process in step S9.

In step S9-1, the hydraulic load output upper limit value Phydmax being the maximum motive power to be supplied to the hydraulic load 54 is calculated. The hydraulic load output upper limit value Phydmax is obtained by adding a smaller one of a value obtained by subtracting the electric load output Pelecout from the battery output upper limit value Pbatmax1 and the assist motor output upper limit value Pasmmax to the engine output upper limit value Pengmax. In the assist motor 52, there is provided the assist motor output upper limit value Pasmmax determined by the revolution speed Pasmact. When the engine 50 is assisted, it is not possible to assist in a range beyond the assist motor output upper limit value Pasmmax. In step S9-1, if the value obtained by subtracting the electric load output Pelecout from the battery output upper limit value Pbatmax1 is greater than the assist motor output upper limit value Pasmmax, the assist motor output upper limit value Pasmmax is adopted to limit the assisting capacity of the assist motor 52. The assist motor output upper limit value Pasmmax is determined by the block 60-9 of FIG. 14.

Figure 20:
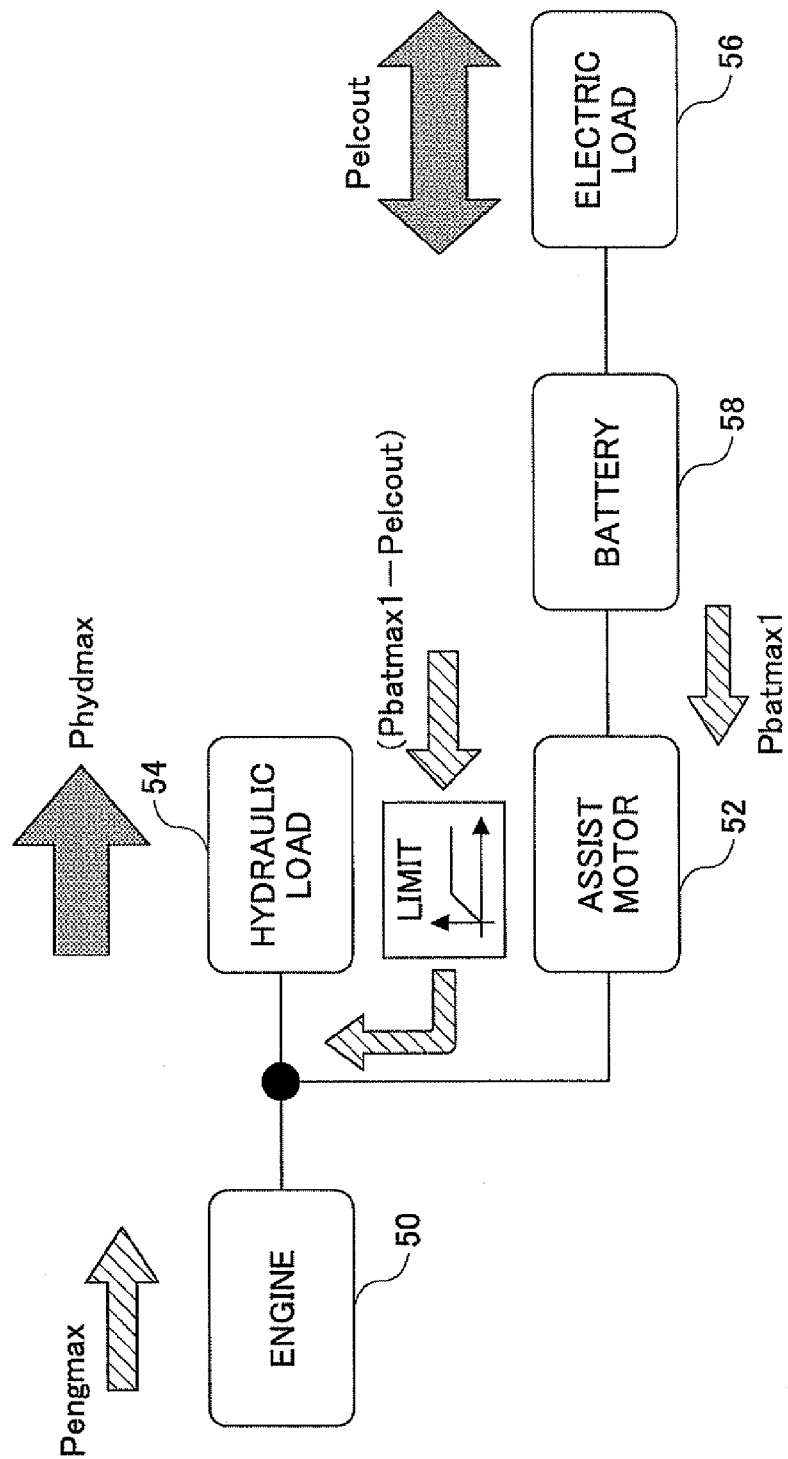
FIG. 20 is a diagram illustrating modeled calculation of a hydraulic load output upper limit value Phydmax.

FIG. 20 is a diagram illustrating modeled calculation of a hydraulic load output upper limit value Phydmax. The electric load actual output Pelcout has a polarity and takes a positive or negative value such as the electric load output upper and lower limit value Pelecmax or Pelecmin. If the electric load actual output Pelcout takes the positive value, the electric power is supplied at a time of power running operation with the electric load, and the electric power supplied to the electric load 56 can be subtracted from the motive power to be supplied to the hydraulic load 54. If the electric load actual output Pelcout takes the negative value, the regenerated electric power is supplied at a time of regenerating operation with the electric load, and the regenerated electric power supplied from the electric load 56 can be added to the motive power to be supplied to the hydraulic load 54. Because the negative value of the electric load actual output Pelcout is subtracted, the result automatically becomes a positive value, and the regenerated electric power is added.

In step S9-2, the required hydraulic load output Phydreq is compared with the hydraulic load output upper limit value Phydmax. It is determined whether the required hydraulic load output Phydreq is the hydraulic load output upper limit value Phydmax or less.

In step S9-2, if the required hydraulic load output Phydreq is not the hydraulic load output upper limit value Phydmax or less, namely it is determined that the required hydraulic load output Phydreq is greater than the hydraulic load output upper limit value Phydmax in No of step S9-2, the process goes to step S9-3. In step S9-3, the value of the hydraulic load actual output Phydout is set to be equal to the value of the hydraulic load output upper limit value Phydmax, and the process ends. Said differently, if the motive power required by the hydraulic load 54 is greater than the sum of the maximum motive power to be output from the engine 50 and the maximum motive power to be output from the assist motor 52, the motive power supplied to the hydraulic load 54 is limited to this sum of the maximum motive power to be output from the engine 50 and the maximum motive power to be output from the assist motor 52.

In step S9-2, if the required hydraulic load output Phydreq is the hydraulic load output upper limit value Phydmax or less in Yes of step S9-2, the process goes to step S9-4. In step S9-4, the value of the hydraulic load output Phydout is set to be equal to the value of the required hydraulic load output Phydreq, and the process ends. Said differently, if the motive power required by the hydraulic load 54 is the sum of the maximum motive power to be output from the engine 50 and the maximum motive power to be output from the assist motor 52 or less, the motive power required by the hydraulic load 54 is set to be supplied without limitation. By considering the engine output upper limit value Pengmax and the battery output upper limit value Pbatmax1 for calculating the value of the hydraulic load actual output Phydou, the hydraulic load can be stably controlled.

Figure 21:
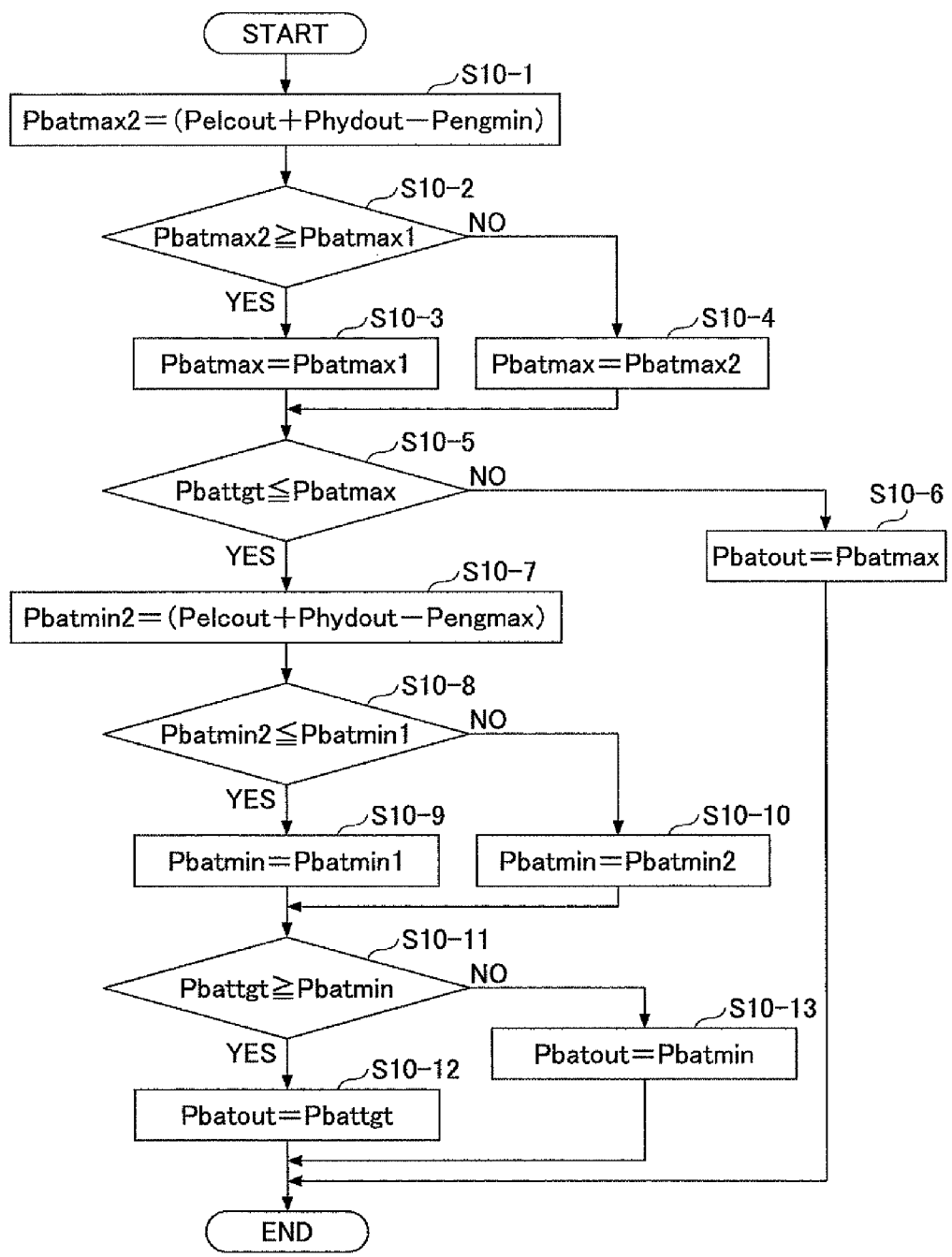
FIG. 21 is a flowchart of the process in step S10 illustrated in FIG. 15.

The process in the step S10 is described in detail. FIG. 21 is a flowchart of the process in step S10. The battery output upper limit value Pbatmax2 designates the maximum discharging power, and the battery output lower limit value Pbatmin2 designates the maximum charging power.

Figure 22:
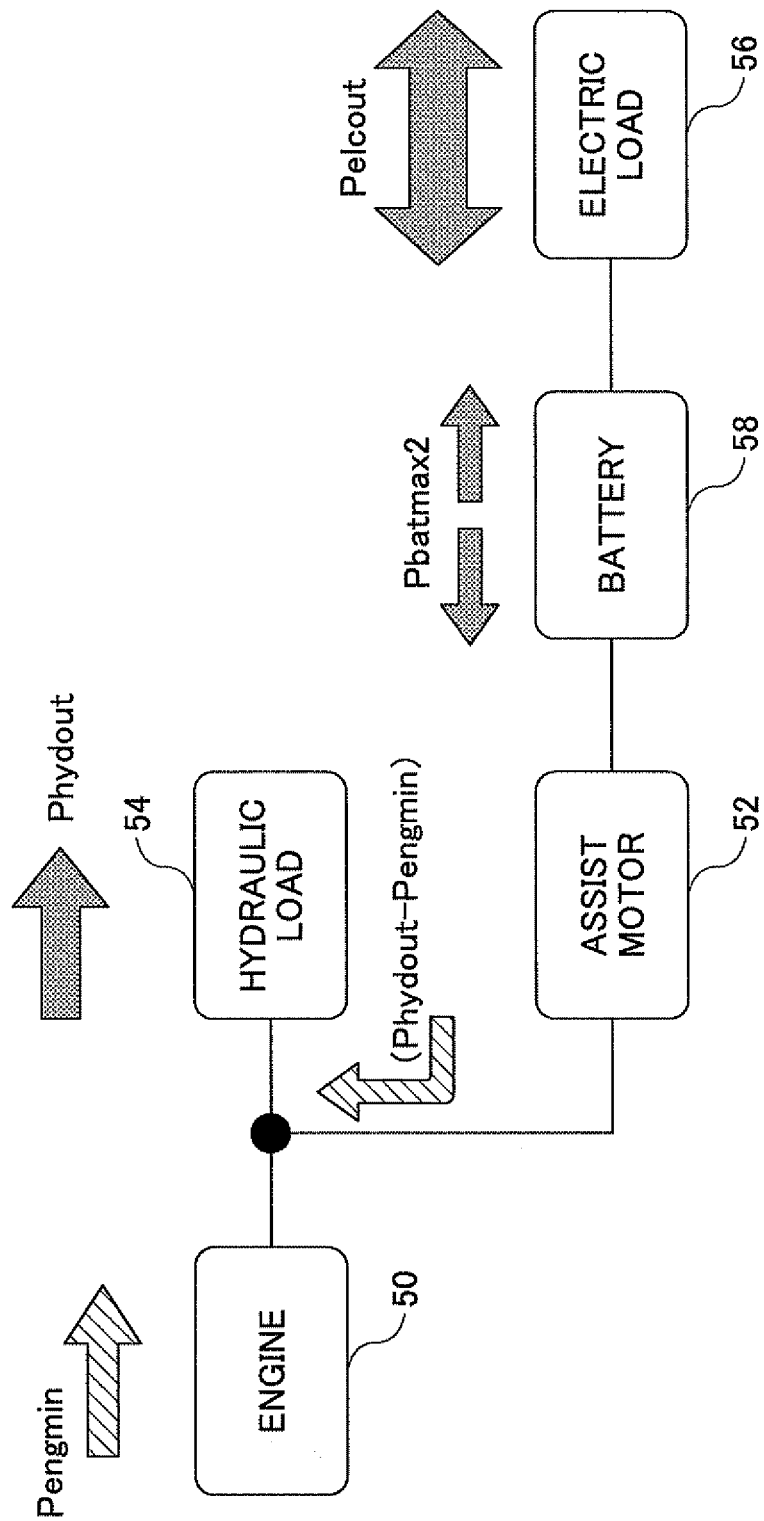
FIG. 22 is a diagram illustrating modeled calculation of a battery output upper limit value Pbatmax2.

In step S10-1, under states of outputting to the electric load 56 and the hydraulic load 54, the battery 58 calculates the battery output upper limit value Pbatmax2 being the electric power to be discharged by the battery 58. The battery output upper limit value Pbatmax2 is calculated by subtracting the engine output lower limit value Pengmin from the sum of the electric load actual output Pelcout and the hydraulic load output Phydout. FIG. 22 is a diagram illustrating modeled calculation of the battery output upper limit value Pbatmax2. The battery output upper limit value Pbatmax2 is the sum of the electric power to be consumed by the electric load 56 and the electric power to be consumed by assisting the hydraulic system with the assist motor 52.

In step S10-2, the battery output upper limit value Pbatmax1 determined in step S2 and the battery output upper limit value Pbatmax2 are compared to determine whether the battery output upper limit value Pbatmax2 is the battery output upper limit value Pbatmax1 or more. In step S10-2, if it is determined that the battery output upper limit value Pbatmax2 is the battery output upper limit value Pbatmax1 or more in YES of step S10-2, the process goes to step S10-3. In step S10-3, the value of the battery output upper limit value Pbatmax is equal to the value of the battery output upper limit value Pbatmax1. Thereafter, the process goes to step S10-5. On the other hand, if it is determined that the battery output upper limit value Pbatmax2 is not the battery output upper limit value Pbatmax1 or more, namely the battery output upper limit value Pbatmax2 is determined to be smaller than the battery output upper limit value Pbatmax1 in NO of step S10-2, the process goes to step S10-4z. In step S10-4, the value of the battery output upper limit value Pbatmax is made equal to the value of the battery output upper limit value Pbatmax2. Thereafter, the process goes to step S10-5.

In step S10-5, the battery target output Pbattgt and the battery output upper limit value Pbatmax are compared to determine whether the battery target output Pbattgt is the battery output upper limit value Pbatmax or less.

In step S10-5, if it is determined that the battery target output Pbattgt is not the battery output upper limit value Pbatmax or less, namely the battery target output Pbattgt is greater than the battery output upper limit value Pbatmax in NO of step S10-5, the process goes to step S10-6. In step S10-6, the value of the battery output Pbatout is set to be equal to the value of the battery output upper limit value Pbatmax, and the process ends.

As described, along with the electric load actual output Pelcout and the hydraulic load actual output Phydout, the battery output upper and lower limit values Pbatmax2 and Pbatmin2 are obtainable. With this, because the maximum value of the output (charge and discharge electric power) of the battery 58 in response to an actual request from the load is obtainable, the battery 58 can be charged and discharged in response to the actual operating state.

Further, a battery limit value is obtained by comparing the battery output upper and lower limit value obtained based on the electric load actual output Pelcout and the hydraulic load actual output Phydout with the maximum electric power to be charged and discharged depending on the charging state of the battery at the present moment. With this, it is possible to prevent the battery from having an excessive load applied.

Then, the battery limit value and the battery target output are compared. If the battery target output is not in a range of the battery limit value, the battery target output is corrected so that the battery output Pbatout from the battery 58 resides within the battery limit value. With this, it is possible to certainly prevent the battery from having an excessive load applied.

Figure 23:
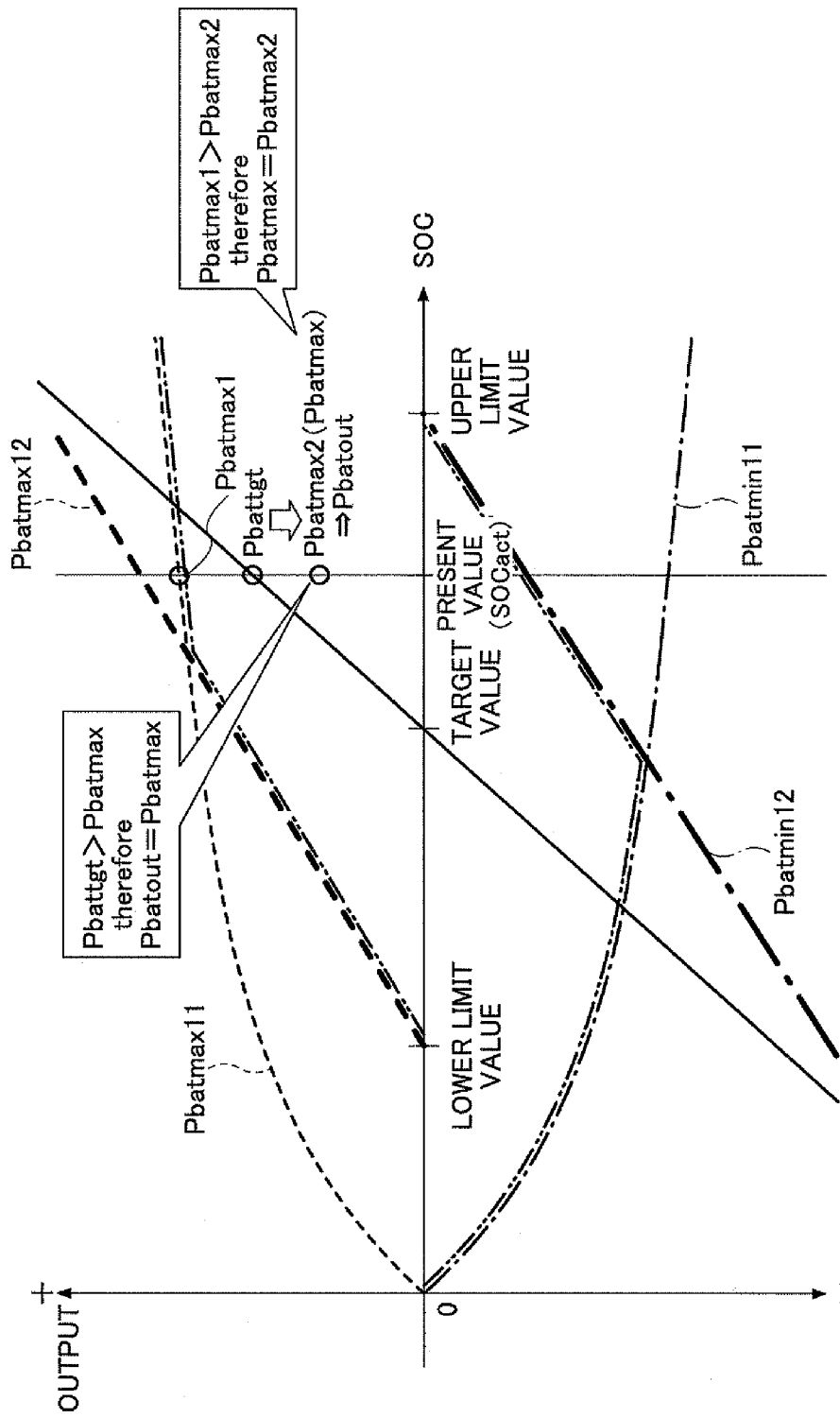
FIG. 23 is a graph illustrating a relationship among a value of a battery output Pbatout, a battery charging rate (SOC), and a battery output.

FIG. 23 is a graph illustrating a relationship among the value of the battery output Pbatout determined in step S10-6, the battery charging rate (SOC), and the battery output. In the graph of FIG. 23, the battery output upper limit value Pbatmax1 determined in the block 60-5 illustrated in FIG. 14 is illustrated. The battery output upper limit value Pbatmax1 is a smaller one of the battery output upper limit value Pbatmax11 and the battery output upper limit value Pbatmax12. The battery output upper limit value Pbatmax1 corresponds to a portion indicated by the two-dot chain line. Referring to FIG. 23, Pbatmin1 determined in the block 60-6 illustrated in FIG. 14 is illustrated. The battery output lower limit value Pbatmin1 is a greater one (closer to zero) of the battery output lower limit value Pbatmin11 and the battery output lower limit value Pbatmin12. The battery output lower limit value Pbatmin1 corresponds to a portion indicated by another two-dot chain line.

The actual battery output Pbatout is determined to be in a region smaller than the Pbatmax1 indicated by the two-dot chain line within the output of the positive values. Meanwhile, the actual battery output Pbatout is determined to be in a region greater than the Pbatmin1 indicated by the two-dot chain line within the output of the negative values.

Referring to the graph illustrated in FIG. 23, the battery output target value Pbattgt referred to in the block 60-7 is illustrated. With the Embodiment 3, the actual discharge electric power or the actual charge electric power of the battery 58 is determined as a battery output Pbatout in consideration of the present charging rate SOCact of the battery in addition to the battery output upper limit value Pbatmax1 indicating the maximum value to be discharged from the battery and the battery output lower limit value Pbatmin1 indicating the maximum value to be charged to the battery.

Referring to FIG. 23, the battery target output Pbattgt at the present charging rate SOCact of the battery 58 exceeds the battery output upper limit value Pbatmax in the process of step S10-6, the target discharge electric power exceeds the upper limit value of the discharge electric power. In this case, the battery target output Pbattgt may not be set as the battery output Pbatout. Therefore, the battery output Pbatout is set to be the battery output upper limit value Pbatmax. In the above steps S10-2 and S10-4, because the battery output upper limit value Pbatmax2 is smaller than the battery output upper limit value Pbatmax1, the value of the battery output upper limit value Pbatmax is equal to the battery output upper limit value Pbatmax2. Therefore, in the example illustrated in FIG. 23, the value of the battery output upper limit value Pbatmax, being the value of the battery output upper limit value Pbatmax2, is set as the actual battery output Pbatout.

Figure 24:
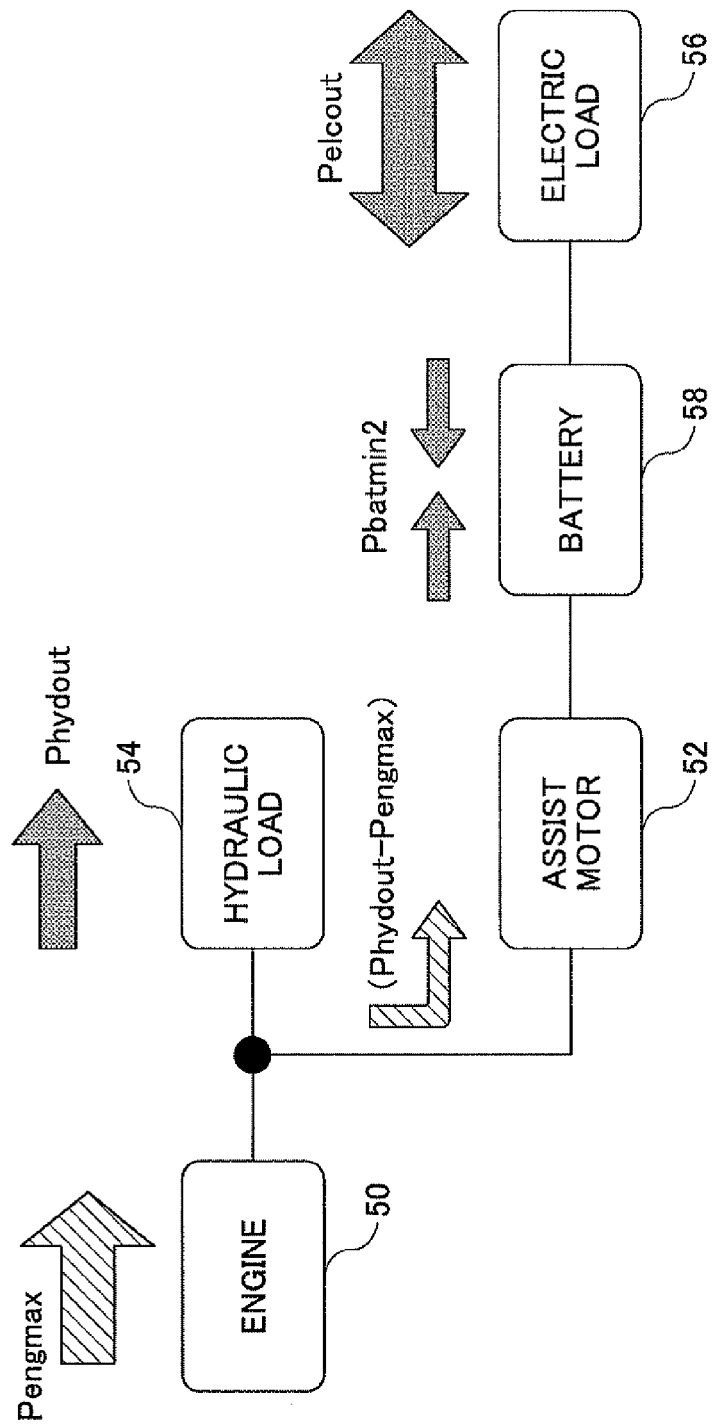
FIG. 24 is a diagram illustrating modeled calculation of a battery output lower limit value Pbatmin2.

In step S8-2, if the battery target output Pbattgt is determined to be the battery output upper limit value Pbatmax or less in YES of step S10-5, the process goes to step S10-7. In step S10-7, under states of outputting to the electric load 56 and the hydraulic load 54, the battery 58 calculates the battery output lower limit value Pbatmax2 being the electric power to be charged to the battery 58. The battery control output lower limit value Pbatmin2 is calculated by subtracting the engine output upper limit value Pengmax from the sum of the electric load actual output Pelcout and the hydraulic load output Phydout. FIG. 24 is a diagram illustrating modeled calculation of the battery output lower limit value Pbatmin2. The battery output lower limit value Pbatmin2 is obtained by adding the regenerated electric power of the electric load 56 to the electric power generated by the assist motor 52.

Subsequently, in step S10-8, the battery output lower limit value Pbatmin1 is compared with the battery output lower limit value Pbatmin2 to determine whether the battery output lower limit value Pbatmin2 is smaller than the battery output lower limit value Pbatmin1.

In step S10-8, if it is determined that the battery output lower limit value Pbatmin2 is the battery output lower limit value Pbatmin1 or less in YES of step S10-8, the process goes to step S10-9. In step S10-9, the value of the battery output lower limit value Pbatmin is made equal to the value of the battery output lower limit value Pbatmin1. Thereafter, the process goes to step S10-11.

On the other hand, if it is determined that the battery output lower limit value Pbatmin2 is not the battery output lower limit value Pbatmin1 or less, namely the battery output lower limit value Pbatmin2 is determined to be greater than the battery output lower limit value Pbatmin1 in NO of step S10-8, the process goes to step S10-10. In step S10-10, the value of the battery output lower limit value Pbatmin is made equal to the value of the battery output lower limit value Pbatmin2. Thereafter, the process goes to step S10-11.

In step S10-10, the battery target output Pbattgt and the battery output lower limit value Pbatmin are compared to determine whether the battery target output Pbattgt is the battery output lower limit value Pbatmin or more.

Figure 25:
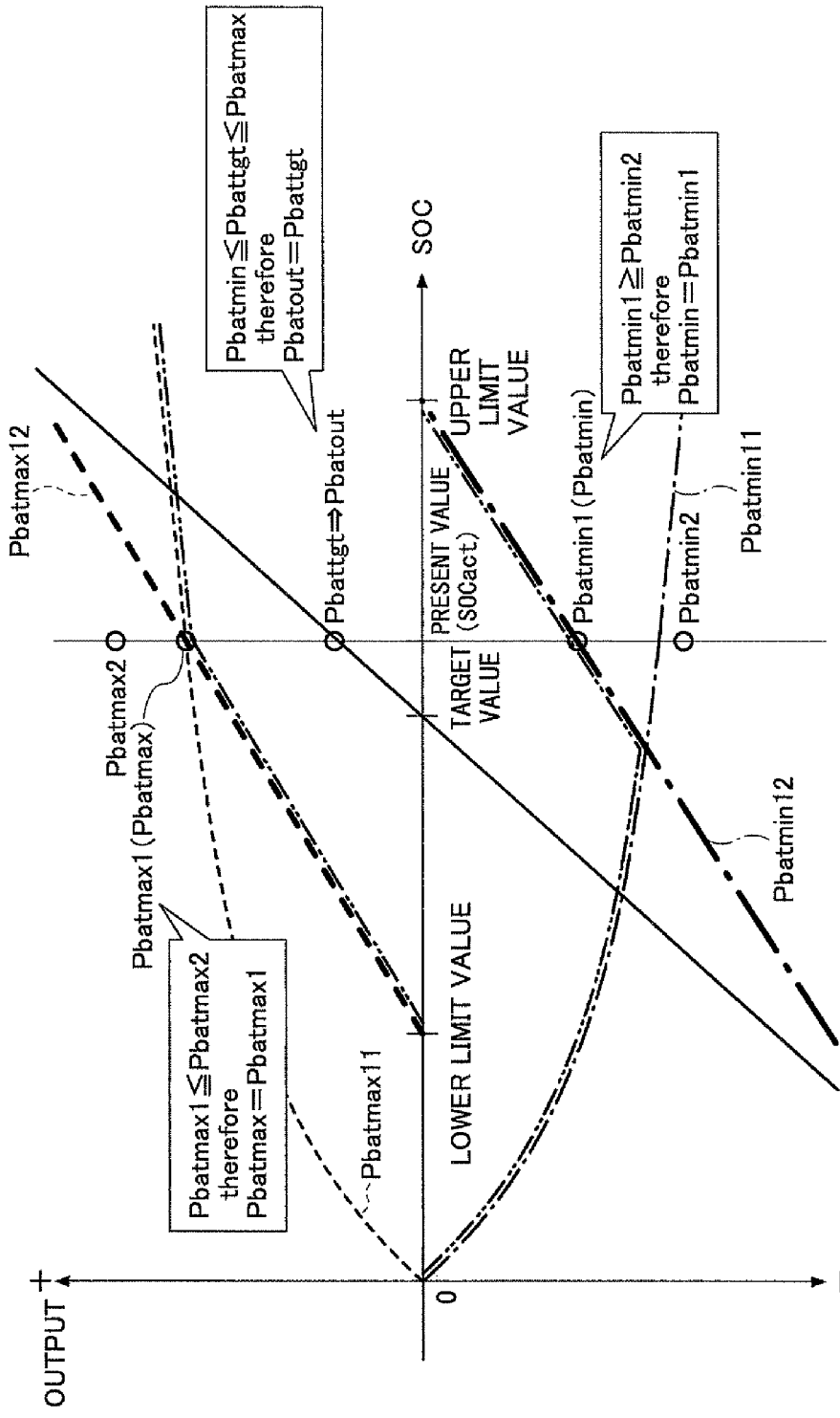
FIG. 25 is a graph illustrating a relationship among the value of the battery output Pbatout, the battery charging rate (SOC), and the battery output.

In step S10-11, if the battery target output Pbattgt is determined to be the battery output lower limit value Pbatmin or more in YES of step S10-11, the process goes to step S10-12. In step S10-12, the value of the battery output Pbatout is set to be equal to the value of the battery target output Pbattgt, and the process ends. FIG. 25 is a graph illustrating a relationship among the value of the battery output Pbatout determined in step S10-12, the battery charging rate (SOC), and the battery output.

In the example illustrated in FIG. 25, because the battery output upper limit value Pbatmax1 is the battery output upper limit value Pbatmax2 or less, the value of the battery output upper limit value Pbatmax1 is set as the battery output upper limit value Pbatmax with the processes of steps S10-2 and S10-3. Because the battery output lower limit value Pbatmin2 is the battery output lower limit value Pbatmin1 or less, the value of the battery output lower limit value Pbatmin1 is set as the battery output lower limit value Pbatmin with the processes of steps S10-8 and step S10-9. The battery target output Pbattgt at the present charging rate SOCact of the battery 58 is the battery output lower limit value Pbatmin or more and the battery output upper limit value Pbatmax or less, the battery target output Pbattgt can be set as the actual battery output Pbatout. Therefore, with the process of step S10-12, the value of the battery target output Pbattgt is set as the battery output Pbatout.

Figure 26:
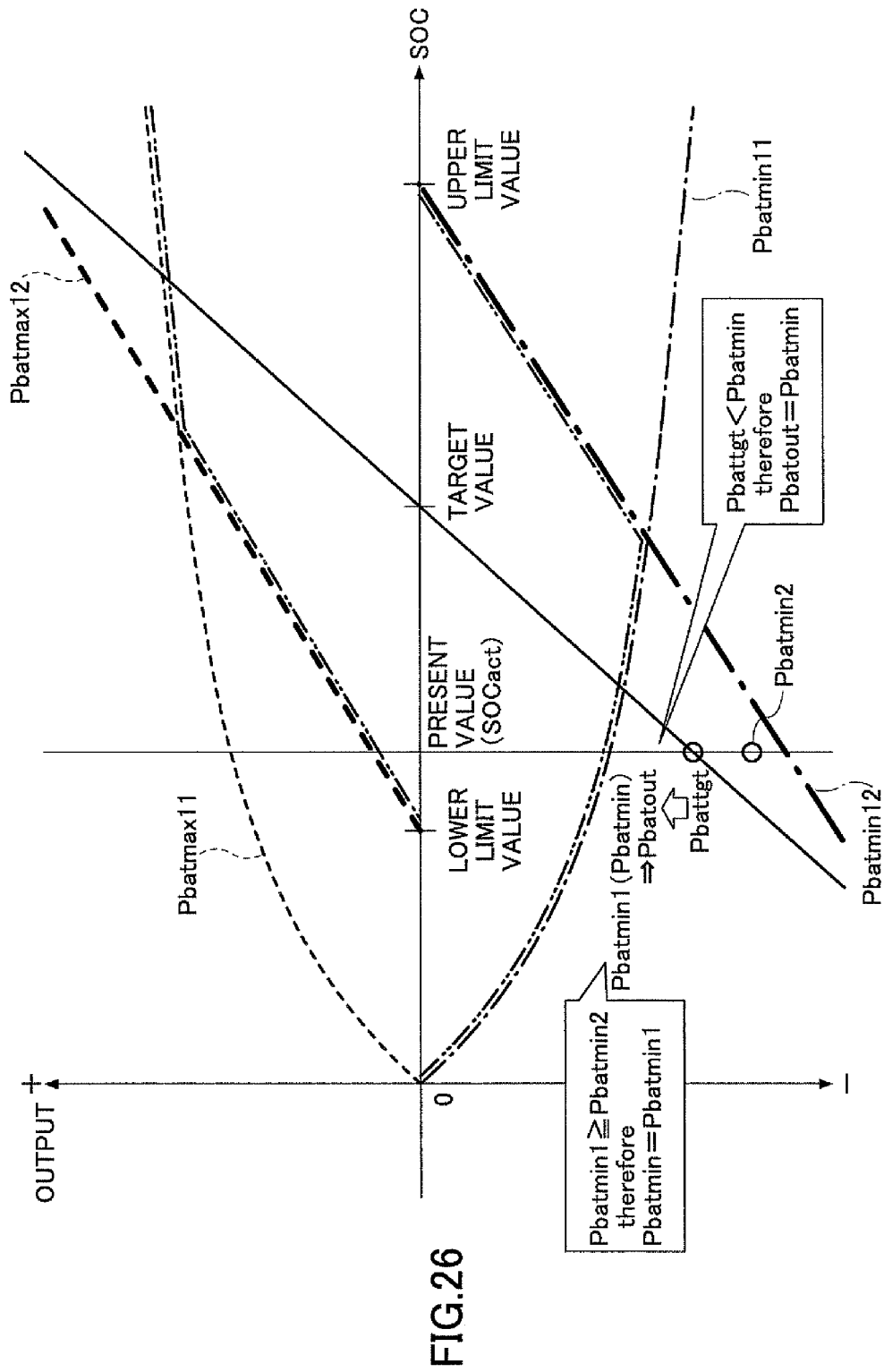
FIG. 26 is a graph illustrating a relationship among the value of the battery output Pbatout, the battery charging rate (SOC), and the battery output.

On the other hand, in step S10-11, if it is determined that the battery target output Pbattgt is not the battery output lower limit value Pbatmin or more, namely the battery target output Pbattgt is smaller than the battery output lower limit value Pbatmin in NO of step S10-11, the process goes to step S10-13. In step S10-13, the value of the battery output Pbatout is set to be equal to the value of the battery output lower limit value Pbatmin, and the process ends. FIG. 26 is a graph illustrating a relationship among the value of the battery output Pbatout determined in step S10-12, the battery charging rate (SOC), and the battery output.

In the example illustrated in FIG. 26, because the battery output lower limit value Pbatmin2 is the battery output lower limit value Pbatmin1 or less, the value of the battery output lower limit value Pbatmin1 is set as the battery output lower limit value Pbatmin with the processes of steps S10-8 and step S10-9. Because the battery target output Pbattgt at the present charging rate SOCact of the battery 58 is the battery output lower limit value Pbatmin or less, a target charge electric power exceeds the maximum electric charging power. Therefore, the battery target output Pbattgt may not be set as the actual battery output Pbatout. Therefore, with the process of step S10-13, the battery output lower limit value Pbatmin being the battery output lower limit value Pbatmin1, is set as the battery output Pbatout.

As described, along with the electric load actual output Pelcout and the hydraulic load actual output Phydout, the battery output upper and lower limit values Pbatmax2 and Pbatmin2 are obtainable. With this, because the maximum value of the output (charge and discharge electric power) of the battery 58 in response to an actual request from the load is obtainable, the battery 58 can be charged and discharged in response to the actual operating state.

Figure 27:
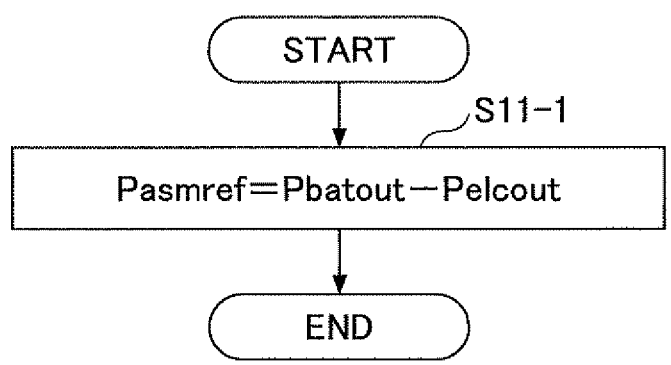
FIG. 27 is a flowchart of the process in step S7 illustrated in FIG. 5.

The process in the step S11 is described in detail. FIG. 27 is a flowchart of the process in step S11.

After the process starts, the assist motor output command Pasmref for instructing an operation of the assist motor 52 is calculated in step S11-1. Thereafter, the process ends. The assist motor output command Pasmref is calculated by subtracting the electric load actual output Pelcout form the battery output Pbatout. With this, it is possible to control the assist motor 52 as the motor generator in response to an operating state of a hybrid working machine and a charging state of the battery 58 by obtaining the assist motor output command after comparing the battery output and the electric load actual output. As the result, the hybrid working machine can be stable and continuously operated.

Figure 28:
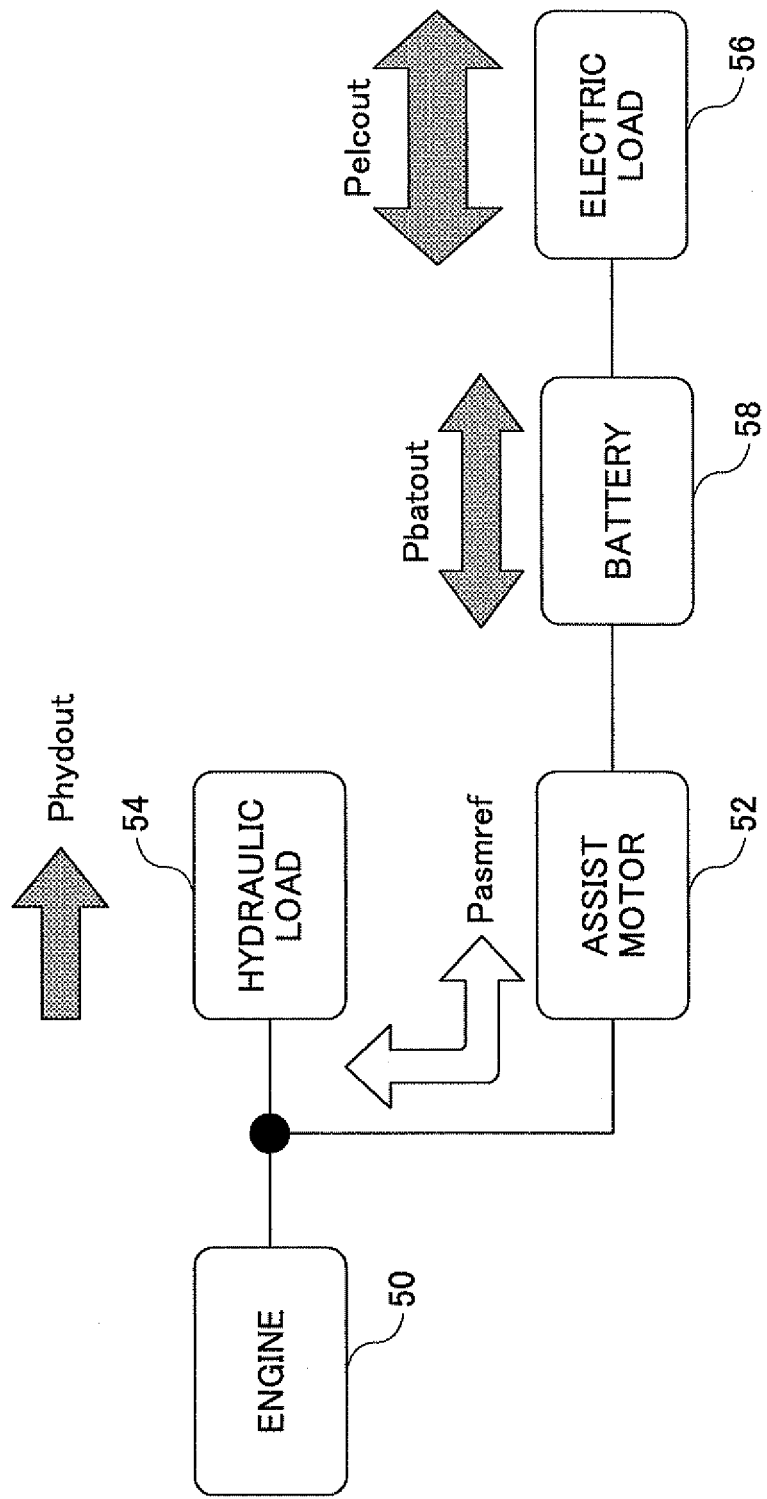
FIG. 28 is a diagram illustrating modeled calculation of an assist motor output command Pasmref.

FIG. 28 is a diagram illustrating modeled calculation of the assist motor output command Pasmref. The output from the assist motor 52 corresponds to the electric power obtained by subtracting the electric power consumed by the electric load 56 from the discharge electric power from the battery 58.

The output of the electric load 56 has a polarity. If the electric load 56 actually consumes the electric power, the polarity is positive. In this case, if the value obtained by subtracting the output from the electric load (the electric power) consumed by the electric load 56 from the electric power discharged from the battery is positive, the electric power is supplied to the assist motor 52. Thus, the assist motor functions as the electric motor. In this case, if the value obtained by subtracting the output from the electric load (the electric power) consumed by the electric load 56 from the electric power discharged from the battery is negative, the motive power from the engine 50 is supplied to the assist motor 52. Thus, the assist motor functions as the generator. With this, the assist motor 52 generates the electric power as much as the negative value obtained by subtracting the output from the electric load (the electric power) consumed by the electric load 56 from the electric power discharged from the battery. With this, the assist motor generates the electric power as much as the negative value referred to above, and the electric power is supplied to the electric load 56.

Further, when the electric load 56 generates the regenerated electric power, the output polarity of the electric load 56 is negative. In this case, because the negative value is subtracted, the electric power regenerated by the electric load 56 is added to the electric power discharged from the battery 58. Therefore, the sum of the electric power discharged from the battery 58 and the electric power regenerated by the electric load 56 is supplied to the assist motor 52. The assist motor 52 functions as the electric motor to assist the engine 50. Based on the comparison between the electric load actual output Pelcout being an electric output setup value of the electrically driven unit and the battery output Pbatout being an electric output setup value of the electric power accumulator, the assist motor 52 is controlled.

As described, the hybrid shovel as the example of the hybrid working machine includes a hydraulic generator, a motor generator, an electric power accumulator, an electrically driven unit and a control unit. The hydraulic generator corresponds to a main pump 14 as the hydraulic motor, converts the output from the engine 50 to hydraulic pressure and supplies the converted hydraulic pressure to a hydraulically driven unit. The motor generator 12 corresponds to the assist motor 52 and is connected to the engine 50 to function as both of the electric motor and the generator. The electric power accumulator corresponds to the battery 58 and supplies the electric power to the motor generator 12 to cause the motor generator to function as the electric motor. The electrically driven unit is driven by the electric power from the electric power accumulator and the motor generator and generates the regenerated electric power to thereby supply the regenerated power to at least one of the electric power accumulator and the motor generator. The control unit 60 corrects the output upper limit value Pengmax of the engine 50 based on the deviation Nengerr between the target revolution speed Nengref of the engine 50 and the actual revolution speed Nengact of the engine 50, and calculates an output command Pasmref of the motor generator 12, an actual output Phydout from the hydraulic load 54 and an actual output Pelcout from the electric load based on the corrected output upper limit value Pengmax of the engine. With this, when the actual revolution speed Nengact of the engine 50 is decreased, the output upper limit value Pengmax of the engine 50 is corrected to forcibly decrease. Thus, the actual revolution speed Nengact of the engine 50 is quickly recovered to the target revolution speed Nengre thereby preventing the engine from stalling.

The control unit 60 corrects the output lower limit value Pasmmin of the motor generator 12 based on a deviation Nengerr between the target revolution speed Nengref of the engine 50 and the actual revolution speed Nengact, and may calculate the output command Pasmref of the motor generator 12, the actual output Phydout from the hydraulic load 54 and the actual output Pelcout from the electric load based on the corrected output lower limit value Pengmin of the motor generator 12. With this, when the actual revolution speed Nengact of the engine 50 decreases, the output lower limit value Pasmmin is corrected so as to reduce the load on the engine 50 and the output lower limit value Pasmmin of the assist motor 52 is corrected. Then, the actual revolution speed Nengact can be quickly recovered to the target revolution speed Nengref thereby preventing the engine stall.

With the Embodiment 3, the operation and the output of the motor generator are controlled in consideration of an electric power accumulator output setup value, a required value of the electric load, an engine output setup value, and a required value of the hydraulic load. Therefore, the engine and the electric power accumulator can be used in an appropriate output range. Further, the regenerated electric power from the electric load can be effectively used and the charging rate (SOC) of the electric power accumulator can be effectively maintained in the vicinity of the target value.

In order to increase the output while maintaining the revolution speed of the engine (the internal-combustion engine) constant, the amount of the fuel supplied to the engine is increased. Although the output of the engine changes in response to the amount of the supplied fuel, the response to the fuel is relatively slow and there is a limit in an output change per unit time (an output increment rate). In order to increase the output while maintaining an appropriate combustion efficiency, it is necessary to limit the output change per unit time (the output increment rate).

However, the output of the engine required by hydraulic generators such as a hydraulic motor and a hydraulic pump (said differently, a hydraulic pressure required by a hydraulic operating unit) may rapidly increase. In this case, the increment rate required by the hydraulic generator may exceed the limit of the output increment rate of the engine. Said differently, the excessive fuel may be supplied to the engine in order to rapidly increase the engine output. In a case where the excessive amount of the fuel is rapidly supplied to the engine, combustion efficiency of the engine decreases and the engine revolution speed temporarily drops to decrease the output thereby generating black smoke from the engine. Alternatively, the power of the engine may drop to degrade an operational feel in operating the hydraulic operating unit. In the worst case, the revolution speed of the engine may excessively drop to thereby stop the engine (the engine stall).

With Embodiment 4 described below, the motive power supplied to the hydraulic generator can be increased in response to the incrementing of the hydraulic load while appropriately maintaining the operating condition of the engine even if the hydraulic load rapidly increases.

Figure 29:
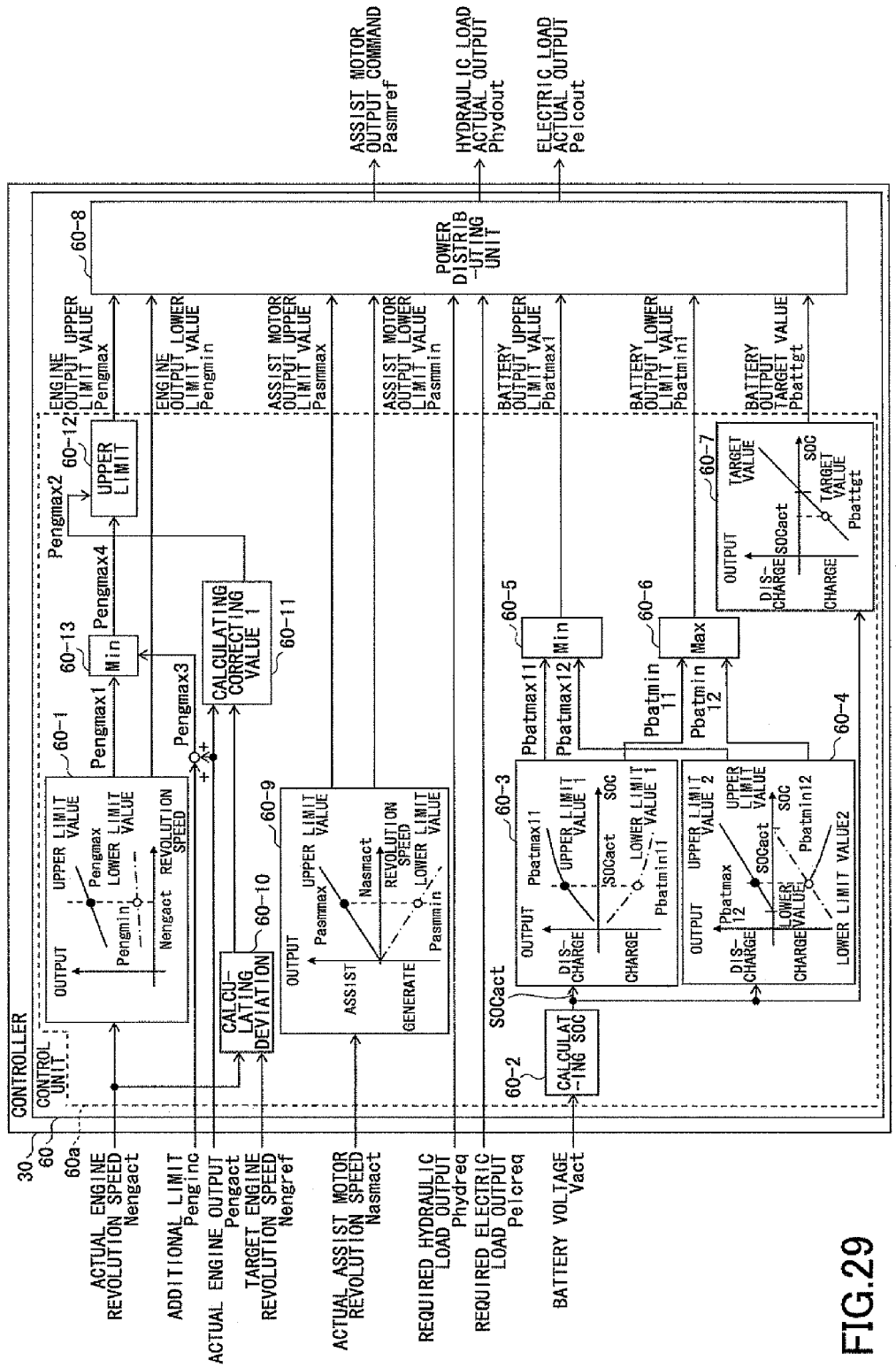
FIG. 29 is a functional block chart of a control unit included in a controller described in Embodiment 4 of the present invention.

FIG. 29 is a functional block chart of a control unit included in a controller described in the Embodiment 4 of the present invention. Referring to FIG. 29, the same reference symbols as those illustrated in FIG. 5 are attached to the same components as those illustrated in FIG. 5, and description of those is omitted.

Referring to FIG. 29, a basic concept of the control with the Embodiment 4 is described. The process for determining the output upper limit value is repeatedly carried out along with a process of determining a degree of increasing the engine output at the present moment, said differently a fuel amount supplied to the engine to be increased is determined.

The control unit 60 stores table information or map information 60-1 indicative of an outer upper limit value relative to the revolution speed of the engine. When the present actual engine revolution speed Nengac is input into the control unit 60, the control unit 60 refers to the map information 60-1 and obtains the output upper limit value Pengmax1 at the actual engine revolution speed Nengact. The obtained output upper limit value Pengmax1 is input into the block 60-13 functioning as a comparator.

Meanwhile, a previous value of the actual engine output Pengact is input in the control unit 60. The control unit 60 sends an output upper limit value Pengmax3 obtained by adding a limit of increasing the engine output Penginc to the previous value of the actual engine output Pengact to a block 60-13.

The limit of increasing the engine output Penginc is set to be a value enabling the engine output while maintaining the engine output within an appropriate range of the operating condition of the engine. The limit of increasing the engine output Penginc is an output limit value for limiting the incrementing of the fuel supplied to the engine by limiting an increasing amount per unit time even if the output required by the engine rapidly increases.

The block 60-13 compares the input output upper limit value Pengmax1 with the output upper limit value Pengmax3, and outputs the smaller one of the input output upper limit value Pengmax1 with the output upper limit value Pengmax3 to the block 60-12 as the engine output upper limit value Pengmax4.

A block 60-12 compares the engine output upper limit value Pengmax4 supplied from the block 60-13 with the engine output upper limit value Pengmax2 supplied from the block 60-11, and outputs the engine output upper limit value Pengmax4 without change to the power distributing unit 60-8 when the engine output upper limit value is the Pengmax1 engine output upper limit value Pengmax2 or less. On the other hand, when an engine output upper limit value Pengmax4 is greater than the engine output upper limit value Pengmax2, the block 60-12 outputs the engine output upper limit value Pengmax2 as the engine output upper limit value Pengmax instead of the engine output upper limit value Pengmax4 to the power distributing unit 60-8. Said differently, the block 60-12 limits the engine output upper limit value Pengmax so as not to exceed the engine output upper limit value Pengmax4.

As described, it is possible to prevent rapid incrementing of the load on the engine by controlling the engine so that the actual output of the engine does not exceed the engine output upper limit value Pengmax. Therefore, it is possible to prevent the engine from stopping (a so-called engine stall) or prevent the engine from generating black smoke. Further, it is possible to prevent the revolution speed of the engine from rapidly decreasing due to a rapid load on the engine to thereby prevent degradation of operability of a hydraulic operating unit.

Figure 30:
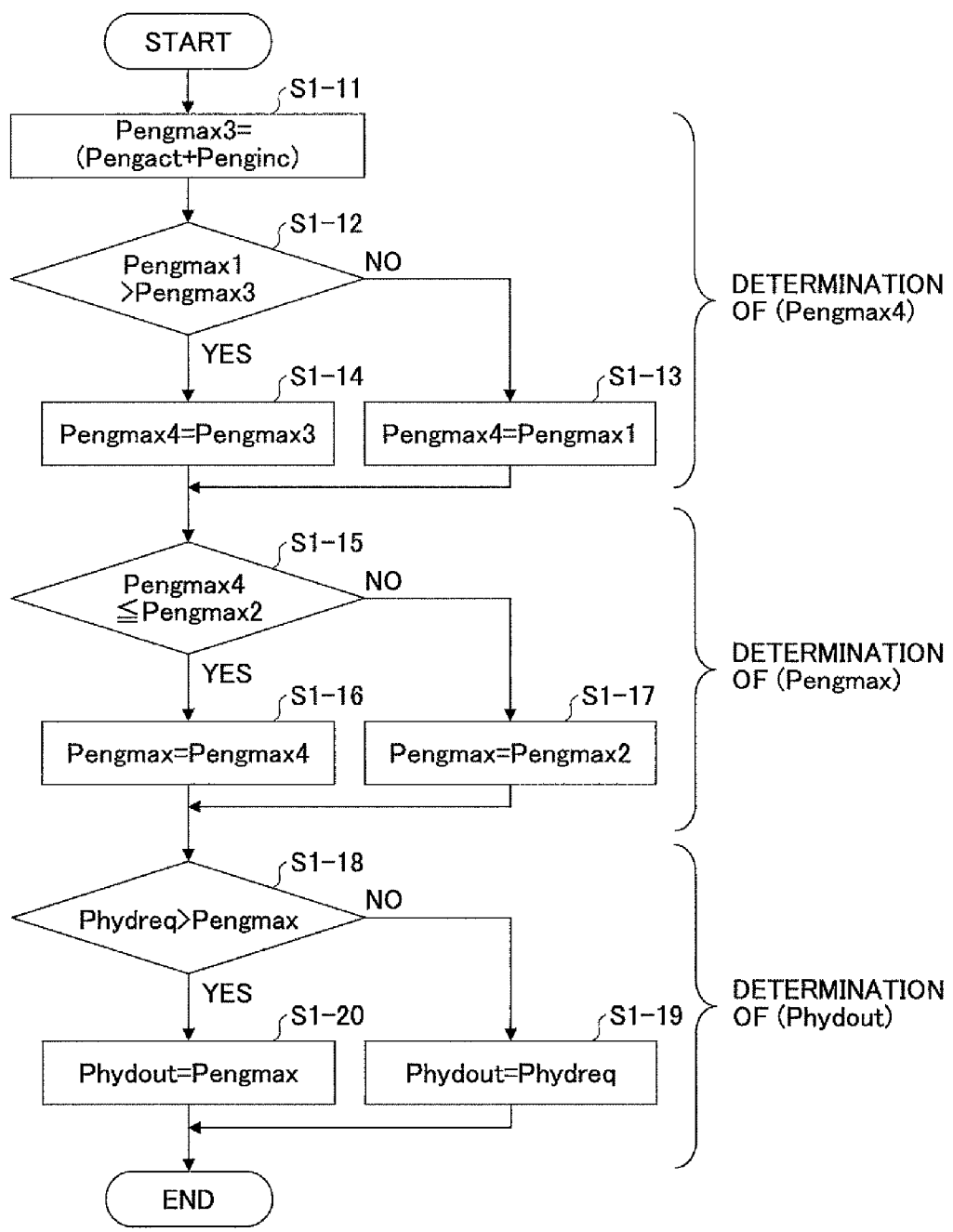
FIG. 30 is a flowchart of processes determining a hydraulic load actual output Phydout.
Figure 31:
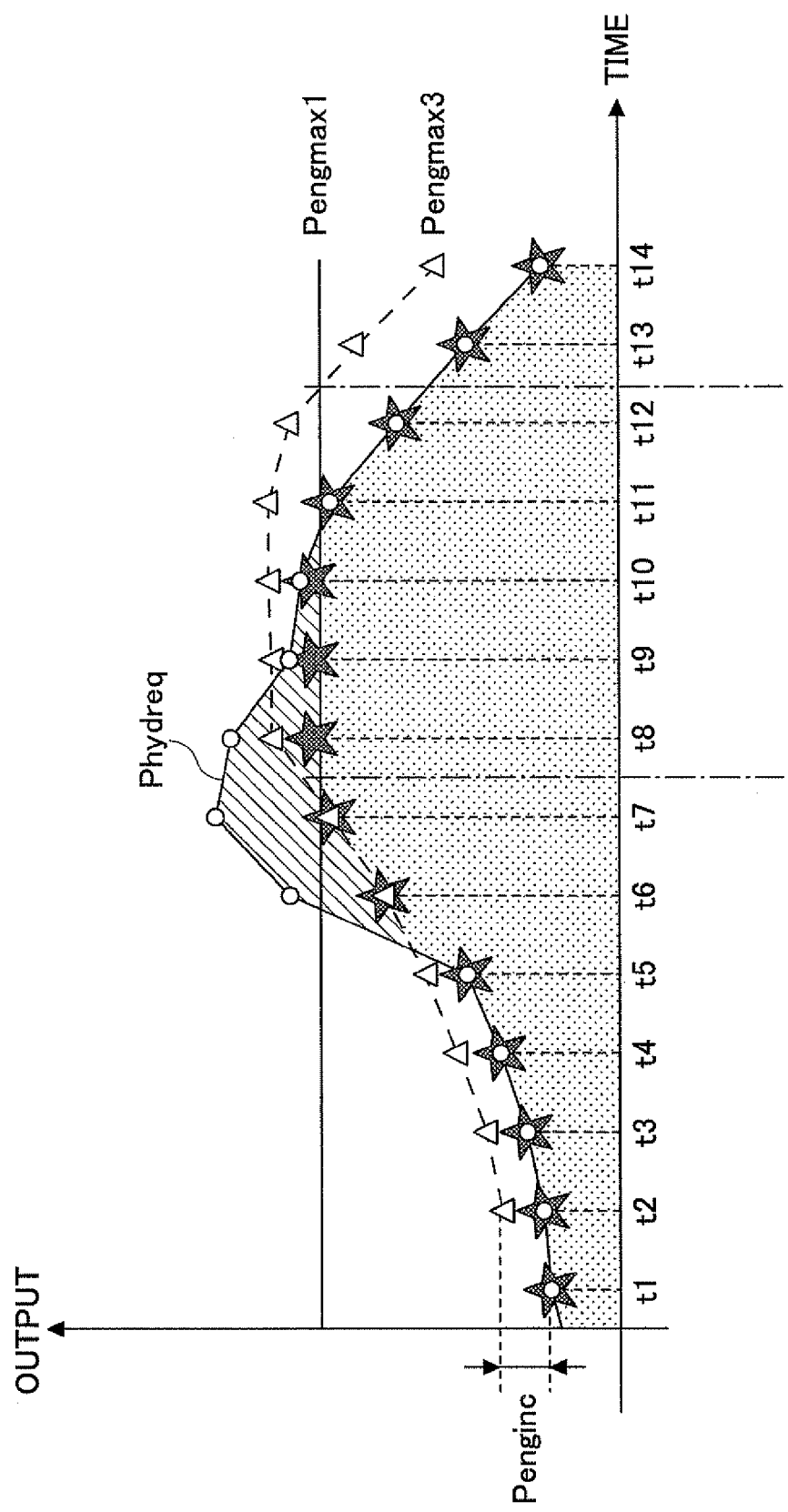
FIG. 31 is a graph illustrating an exemplary engine output transition when the processes illustrated in FIG. 30 are repeated at each unit time.

FIG. 30 is a flowchart of the above process. The process is carried out within a very short time such as 0.1 seconds. FIG. 31 is a graph illustrating an exemplary engine output transition when the processes illustrated in FIG. 30 are repeated in each unit time.

In step S1-11, the limit of increasing the engine output Penginc is added to the previous actual engine output Pengact to thereby calculate the engine output upper limit value Pengmax3. Next, in step S1-12, it is determined whether the engine output upper limit value Pengmax1 obtained from the actual engine revolution speed Nengact is the engine output upper limit value Pengmax3 or more.

If the engine output upper limit value Pengmax1 is the engine output upper limit value Pengmax3 or less, the process goes to step S1-13. In step S1-13, the process of setting Pengmax1 as Pengmax4 is carried out. On the other hand, if the engine output upper limit value Pengmax1 is greater than the engine output upper limit value Pengmax3, the process goes to step S1-14. In step S1-14, the process of setting Pengmax3 as Pengmax4 is carried out.

During the processes up to the step S1-13 or the step S1-14, the engine output upper limit value Pengmax4 is determined. The determined engine output upper limit value Pengmax4 corresponds to engine outputs allowed for every unit time when the revolution speed of the engine is constant, and is limited to the maximum value of the engine output obtained by the evolution speed of the engine. When the revolution speed of the engine is constant, the engine output upper limit value Pengmax1 becomes constant relative to the revolution speed of the engine, which is parallel to the abscissa axis in FIG. 31. Because the engine output upper limit value Pengmax3 is obtained by adding the limit of increasing the engine output Penginc to the engine output 3, the engine output upper limit value Pengmax3 is indicated as a curved line with marks Δ. Therefore, the engine output upper limit value Pengmax4 is formed by smaller values of the Pengmax3 (the curved line) and the Pengmax1 (the parallel line). Referring to FIG. 31, Pengmax3 indicated by the marks Δ is shaped like a mountain. Cutting the peak of the mountain along the parallel line of Pengmax1 corresponds to the engine output upper limit value Pengmax4.

When Pengmax4 is determined after the step S1-13 or the step S1-14, the process goes to step S1-15. In step S1-15, it is determined whether the engine output upper limit value Pengmax4 is greater than the engine output upper limit value Pengmax2.

If the engine output upper limit value Pengmax4 is the engine output upper limit value Pengmax2 or less, the process goes to step S1-16. In step S1-16, the process of setting Pengmax4 as Pengmax is carried out. On the other hand, if the engine output upper limit value Pengmax4 is greater than the engine output upper limit value Pengmax2, the process goes to step S1-17. In step S1-17, the process of setting Pengmax2 as Pengmax is carried out. During the processes up to the steps S1-15 and S1-16 or the steps S1-15 and S1-17, the engine output upper limit value Pengmax is determined.

Subsequently, in step S1-18, it is determined whether the required hydraulic load output Phydreq is greater than the engine output upper limit value Pengmax.

When the required hydraulic load output Phydreq is the engine output upper limit value Pengmax or less, the process goes to step S1-19. In step S1-19, the hydraulic load output command Phydout is made equal to the required hydraulic load output Phydreq.

Said differently, because the required output does not exceed the upper limit value, the engine output may be set so as to obtain the required output and therefore the hydraulic load output command Phydout is made equal to the required hydraulic load output Phydreq.

When the required hydraulic load output Phydreq is greater than the engine output upper limit value Pengmax, the process goes to step S1-20. In step S1-20, the hydraulic load output command Phydout is made equal to the engine output upper limit value Pengmax. Said differently, because the required output exceeds the upper limit value, the hydraulic load output command Phydout is made equal to the engine output upper limit value Pengmax so that the engine output does not exceed the upper limit value.

The processes up to the steps S1-18 and S1-20 or the steps S1-18 and S1-19 correspond to the process determining the hydraulic load output command Phydout.

Referring to FIG. 31, the required hydraulic load output Phydreq being an output required by the hydraulic operating unit is indicated by marks ○. Because the required hydraulic load output Phydreq is smaller than the engine output upper limit value Pengmax (=Pengmax3) between the time t1 and the time t5, the required hydraulic load output Phydreq is set as the hydraulic load output command Phydout. With the Embodiment 4, because the engine 10 drives only the hydraulic pump 12, the hydraulic load output command Phydout becomes equal to the engine output Pengact being the actual output of the engine 10. More specifically, the Pengmax at the time t2 is calculated by adding the limit of increasing the engine output Penginc to the actual engine output Pengact at the time t1. Therefore, between the time t1 and the time t5 where Pengact does not rapidly change, a curve obtained by adding the limit of increasing the engine output Penginc to the actual engine output Pengact is formed substantially in parallel with the curve of the actual engine output Pengact. As there is no rapid incrementing of the required output between the time t1 and the time t5, the actual engine output Pengact overlaps the required hydraulic load output Phydreq.

Because the required hydraulic load output Phydreq rapidly increases between the time t5 and the time t6, the required hydraulic load output Phydreq exceeds the engine output upper limit value Pengmax (=Pengmax3) at the time t6. Therefore, the required hydraulic load output Phydreq is limited by the engine output upper limit value Pengmax (=Pengmax4=Pengmax3) so that the hydraulic load output command Phydout does not exceed the engine output upper limit value Pengmax (=Pengmax3).

At the time t7, in a similar manner to the time t6, the required hydraulic load output Phydreq is limited to the engine output upper limit value Pengmax (=Pengmax3). At the time t8, because the engine output upper limit value Pengmax1 is smaller than the engine output upper limit value Pengmax3, the engine output upper limit value Pengmax becomes Pengmax1. Therefore, the required hydraulic load output Phydreq is limited by the engine output upper limit value Pengmax (=Pengmax1) so that the hydraulic load output command Phydout does not exceed the engine output upper limit value Pengmax (=Pengmax4=Pengmax1).

Between the time t7 and the time t11, because the engine output upper limit value Pengmax1 is smaller than the engine output upper limit value Pengmax3, the engine output upper limit value Pengmax is continuously Pengmax1. Therefore, the required hydraulic load output Phydreq is limited by the engine output upper limit value Pengmax (=Pengmax1) so that the hydraulic load output command Phydout does not exceed the engine output upper limit value Pengmax (=Pengmax1).

Between the time t11 and the time t12, because the engine output upper limit value Pengmax1 is smaller than the engine output upper limit value Pengmax3, the engine output upper limit value Pengmax is continuously Pengmax1. Because the required hydraulic load output Phydreq is smaller than the engine output upper limit value Pengmax (=Pengmax1) between the time t11 and the time t12, the required hydraulic load output Phydreq is set as the hydraulic load output command Phydout.

Between the time t13 and the time T14, because the engine output upper limit value Pengmax3 is smaller than the engine output upper limit value Pengmax1, the engine output upper limit value Pengmax becomes Pengmax3. Because the required hydraulic load output Phydreq is smaller than the engine output upper limit value Pengmax (=Pengmax3), the required hydraulic load output Phydreq is set as the hydraulic load output command Phydout.

As described above, a curve connecting marks ★ in FIG. 31 corresponds to the hydraulic load output command Phydout, which represents the actual output of the engine. Further, in a portion hatched by slant lines in FIG. 31, the required hydraulic load output Phydreq is limited by the engine output upper limit value where the rapid incrementing of the engine output is suppressed to appropriately maintain the operating condition of the engine 10.

As described, according to the Embodiments of the present invention, it is possible to control so as not to rapidly increase the load on the internal-combustion engine. Therefore, the operating condition of the internal-combustion engine can be appropriately maintained to thereby prevent degradation of fuel efficiency, generation of black smoke and engine stall. The correcting function effectuated at the time of the rapid load described in the Embodiment 4 may be applied to the structures of the Embodiment 1 illustrated in FIG. 5, the Embodiment 2 illustrated in FIG. 10, and the Embodiment 3 illustrated in FIG. 14.

In the Embodiments, the hybrid shovel is exemplified as an example of the hybrid working machine. However, the Embodiments are applicable to the working machine such as a truck and a wheel loader.

All examples and conditional language recited herein as to the hybrid working machine are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2008-063070 filed on Mar. 12, 2008, the entire contents of which are hereby incorporated herein by reference.

INDUSTRIAL APPLICABILITY

The embodiments of the present invention are applicable to a hybrid working machine which effectively works using two power sources.

EXPLANATION OF REFERENCE SYMBOLS

1: lower-part traveling body
1a, 1B: traveling mechanism
2: turning mechanism
3: upper-part turning body
4: boom
5: arm
6: bucket
7: boom cylinder
8: arm cylinder
9: bucket cylinder
10: cabin
11: engine
12: motor generator (assist motor)
13: reduction machine
14: main pump
15: pilot pump
16: high-pressure hydraulic line
17: control valve
18: inverter
19: electric power accumulator
20: inverter
21: turning electric motor
23: mechanical brake
24: turning reduction machine
25: pilot line
26: operation apparatus
26A,26B: lever
26C: pedal
27: hydraulic line
28: hydraulic line
29: pressure sensor
30: controller
31: speed command converting unit
32: drive control unit
40: rotational drive control unit drive control unit
50: engine
52: assist motor
54: hydraulic load
56: electric load
58: battery
60: control unit
60a: output condition calculating unit
60-1 to 60-7: block
60-8: block (power distributing unit)
60-9 to 60-13: block

The invention claimed is:

1. A hybrid working machine comprising:
a hydraulic generator configured to convert an output from an engine to a hydraulic pressure and supply to a hydraulically driven unit;
a motor generator connected to the engine and configured to function as both of an electric motor and a generator;
an electric power accumulator configured to supply an electric power to the motor generator to cause the motor generator to function as the electric motor;
an electrically driven unit configured to be driven by the electric power from the electric power accumulator, generate a regenerated electric power and supply the regenerated electric power to the electric power accumulator; and
a control unit configured to control an operation of the motor generator,
wherein the control unit corrects an output upper limit value of the engine based on a deviation between a target revolution speed of the engine and an actual revolution speed of the engine and determines output values of the motor generator, the hydraulically driven unit and the electrically driven unit based on the corrected output upper limit value of the engine.

2. The hybrid working machine according to claim 1,
wherein the control unit corrects an output lower limit value of the motor generator based on a deviation between the target revolution speed of the engine and the actual revolution speed of the engine, and determines output values of the motor generator, the hydraulically driven unit and the electrically driven unit based on the corrected output lower limit value of the engine.

3. The hybrid working machine according to claim 2,
wherein the control unit corrects the output lower limit value of the motor generator in consideration of discharge capability of the electric power accumulator.

4. The hybrid working machine according to claim 1,
wherein control unit determines an output from the hydraulically driven unit based on discharge capability of the electric power accumulator.

5. A hybrid working machine comprising:
a hydraulic generator configured to convert an output from an engine to a hydraulic pressure and supply to a hydraulically driven unit;
a motor generator connected to the engine and configured to function as both of an electric motor and a generator;
an electric power accumulator configured to supply an electric power to the motor generator to cause the motor generator to function as the electric motor;
an electrically driven unit configured to be driven by the electric power from the electric power accumulator, generate a regenerated electric power and supply the regenerated electric power to the electric power accumulator; and
a control unit configured to control an operation of the motor generator,
wherein the control unit corrects an output lower limit value of the motor generator based on a deviation between a target revolution speed of the engine and an actual revolution speed of the engine and determines output values of the motor generator, the hydraulically driven unit and the electrically driven unit based on the corrected output lower limit value of the motor generator.

6. The hybrid working machine according to claim 5, wherein the control unit corrects the output lower limit value of the motor generator in consideration of discharge capability of the electric power accumulator.

7. The hybrid working machine according to claim 5, wherein control unit determines an output from the hydraulically driven unit based on discharge capability of the electric power accumulator.

8. A control method of a working machine which is operated by driving a hydraulic generator with an engine and includes a control unit, the control method comprising:
   setting, by the control unit, an increasing rate of an output from the engine to be a predetermined value;
   comparing, by the control unit, an upper limit value of the engine which is obtained from the predetermined value and a required power which is obtained from a hydraulic output required for the hydraulic generator; and
   controlling, by the control unit, an output from the engine to be the output upper limit value or less when the required power exceeds the output upper limit value.

9. The control method according to claim 8, wherein when the required power exceeds the output upper limit value, a power exceeding the output upper limit value is supplied by the electric motor.

10. The control method according to claim 9, wherein the electric motor is driven by a power obtained from the electric power accumulator and a regenerated electric power obtained from a working motor generator.

11. The control method according to claim 8, wherein the output from the engine is controlled by a predetermined time interval, and the output upper limit value of the engine is obtained by adding a value of a predetermined rate to a previous output from the engine.

12. The control method according to claim 11, wherein when the output upper limit value of the engine is obtained, a revolution speed of the engine is considered.

* * * * *